United States Patent
Joo

(10) Patent No.: US 10,452,152 B2
(45) Date of Patent: *Oct. 22, 2019

(54) WEARABLE GLASSES AND METHOD OF PROVIDING CONTENT USING THE SAME

(71) Applicant: SAMSUNG ELECTRONICS CO., LTD., Suwon-si (KR)

(72) Inventor: Ga-hyun Joo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/026,071

(22) Filed: Jul. 3, 2018

(65) Prior Publication Data

US 2018/0314339 A1 Nov. 1, 2018

Related U.S. Application Data

(63) Continuation of application No. 14/815,082, filed on Jul. 31, 2015, now Pat. No. 10,037,084.

(30) Foreign Application Priority Data

Jul. 31, 2014 (KR) .................. 10-2014-0098626
Mar. 27, 2015 (KR) .................. 10-2015-0043300

(51) Int. Cl.
*G06F 3/01* (2006.01)
*G02B 27/01* (2006.01)
(Continued)

(52) U.S. Cl.
CPC ......... *G06F 3/017* (2013.01); *G02B 27/0093* (2013.01); *G02B 27/017* (2013.01);
(Continued)

(58) Field of Classification Search
None
See application file for complete search history.

(56) References Cited

U.S. PATENT DOCUMENTS 6,919,866 B2 7/2005 Kanevsky et al.
7,361,519 B2 4/2008 Yamazaki et al.
(Continued)

FOREIGN PATENT DOCUMENTS

JP 2005-258015 A 9/2005
KR 1020140077097 A 6/2014
(Continued)

OTHER PUBLICATIONS

Communication dated Dec. 7, 2015, issued by the European Patent Office in counterpart European Application No. 15178990.6.
(Continued)

*Primary Examiner* — Jwalant Amin
(74) *Attorney, Agent, or Firm* — Sughrue Mion, PLLC

(57) ABSTRACT

A wearable glasses is provided. The wearable glasses includes a sensing circuit, a communication interface, a display, and a controller. The sensing circuit senses movement information of a user wearing the wearable glasses. The communication interface receives notification message information. The display displays the notification message information within an angle of view of the user wearing the wearable glasses. The controller determines a movement state of the user based on the sensed movement information of the user and controls the display to display the received notification message information according to the movement state of the user.

18 Claims, 60 Drawing Sheets

(51) Int. Cl.
  *G02B 27/00*   (2006.01)
  *G06T 19/00*   (2011.01)
(52) U.S. Cl.
  CPC ........ *G02B 27/0172* (2013.01); *G06T 19/006*
      (2013.01); *G02B 2027/014* (2013.01); *G02B*
      *2027/0178* (2013.01); *G02B 2027/0187*
      (2013.01)

(56) References Cited

U.S. PATENT DOCUMENTS

| | | | |
|---|---|---|---|
| 9,272,658 | B2 | 3/2016 | Newton-Dunn et al. |
| 2002/0068500 | A1 | 6/2002 | Gabai et al. |
| 2008/0062297 | A1 | 3/2008 | Sako et al. |
| 2008/0150964 | A1 | 6/2008 | Cho |
| 2008/0192027 | A1 | 8/2008 | Morrison |
| 2009/0122080 | A1 | 5/2009 | Awata |
| 2009/0138811 | A1 | 5/2009 | Horiuchi et al. |
| 2009/0295731 | A1 | 12/2009 | Kim et al. |
| 2010/0146461 | A1 | 6/2010 | Ryu et al. |
| 2010/0302274 | A1 | 12/2010 | Lee |
| 2012/0072873 | A1 | 3/2012 | Park et al. |
| 2012/0202466 | A1 | 8/2012 | Zangvil |
| 2012/0236030 | A1 | 9/2012 | Border et al. |
| 2013/0234931 | A1 | 9/2013 | Keranen et al. |
| 2013/0241805 | A1 | 9/2013 | Gomez |
| 2013/0265232 | A1 | 10/2013 | Yun et al. |
| 2013/0336629 | A1 | 12/2013 | Mulholland et al. |
| 2013/0339453 | A1 | 12/2013 | Aggarwal et al. |
| 2014/0043213 | A1 | 2/2014 | Park et al. |
| 2014/0049452 | A1 | 2/2014 | Maltz |
| 2014/0146075 | A1 | 5/2014 | Takasu |
| 2014/0253588 | A1 | 9/2014 | Mandala |
| 2014/0285819 | A1* | 9/2014 | Son .......................... G01S 5/16 356/614 |
| 2015/0153570 | A1 | 6/2015 | Yamamoto et al. |
| 2015/0172249 | A1 | 6/2015 | Schneider et al. |
| 2015/0281156 | A1 | 10/2015 | Beausoleil et al. |
| 2015/0334486 | A1 | 11/2015 | Eom et al. |

FOREIGN PATENT DOCUMENTS

| | | |
|---|---|---|
| WO | 02-33688 A2 | 4/2002 |
| WO | 2014054210 A2 | 4/2014 |
| WO | 2014092509 A1 | 6/2014 |

OTHER PUBLICATIONS

Communication dated Mar. 28, 2019, issued by the Taiwanese Intellectual Property Office in counterpart Taiwanese Application No. 104123614.

* cited by examiner

FIG. 2
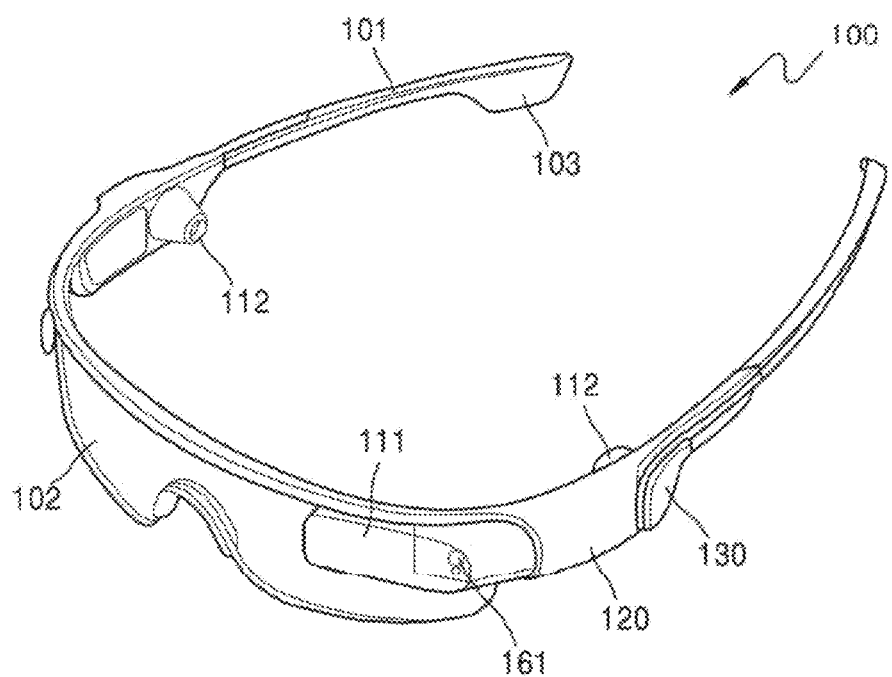
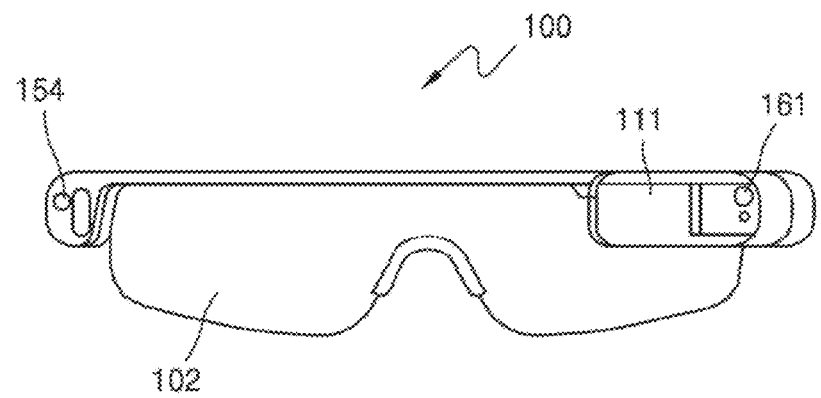

FIG. 3
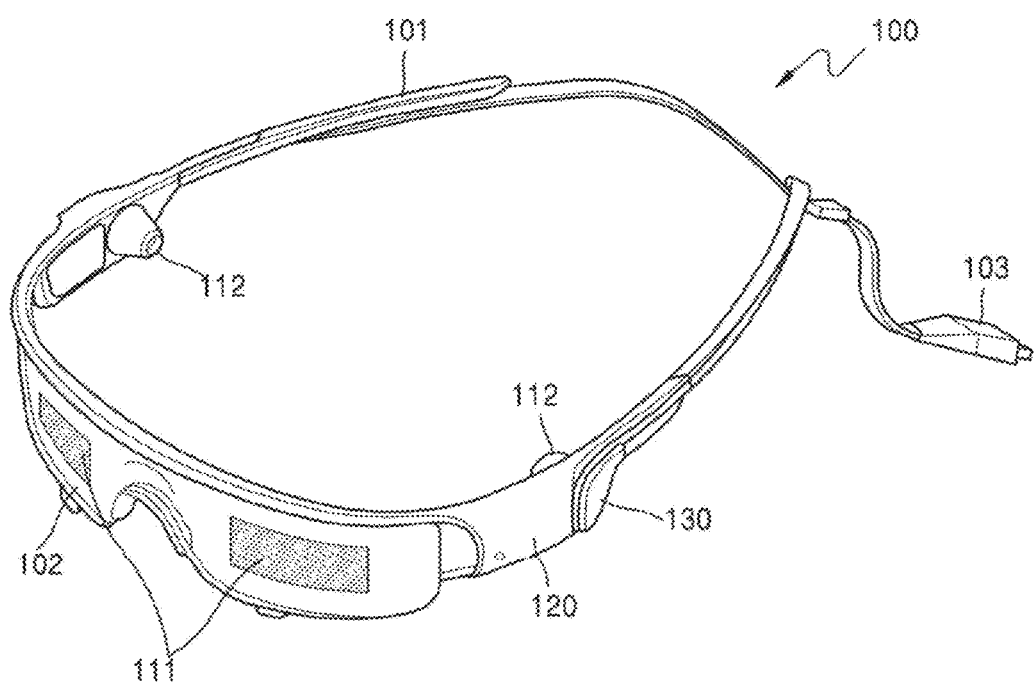
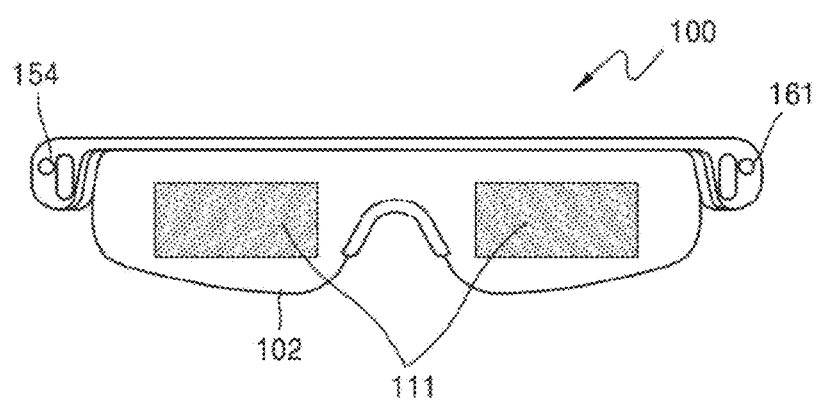

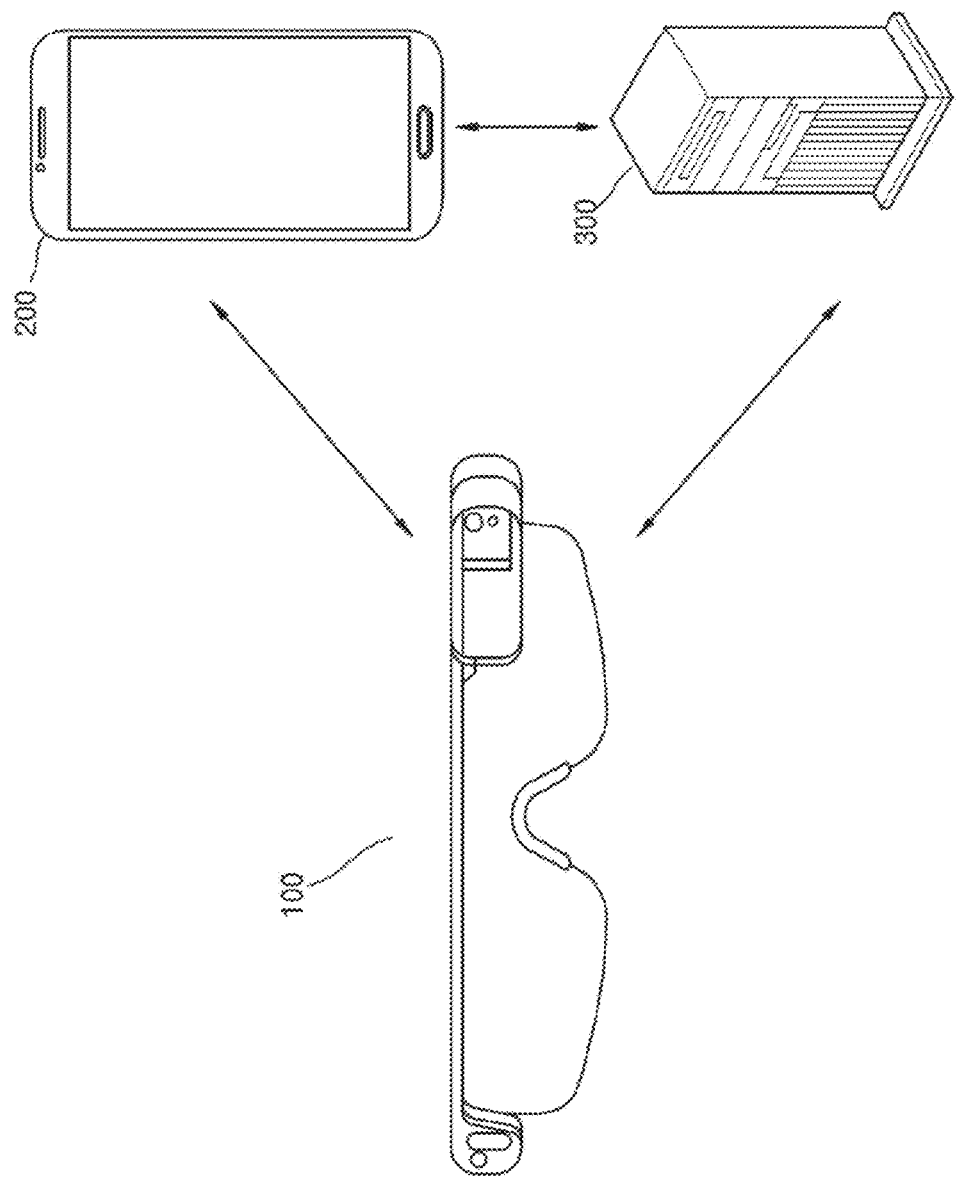

FIG. 5B

| MOVEMENT STATE | SENSOR | MOVEMENT STATE (STANDARD FOR DETERMINING STATE) |
|---|---|---|
| STANDSTILL STATE | ACCELERATION SENSOR | SPEED < FIRST SPEED (1 KM/H) |
| | POSITION SENSOR | POSITION VARIATION < FIRST VARIATION VALUE |
| | TILT SENSOR | TILT VARIATION < FIRST THRESHOLD VALUE |
| | PRESSURE SENSOR | PRESSURE < FIRST PRESSURE |
| | PERIPHERAL WEARABLE DEVICE (E.G., RUNNING SHOES, INSOLES) | SPEED INFORMATION AND PRESSURE INFORMATION RECEIVED FROM PERIPHERAL WEARABLE DEVICE |
| WALKING STATE | ACCELERATION SENSOR | FIRST SPEED (1 KM/H) ≤ SPEED < SECOND SPEED |
| | POSITION SENSOR | FIRST VARIATION ≤ POSITION VARIATION < SECOND VARIATION |
| | TILT SENSOR | FIRST THRESHOLD ≤ TILT VARIATION < SECOND THRESHOLD |
| | PRESSURE SENSOR | FIRST PRESSURE ≤ PRESSURE < SECOND PRESSURE |
| | PERIPHERAL WEARABLE DEVICE (E.G., RUNNING SHOES, INSOLES) | SPEED INFORMATION AND PRESSURE INFORMATION RECEIVED FROM PERIPHERAL WEARABLE DEVICE |
| RUNNING STATE | ACCELERATION SENSOR | SECOND SPEED ≤ SPEED |
| | POSITION SENSOR | SECOND VARIATION ≤ POSITION VARIATION |
| | TILT SENSOR | SECOND THRESHOLD ≤ TILT VARIATION |
| | PRESSURE SENSOR | SECOND PRESSURE ≤ PRESSURE |
| | PERIPHERAL WEARABLE DEVICE (E.G., RUNNING SHOES, INSOLES) | SPEED INFORMATION AND PRESSURE INFORMATION RECEIVED FROM PERIPHERAL WEARABLE DEVICE |
| STANDING STATE | ALTITUDE SENSOR (ATMOSPHERIC PRESSURE SENSOR) | ALTITUDE ≥ FIRST ALTITUDE VALUE |
| SITTING STATE | ALTITUDE SENSOR (ATMOSPHERIC PRESSURE SENSOR) | FIRST ALTITUDE > ALTITUDE ≥ SECOND ALTITUDE |
| LYING STATE | ALTITUDE SENSOR (ATMOSPHERIC PRESSURE SENSOR) | SECOND ALTITUDE > ALTITUDE |

FIG. 5C

| MOVEMENT STATE | SENSOR | MOVEMENT STATE (STANDARD FOR DETERMINING STATE) |
|---|---|---|
| HIKING STATE | ACCELERATION SENSOR, SENSOR (ATMOSPHERIC SENSOR) | ALTITUDE VARIATION ≥ THRESHOLD VALUE |
| | POSITION SENSOR | POSITION IS MOUNTAINOUS AREA. |
| | BIOMETRIC SENSOR | SWEAT SECRETION AMOUNT > THRESHOLD, TEMPERATURE VARIATION > THRESHOLD |
| | | AVERAGE PULSE RATE > THRESHOLD VALUE |
| | PERIPHERAL WEARABLE DEVICE (E.G., RUNNING SHOES, INSOLES) | SPEED INFORMATION, PRESSURE INFORMATION, AND ALTITUDE INFORMATION RECEIVED FROM PERIPHERAL WEARABLE DEVICE |
| SLEEPING STATE | IRIS SCAN SENSOR | IRIS IS NOT SCANNED FOR PREDETERMINED PERIOD OF TIME, NUMBER OF TIMES OF EYE BLINKING FOR PREDETERMINED PERIOD OF TIME < THRESHOLD VALUE |
| | IMAGE SENSOR | PUPILS ARE NOT DETECTED FOR PREDETERMINED PERIOD OF TIME. |
| | MICROPHONE | PATTERN OF SNORING NOISE IS SENSED. |
| | ACCELERATION SENSOR, TILT SENSOR | HEAT MOTION (ROTATION, ETC.) > THRESHOLD VALUE (DOZING STATE) |
| SPEAKING STATE (CONVERSATION STATE) | MICROPHONE | VOICE OF USER IS RECOGNIZED. |
| | | VOICE OF OTHER PERSON IS RECOGNIZED. |
| DRINKING STATE | SMELL SENSOR | ALCOHOL SMELL IS RECOGNIZED. |
| | TEMPERATURE SENSOR | TEMPERATURE VARIATION > THRESHOLD VALUE |
| DRIVING STATE | ACCELERATION SENSOR | SPEED VARIATION > THRESHOLD VALUE |
| | IMAGE SENSOR | WHEEL STEERING IS DETECTED. |
| | SHORT-RANGE COMMUNICATION MODULE (COMMUNICATION WITH CAR) | DRIVING INFORMATION OF USER IS IS RECEIVED FROM CAR. |
| COMMUTING STATE | POSITION SENSOR | POSITION RECOGNITION ACCORDING TO TIME |
| | CONTEXT INFORMATION IS USED | |

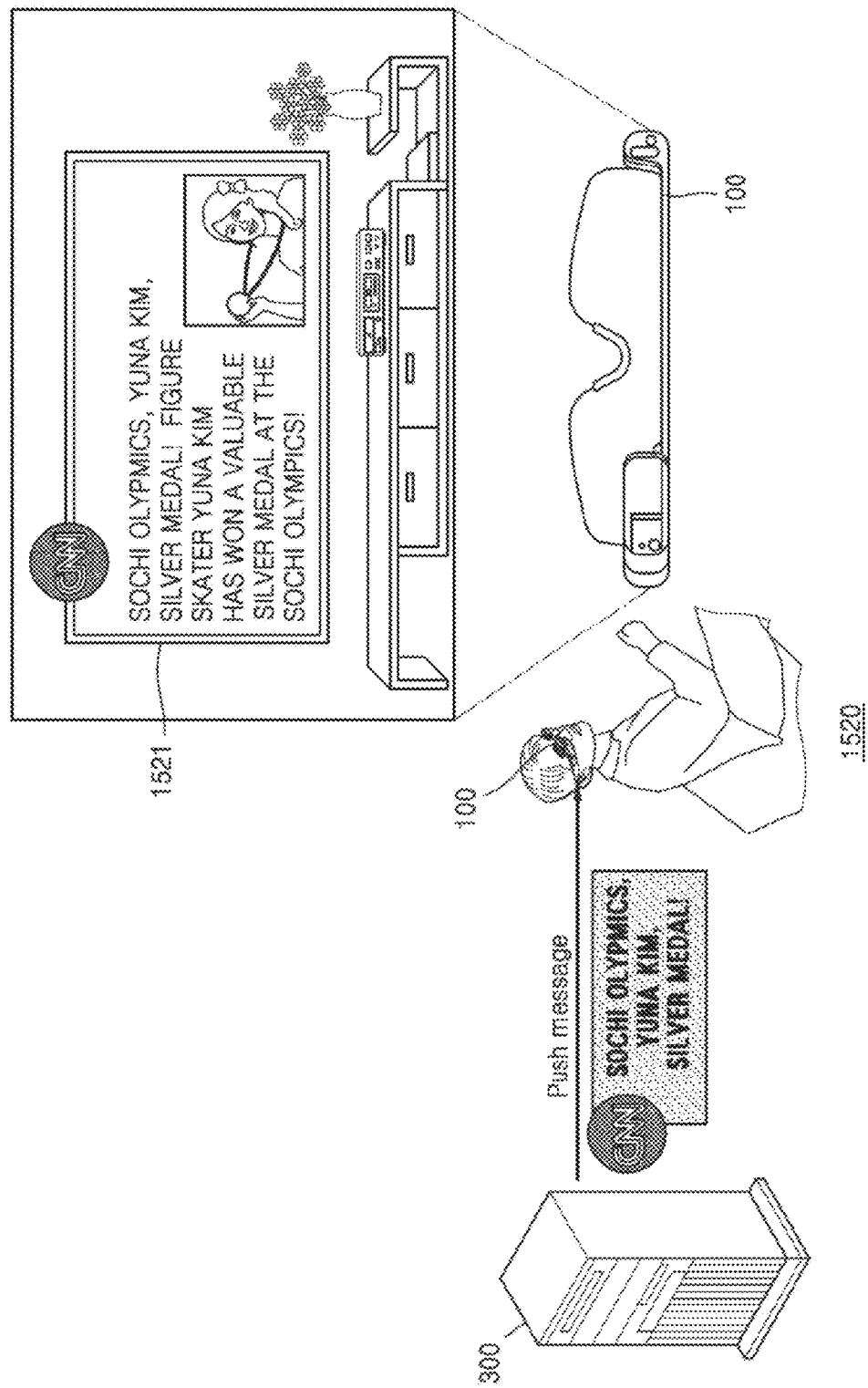

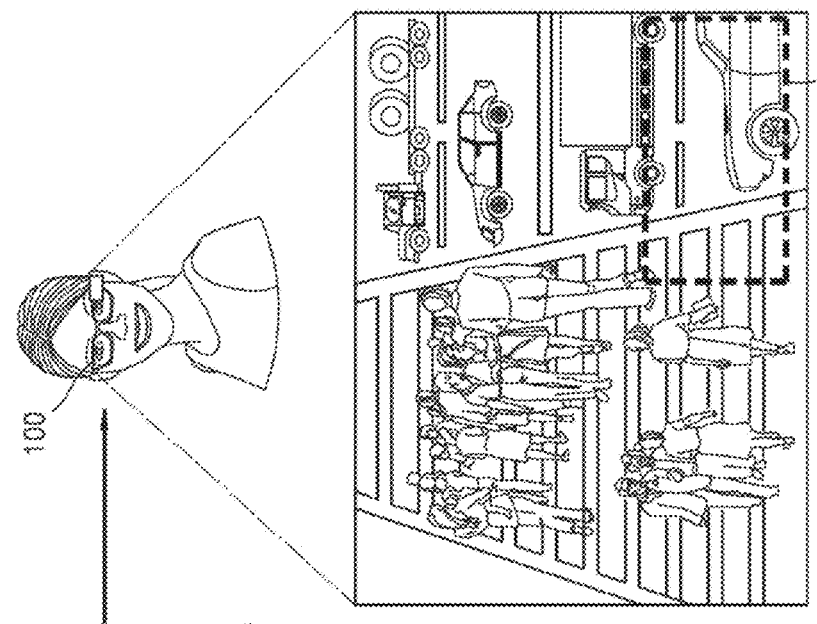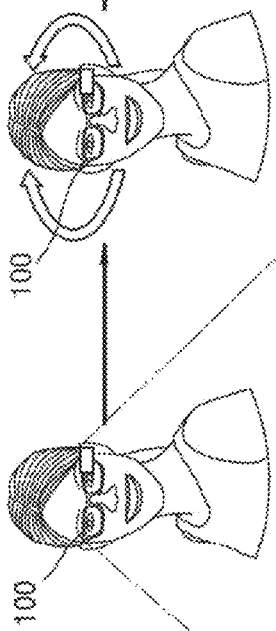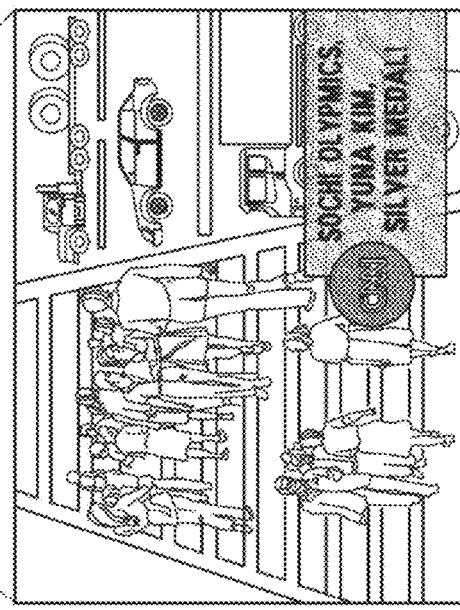

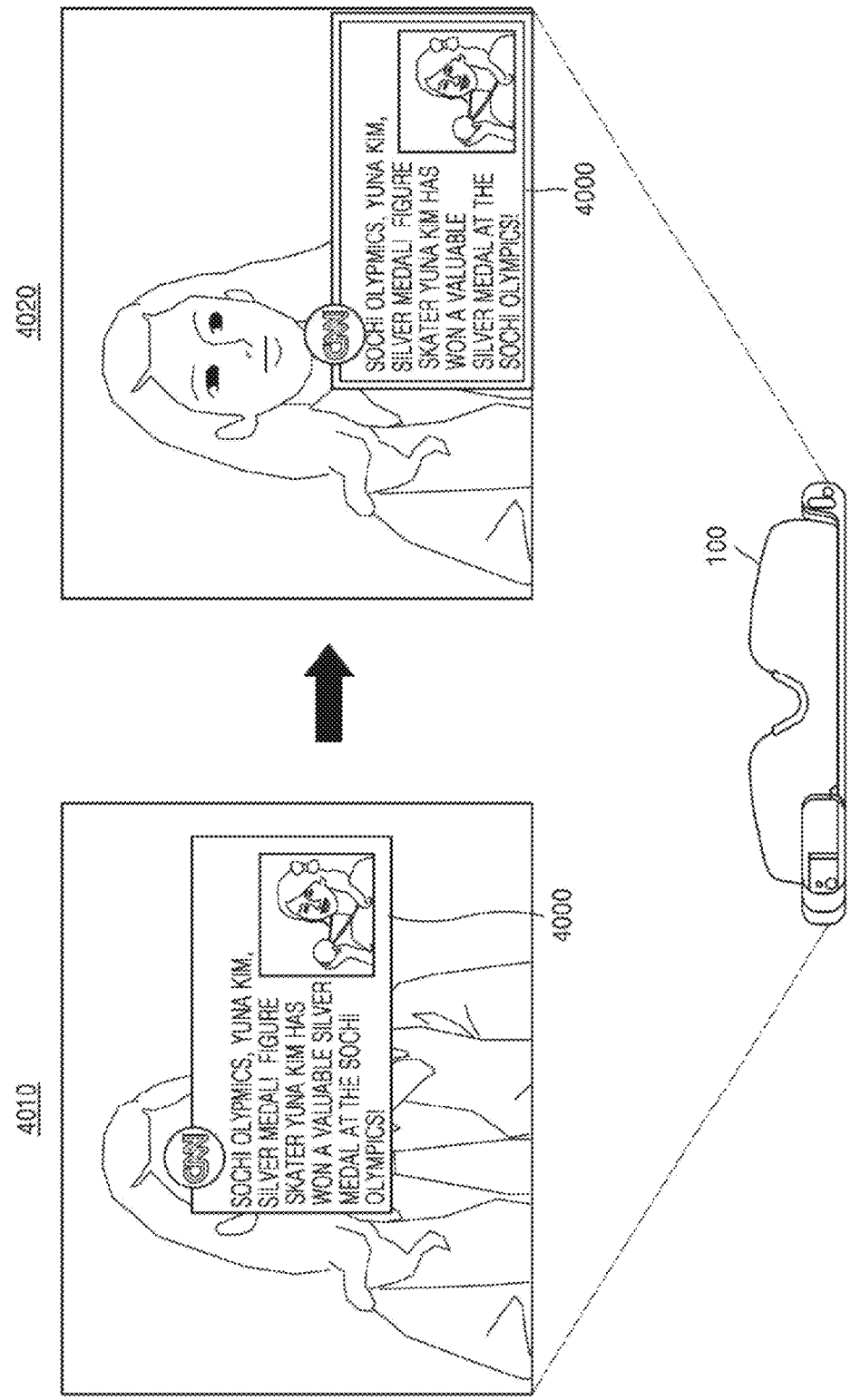

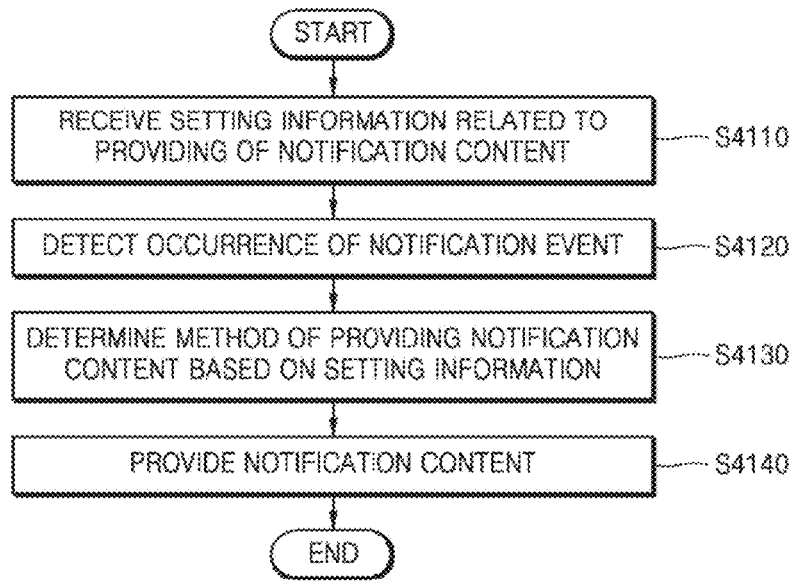

FIG. 48
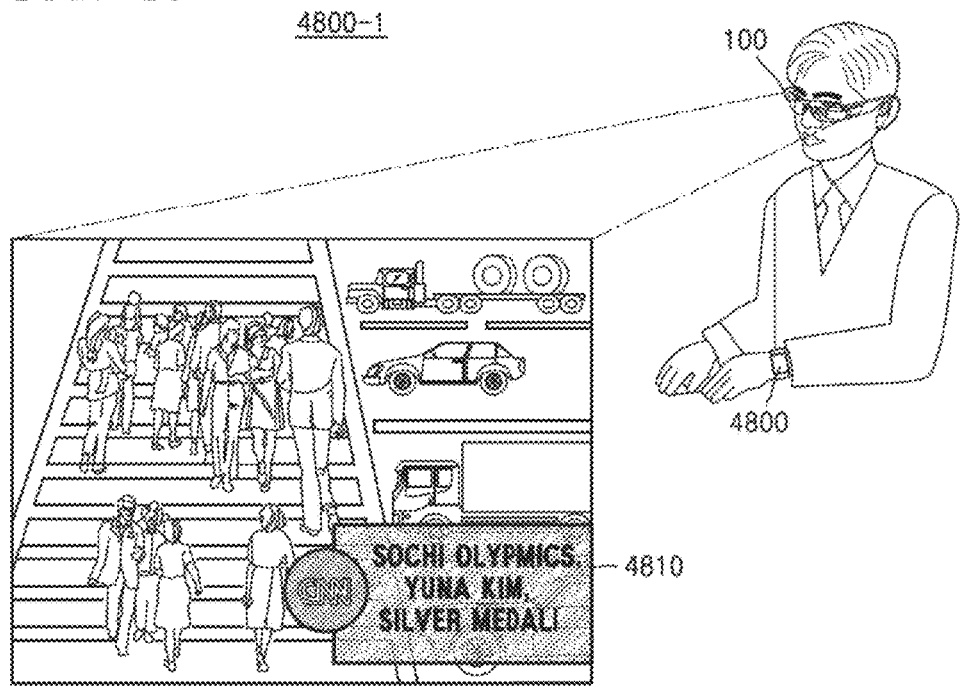
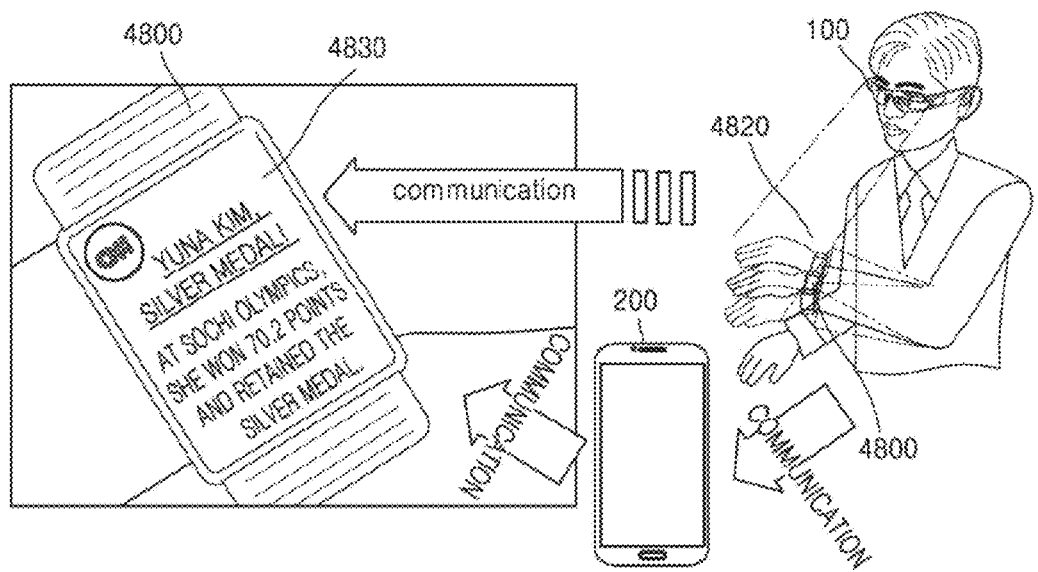

WEARABLE GLASSES AND METHOD OF PROVIDING CONTENT USING THE SAME

CROSS-REFERENCES TO RELATED APPLICATION

This application is a continuation application of U.S. application Ser. No. 14/815,082, filed Jul. 31, 2015, which claims the benefit of Korean Patent Application No. 10-2014-0098626, filed on Jul. 31, 2014, and Korean Patent Application No. 10-2015-0043300, filed on Mar. 27, 2015, in the Korean Intellectual Property Office, the disclosures of which are incorporated by reference herein in their entirety.

BACKGROUND

1. Field

Apparatuses, methods, and articles of manufacture consistent with the present disclosure relate to a wearable glasses and a method of providing content corresponding to a notification event via the wearable glasses.

2. Description of the Related Art

A wearable device is a device that a person can wear. As wearable devices have been actively developed, various types of thereof have been released or are expected to be released on the market. Examples of such wearable devices are wearable watches, wearable glasses, and wearable belts.

Wearable glasses can be worn like typical eyeglasses and provide a user with various information. While wearable glasses allow a user to use his/her hands freely, the view of the user may be obstructed by information displayed on the wearable glasses.

SUMMARY

According to an aspect of one or more exemplary embodiments, there is provided a wearable glasses comprising a sensing circuit configured to sense movement information of a user wearing the wearable glasses; a communication interface configured to receive notification message information; a display configured to display the notification message information within an angle of view of the user wearing the wearable glasses; and a controller configured to determine a movement state of the user based on the sensed movement information of the user and control the display to display the received notification message information according to the movement state of the user.

The controller may be further configured to determine whether the user is wearing the wearable glasses by using at least one sensor included in the sensing circuit, and control the sensing circuit to sense a movement of the user when it is determined that the user is wearing the wearable glasses.

The controller may be further configured to determine the movement state of the user by using at least one of acceleration information, tilt information, biometric information, altitude information, atmospheric pressure information, eyeball tracking information, and position information measured by the sensing circuit.

The controller may be further configured to determine the movement state of the user using movement information of the user received from an external device.

The controller may be further configured to determine a time to display the notification message information based on the movement state of the user and control the display to display the notification message information at the determined time.

The controller may be further configured to output the notification message information at a present time when a movement speed of the user is less than a threshold speed, and when the movement speed of the user is equal to or greater than the threshold speed, the controller may be further configured to determine to output the notification message information at a different time than the present time.

The different time may comprise at least one of a point of time when a user input for requesting to output the notification message information is received, a point of time when a movement state of the user is changed, and a point of time when a preset time has passed.

The controller may be further configured to determine a display form for displaying the notification message information based on a movement state of the user and control the display to display the notification message information according to the determined display form.

When a movement speed of the user is equal to or greater than a threshold speed, the controller may be further configured to display a portion of the notification message information, and when a movement speed of the user is less than the threshold speed, the controller may be further configured to display an entirety of the notification message information.

The controller may be further configured to determine at least one of an audio signal and a video signal as an output form of the notification message information according to environment information about an environment within a certain distance from the wearable glasses.

The environment information may include at least one of information about external sounds generated within the certain distance from the wearable glasses and information about an external image obtained by using an image sensor.

According to another aspect of one or more exemplary embodiments, there is provided a wearable glasses comprising a sensing circuit configured to sense a movement of a user and output a signal; a communication interface configured to receive notification message information; a display configured to display the notification message information; and a controller configured to control the display to display the received notification message information based on the signal output from the sensing circuit.

The controller may be further configured to determine whether the user is wearing the wearable glasses based on a signal output from at least one sensor included in the sensing circuit, and when it is determined that the user is wearing the wearable glasses, the controller may be further configured to control the sensing circuit to sense a movement of the user.

According to yet another aspect of one or more exemplary embodiments, there is provided a method of providing information, wherein the method is performed by a wearable glasses and comprises receiving notification message information; sensing movement information of a user wearing the wearable glasses; determining a movement state of the user by using sensed movement information of the user; and displaying the received notification message information according to the movement state of the user.

The sensing of movement information of the user may comprise determining whether the user is wearing the wearable glasses by using at least one sensor included in the wearable glasses; and sensing the movement information of the user when it is determined that the user is wearing the wearable glasses.

The displaying of the received notification message information may comprise determining a time to display the notification message information; and displaying the notification message information at the determined time.

The determining a time to display the notification message information may comprise determining to output the notification message information at a present time when a movement speed of the user is less than a threshold speed and to output the notification message information at a different time than the present time when the movement speed of the user is equal to or greater than the threshold speed.

The displaying of the received notification message information may comprise determining a display form for displaying the notification message information; and displaying the notification message information according to the determined display form.

The determining of the display form may comprise determining to output a portion of the notification message information when a movement speed of the user is equal to or greater than a threshold speed and to output an entirety of the notification message information when a movement speed of the user is less than the threshold speed.

The determining of the display form may comprise obtaining environment information about an environment within a certain distance from the wearable glasses; and determining to provide the notification message information in the form of at least one of an audio signal and a video signal according to the obtained environment information.

The wearable glasses may comprise wearable glasses.

According to yet another aspect of one or more exemplary embodiments, there is provided a wearable glasses comprising a sensor configured to sense movement information of a user wearing the wearable glasses; and a controller configured to determine a movement state of the user based on the sensed movement information and control a display to display an entirety of the received notification message when the movement state indicates the user is in a safe condition, none of the received notification message when the movement state indicates that the user is in a dangerous situation, and a portion of the received notification message when the movement state indicates that the user is in neither the safe condition nor the dangerous situation.

When the movement state indicates that the user is in the dangerous situation, the controller may store the received notification message for display at different time than a present time.

When the movement state indicates that the user is in the dangerous situation, the controller may control the display to display the received notification information when the movement state indicates that the user is no longer in the dangerous situation.

The sensor may be one or more of an acceleration sensor, a tilt sensor, a biometric information sensor, an altitude sensor, an atmospheric pressure sensor, an eyeball tracking sensor, and a position sensor.

BRIEF DESCRIPTION OF THE DRAWINGS

These and/or other aspects will become apparent and more readily appreciated from the following description of the exemplary embodiments, taken in conjunction with the accompanying drawings in which:

FIGS. 2 and 3 illustrate diagrams for describing an external appearance of a wearable glasses according to exemplary embodiments;

FIG. 4 illustrates a diagram for describing a notification system according to an exemplary embodiment;

FIGS. 5B and 5C illustrate diagrams for describing a method used by a wearable glasses to determine a movement state of a user based on movement information of the user, according to an exemplary embodiment;

FIGS. 15A and 15B illustrate diagrams for describing an example of adjusting, by a wearable glasses, a time and a method to output content corresponding to an notification event based on a movement speed of a user, according to an exemplary embodiment;

FIG. 25 illustrates a diagram for describing an example of blocking, by a wearable glasses which has output a portion of content, output of the content based on a user input, according to an exemplary embodiment;

FIG. 40 illustrates a diagram for describing an example of changing, by a wearable glasses, an output position of content corresponding to a notification event, according to an exemplary embodiment;

FIG. 41 illustrates a flowchart of a method used by a wearable glasses to determine a method of providing content corresponding to an event based on setting information of a user, according to an exemplary embodiment;

FIG. 42 illustrates an example of setting information related to output of content corresponding to an event, according to an exemplary embodiment;

FIG. 48 illustrates an example of outputting, by a wearable glasses, content corresponding to a notification event based on a user input, according to an exemplary embodiment;

DETAILED DESCRIPTION

Figure 1:
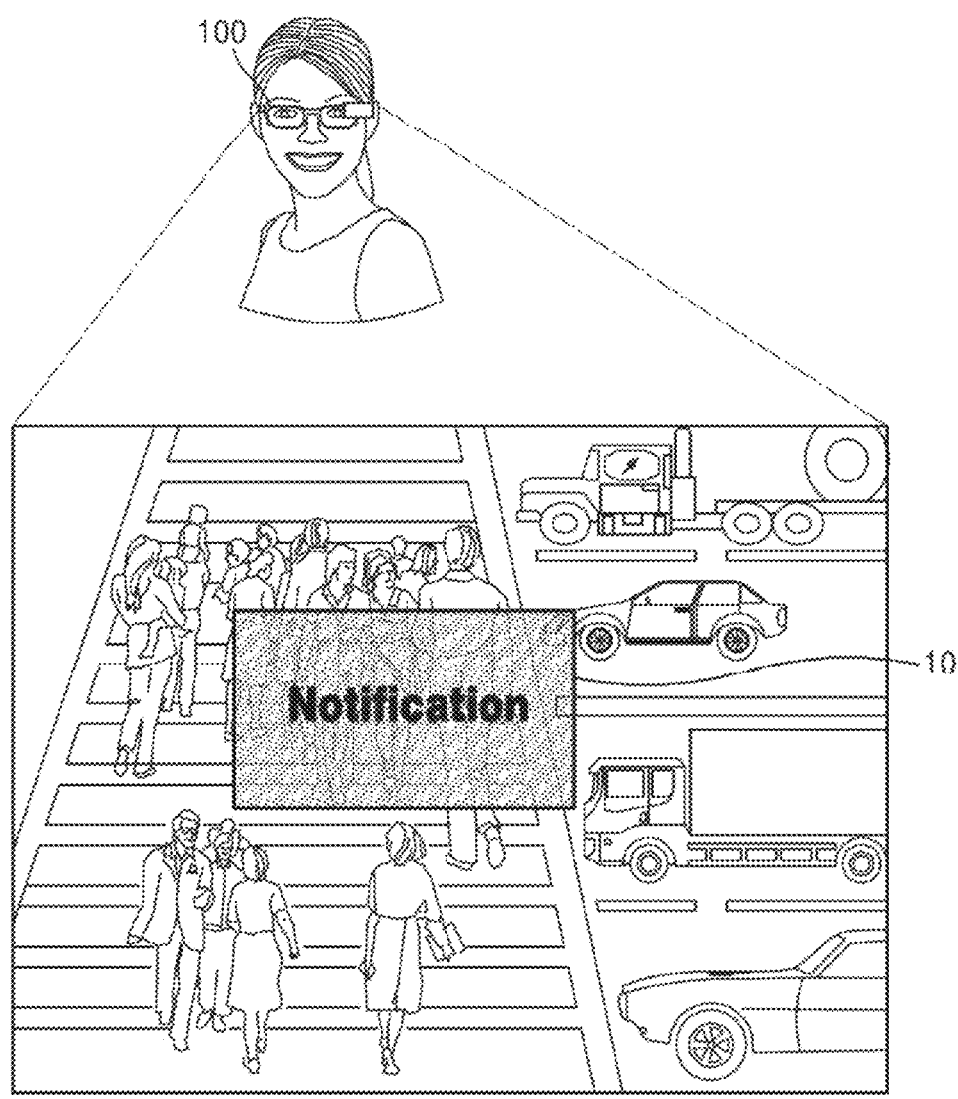
FIG. 1 illustrates a diagram for describing a method of operating a wearable glasses according to an exemplary embodiment.

Terms used herein will now be briefly described, and then exemplary embodiments will be described in detail.

All terms including descriptive or technical terms which are used herein should be construed as having meanings that are understood to one of ordinary skill in the art. However, the terms may have different meanings according to an intention of one of ordinary skill in the art, precedent cases, or the appearance of new technologies. Also, some terms may be selected by the applicant, and in this case, the meaning of the selected terms will be described in detail in the detailed description. Thus, the terms used herein have to be defined based on the meaning of the terms together with the description throughout the specification.

Also, when a part "includes" or "comprises" an element, unless there is a particular description contrary thereto, the part may further include other elements, not excluding the other elements. In the following description, terms such as "unit" and "module" indicate a unit for processing at least one function or operation, wherein the unit and the block may be embodied as hardware or software, or may be embodied by combining hardware and software.

Exemplary embodiments will now be described more fully with reference to the accompanying drawings. However, the exemplary embodiments may be embodied in many different forms, and should not be construed as being limited to the exemplary embodiments set forth herein; rather, these exemplary embodiments are provided so that this disclosure will be thorough and complete, and will fully convey the concept of the one or more exemplary embodiments to those of ordinary skill in the art. In the following description, well-known functions or constructions are not described in detail because they would obscure the exemplary embodiments with unnecessary detail, and like reference numerals in the drawings denote like or similar elements throughout the specification.

As used herein, the term "and/or" includes any and all combinations of one or more of the associated listed items. Expressions such as "at least one of," when preceding a list of elements, modify the entire list of elements and do not modify the individual elements of the list.

FIG. 1 illustrates a diagram for describing a method of operating a wearable glasses according to an exemplary embodiment.

According to an exemplary embodiment, the wearable glasses 100 is a display apparatus that is worn on a user's head to provide an image in front of the eyes of the user. The inventive concept is not limited to glasses-type wearable devices (e.g., the wearable glasses 100), but is also applicable to a head mounted display (HMD) apparatus, a portion of a main body of which is fixed to the head of a user so as to display information within an angle of view of the user.

According to an exemplary embodiment, the HMD apparatus may be implemented in various forms. For example, the HMD apparatus may be implemented as eyeglasses, a helmet, and a hat, but is not limited thereto.

According to an exemplary embodiment, the wearable glasses 100 may provide content 10 corresponding to a notification event. In the present specification, content providing may include, for example, displaying content, replaying content, or outputting content.

In the present specification, a notification event may refer to an event at which information to be sent to a user is generated. A notification event may be, for example, an event for notifying the user of a situation that occurs in the wearable glasses 100 or outside the wearable glasses 100.

For example, a notification event may include at least one of a schedule notification event, a tourist event, a traffic information notification event, an advertisement notification event, an update notification event, a recommended content notification event, a health information notification event, and an emergency notification event, but is not limited thereto.

In the present specification, 'content corresponding to a notification event' may refer to content that is generated to be sent to a user. 'Content corresponding to a notification event' may be generated in the wearable glasses 100 or may be obtained from the outside of the wearable glasses 100. For example, when a notification event has occurred, the wearable glasses 100 may generate content 10 corresponding to the notification event. Also, the wearable glasses 100 may receive content corresponding to a notification event from an external device or a server. Hereinafter, 'content corresponding to a notification event' may also be referred to as 'notification message information.'

Throughout the specification, 'content' refers to digital information provided via a wired or wireless communication network. Content according to an exemplary embodiment may include, for example, video content, still image content (e.g., pictures, drawings, etc.), text content (e.g., news articles, letters, webpages, etc.), music content (e.g., music, instrumentals, radio broadcasts, etc.), but is not limited thereto.

According to an exemplary embodiment, 'content corresponding to a notification event' may include at least one of schedule notification content (e.g., medication notification comment, schedule notification comment, etc.), tourist attraction notification content (e.g., explanation content of historical sites, opening and closing times for tourist attractions, etc.), traffic information notification content (e.g., bus running schedule, notification of congestion, etc.), advertisement notification content (e.g., coupons, sales start/end times, etc.), update notification content (e.g., update notification for software or hardware, update information for other notification content—for example update of a tourist attraction open/close schedule, etc.), recommended content (e.g., recommended book information, recommended music information, etc.), health information notification content (e.g., blood sugar level information, heart rate information, temperature information, etc.), and emergency notification content (e.g., a fire nearby, an earthquake occurrence, etc.), but is not limited thereto. Hereinafter, 'content corresponding to a notification event' may also be referred to as 'notification content' for convenience of description.

According to an exemplary embodiment, the wearable glasses 100 may provide notification content in various forms. For example, the wearable glasses 100 may display notification content on a display in the form of augmented reality (AR), mixed reality (MR) or virtual reality (VR).

When a wearable glasses immediately outputs notification content when occurrence of a notification event is sensed, without taking the user's situation into account, the user may be exposed to a dangerous situation. Thus, according to an exemplary embodiment, hereinafter, a method of the wearable glasses 100 determining a time to provide notification content and a form of providing the notification content based on movement information (also referred to as 'movement state' or 'movement pattern information' below) of a user will be described. First, an external appearance of the wearable glasses 100 will be described in detail with reference to FIGS. 2 and 3.

FIGS. 2 and 3 illustrate diagrams for describing an external appearance of the wearable glasses 100 according to exemplary embodiments. According to the exemplary embodiments of FIGS. 2 and 3, it is assumed that the wearable glasses 100 is in the form of glasses.

Referring to FIG. 2, the wearable glasses 100 may include a frame 101, a lens 102, a power source 103, a display 111, a sound output unit 112, a controller 120, a user input unit 130, an image sensor 161, and a depth sensor 154. However, the elements illustrated in FIG. 2 are not all necessary elements of the wearable glasses 100. The wearable glasses 100 may include more or less elements than those illustrated in FIG. 2. For example, according to some exemplary embodiments, the wearable glasses 100 may omit the lens 102.

Some of the elements included in the wearable glasses 100 may be mounted inside the wearable glasses 100, and some other elements may be mounted on an outer portion of the wearable glasses 100. For example, the power source 103 and the controller 120 may be mounted inside the wearable glasses 100. The display 111, the sound output unit 112, the user input unit 130, the image sensor 161, and the depth sensor 154 may be mounted on the outer portion of the wearable glasses 100. The elements mounted inside the wearable glasses 100 and the elements mounted on the outer portion of the wearable glasses 100 are not limited to the above-described elements.

The frame 101 may include a material such as a plastic and/or metal and may include wirings that connect the elements included in the wearable glasses 100 to one another.

According to an exemplary embodiment, the frame 101 may include a connection member (not shown) to have a partially foldable structure. Also, according to an exemplary embodiment, the wearable glasses 100 may further include an elastic band that allows a user to wear the wearable glasses 100 on the head regardless of the size of the head.

Meanwhile, according to an exemplary embodiment, the lens 102 may be detachably mounted in the frame.

The lens 102 may include a transparent material that allows the user to see an area in front of him/her. For example, the lens 102 may include a plastic such as polycarbonate or a glass material, but is not limited thereto.

According to an exemplary embodiment, the lens 102 may include at least one of anti-light reflection and anti-dazzling coating, anti-fog coating, and anti-ultraviolet (UV) coating.

The power source 103 may supply power to each element of the wearable glasses 100 so that the wearable glasses can operate. The power source may include a rechargeable battery (not shown) and a cable (not shown) or a cable port (not shown) through which power may be received from the outside.

The power source 103 may be disposed at various positions on the frame 101 of the wearable glasses 100. For example, the power source 103 may be disposed at an end of the frame 101 of the wearable glasses 100.

The display 111 may include a semi-transparent optical waveguide (e.g., a prism). The semi-transparent optical waveguide may reflect light output from a projector to focus an image on fovea of the retina of the eyes of the user. According to an exemplary embodiment, the display 111 may display content corresponding to a notification event when the notification event has occurred. The content may be notification message information. The notification message information may be an advertisement message to be advertised to an unspecified number of persons or may be an advertisement message that is addressed just to the user of the wearable glasses 100. Also, according to an exemplary embodiment, the notification message information may be related to an application. The application may be predetermined. The notification message information may be received via a communication interface. Also, the notification message information may be generated inside the wearable glasses 100. For example, a message indicating a battery remaining amount may be generated inside the wearable glasses 100. As another example, a message indicating a current sound level or brightness level may be generated inside the wearable glasses 100. As yet another example, a message indicating a current tilt angle of the wearable glasses 100 or diagnostic information for the wearable glasses 100 may be generated inside the wearable glasses 100.

Also, the display 111 may be used to replace the lens 102 or a portion of the lens 102 according to the inventive concept. That is, the display 111 may be used in place of the lens 102 or a portion of the lens 102.

In regard to wearable glasses, the lens 102 and a display area may be the same. In this case, the notification message information may be received while the user is looking at an actual object through the lens 102, and the received notification message information may be displayed on the lens 102. If the notification message information is displayed outside an angle of view of the user from among the entire area of the lens 102, the user has to move the pupils to see the notification message information. On the other hand, if the notification message information is displayed on an area corresponding to an angle of view of the user from among the entire area of the lens 102, the user does not have to turn his/her head or move his/her pupils to view the notification message information.

Thus, when the user is wearing the wearable glasses 100 in the form of wearable glasses, a first area corresponding to an angle of view of the user may be set on the display 111, and the notification message information may be displayed in the first area. An angle of view of a user may refer to an angle or range within which the user is able to perceive an object without turning his/her head or his/her pupils while the user is looking in front of him or her. For example, an angle of view of a user may be 45 degrees in each of upward and downward directions and 90 degrees in each of left and right directions, but is not limited thereto. The angle of view may be determined experimentally for each user. Alternatively, the angle of view may be set at the manufacturer, or may be set by the user using settings of the wearable glasses 100.

According to an exemplary embodiment, a first area corresponding to an angle of view of a user may be the same as or smaller than the entire display area. Also, a first area corresponding to an angle of view of a user may be determined or adjusted based on a distance from the eyes of the user to the lens 102.

The sound output unit 112 may be configured in the form of earphones that can be worn on the ears of the user. In this case, the sound output unit 112 may be mounted in the wearable glasses 100. For example, the sound output unit 112 may include a bone conduction speaker. In some exemplary embodiments, the sound output unit 112 may expend part-way into the ears of the user.

Also, the sound output unit 112 may be detachably mounted to the wearable glasses 100. In this case, the user of the wearable glasses 100 may selectively mount the sound output unit 112 on the ears.

The controller 120 may be connected to the wearable glasses 100 in a wired or wireless manner so as to control each element of the wearable glasses 100. For example, the controller 120 may receive data from the image sensor 161 or the user input unit 130, analyze the received data, and output notification content through at least one of the display 111 and the sound output unit 112.

The user input unit 130 receives a user input. A user input may include, for example, a command or a request from a user to start or end an operation of the wearable glasses 100. The operation may be predetermined.

According to an exemplary embodiment, the user input unit 130 may include a touch panel to receive a touch input. Throughout the specification, a "touch input" refers to a gesture performed by a user on the touch panel to control the wearable glasses 100. For example, a touch input described in the present specification may be a tap, a touch and hold, a double tap, a drag, panning, a flick, and a drag and drop.

According to an exemplary embodiment, the user input unit 130 may include a bending sensor for receiving a bending input. Throughout the specification, a "bending input" refers to a user input for bending the whole HMS apparatus 100 or for bending a partial area of the wearable glasses 100 to control the wearable glasses 100. According to an exemplary embodiment, the wearable glasses 100 may sense by using a bending sensor, for example, a bending position (coordinate values), a bending direction, a bending angle, a bending speed, the number of times of bending, a time when a bending operation is generated or a period for maintaining a bending operation, etc.

According to an exemplary embodiment, the user input unit 130 may receive a multiple input. Throughout the specification, a "multiple input" refers to combination of at least two input methods. For example, the wearable glasses 100 may receive a touch input and a motion input of a user or may receive a touch input and a sound input of a user. Also, the wearable glasses 100 may receive a touch input and an eyeball input of a user. An eyeball input refers to a user input for adjusting eye blinking, gaze positions, an eyeball movement speed or the like to control the wearable glasses 100.

Meanwhile, according to an exemplary embodiment, the wearable glasses 100 may further include a microphone (not shown). The microphone may receive a sound corresponding to a user's voice and/or environmental sounds generated around the wearable glasses 100.

The image sensor 161 may be implemented using a compact camera such as a camera used in smartphones or webcams. The image sensor 161 may be mounted near the eyes of the user when the user wears the wearable glasses 100 and may capture an image similar to an image received through the eyes of a user.

According to an exemplary embodiment, the wearable glasses 100 may further include the depth sensor 154. The wearable glasses 100 may recognize a three-dimensional spatial gesture of a user. For example, the depth sensor 154 may measure a depth value or the like of an inputting instrument (e.g., a hand or hands, a finger or fingers, or an electronic pen, etc.).

According to an exemplary embodiment, the depth sensor 154 may obtain a depth value of an inputting instrument by using various methods. For example, the depth sensor 154 may measure a depth value by using at least one of a time of flight (TOF) method, a stereoscopic vision method, and a structured light pattern method.

According to the TOF method, a time taken for light to be reflected by an object and to return to a light source is analyzed to measure a distance from the light source to the object. In a TOF system, an infrared LED emits infrared light, and a time taken for the light to be reflected by an object and return to the infrared LED is measured by using an infrared camera. In this case, the depth sensor 154 may include an infrared LED and an infrared camera. The depth sensor 154 may acquire distance information as a video by repeatedly emitting and receiving light several tens of times per second. Also, the depth sensor 154 may create a depth map that expresses distance information via luminance or colors of pixels. The sample time of several tens of times per second is only an example, and the sample time may be greater or less than several tens of times per second.

According to the stereoscopic vision method, two cameras are used to capture a stereoscopic image of an object. In this case, the depth sensor 154 may include two cameras. The depth sensor 154 may calculate a distance between the depth sensor 154 and the object based on the triangulation principle by using difference information regarding images viewed from the respective cameras. Humans perceive stereoscopic images based on a difference between respective images viewed by the left eye and the right eye, and the depth sensor 154 measures a distance between the depth sensor 154 and the object by the respective cameras in a similar manner to the principle of human eyes. For example, if a distance between the depth sensor 154 and the object is small, a difference between images respectively captured by two cameras is great, and if a distance between the depth sensor 154 and the object is great, a difference between images respectively captured by two cameras is small.

According to the structured light pattern method, patterned light is emitted from a light source to an object and a location of patterns formed on a surface of the object is analyzed to measure a distance from the light source to the object. The depth sensor 154 typically emits linear or dot-pattern light to an object and patterns vary according to curves of the object.

The structured light pattern method may correspond to a stereoscopic vision method in which one of two cameras is replaced by an optical projector. For example, the depth sensor 154 may calculate a depth map in real time by analyzing a position of a pattern formed by light emitted from an infrared projector on a surface of an object by using a certain algorithm.

According to an exemplary embodiment, the image sensor 161 and the depth sensor 154 may be different sensors. According to another exemplary embodiment, the image sensor 161 and the depth sensor 154 may be integrated in a single sensor.

According to an exemplary embodiment, the wearable glasses 100 may further include other various sensors besides the image sensor 161 and the depth sensor 154.

For example, the wearable glasses 100 may include sensors for sensing a motion input of a user. Throughout the specification, a "motion input" refers to a motion applied to the wearable glasses 100 by a user to control the wearable glasses 100. For example, a motion input may include a user input for rotating the wearable glasses 100, tilting the wearable glasses 100, or moving the wearable glasses 100 in an upward or downward direction or to the left or the right. The wearable glasses 100 may sense a motion of a user by using, for example, an acceleration sensor, a tilt sensor, a gyro sensor, or a 3-axis magnetic sensor. The motion may be preset by the user. For example, a user may set that a certain tilt angle corresponds to a certain input.

Also, the wearable glasses 100 may include a sensor for sensing whether the user is wearing the wearable glasses 100. For example, the wearable glasses 100 may include a temperature sensor, a pressure sensor, an acceleration sensor, a proximity sensor, or an iris scan sensor.

The wearable glasses 100 may further include an eyeball-tracking camera (not shown) that faces the face of the user.

The eyeball-tracking camera may include an infrared camera. The eyeball-tracking camera may detect a gaze of the user by tracking the pupil of the user.

Referring to FIG. 3, the wearable glasses 100 may be configured such that the lens 102 functions as the display 111. In this case, the lens 102 may be formed of a transparent display or a semi-transparent display. When the lens 102 is formed of a semi-transparent display, the lens 102 may be formed of at least one of an optical wave guide (e.g., a prism), an electroluminescent display, and a liquid crystal display, but is not limited thereto.

While the wearable glasses 100 implemented using glasses is described with reference to FIGS. 2 and 3, the wearable glasses 100 is not limited thereto. For example, the wearable glasses 100 may be attached to a helmet structure or applied in the form of goggles.

According to an exemplary embodiment, the wearable glasses 100 may be a stand-alone device that is operable without help of other devices. Also, the wearable glasses 100 may be a device linked with a mobile terminal or a cloud server. Hereinafter, an exemplary embodiment in which the wearable glasses 100 is linked with other devices will be described with reference to FIG. 4.

FIG. 4 illustrates a diagram for describing a notification system according to an exemplary embodiment.

Referring to FIG. 4, the notification providing system according to an exemplary embodiment may include a wearable glasses 100, a mobile terminal 200, and a server 300. However, not all of elements illustrated in FIG. 4 are essential elements of the notification providing system. The notification providing system may be implemented using more elements or fewer elements than the elements illustrated in FIG. 4. For example, the notification providing system may be implemented using the wearable glasses 100 and the mobile terminal 200 omitting the server 300, or using the wearable glasses 100 and the server 300 omitting the mobile terminal 200.

The wearable glasses 100 may be communicatively connected to the mobile terminal 200 or the server 300. For example, the wearable glasses 100 may perform short-range communication with the mobile terminal 200. Examples of short-range communication are Wi-Fi, Near Field Communication (NFC), Bluetooth, Bluetooth Low Energy (BLE), Wi-Fi Direct (WFD), and Ultra wideband (UWB), but are not limited thereto. The wearable glasses 100 may be connected to the server 300 via wireless communication or mobile communication. Moreover, in some exemplary embodiments, the wearable glasses 100 may include a plurality of communication methods. For example, the wearable glasses 100 may include both short-range communication and wireless communication, or may include a plurality of short-range communication methods.

The mobile terminal 200 may transmit data to the wearable glasses 100 or receive data from the wearable glasses 100. For example, the mobile terminal 200 may transmit a notification message or a control command to the wearable glasses 100. The data may be predetermined.

The mobile terminal 200 may be implemented in various forms. For example, the mobile terminal 200 described in the present specification may be a mobile phone, a smartphone, a laptop computer, a tablet PC, an e-book terminal, a digital broadcasting terminal, a personal digital assistant (PDA), a portable multimedia player (PMP), a navigation device, a MP3 player, or a digital camera, but is not limited thereto.

The server 300 may be a cloud server that controls the wearable glasses 100. Also, the server 300 may be a content provider providing a notification message.

According to an exemplary embodiment, the server 300 may include an intelligence engine and analyze a movement of a user by using the intelligence engine. An operation of analyzing a movement of a user, performed by the server 300 will be described in detail later with reference to FIG. 13. A movement of the user may be analyzed, other than by using the server 300, by using the wearable glasses 100 or the mobile terminal 200 that is connected to the wearable glasses 100 via short-range communication or is communicatively connected to the wearable glasses 100.

In addition, the movement of the user analyzed by using the server 300 may be directly transmitted to the wearable glasses 100 or may be transmitted to the wearable glasses 100 via the mobile terminal 200 that is connected to the wearable glasses 100 via short-range communication or is communicatively connected to the wearable glasses 100.

Hereinafter, a method of a wearable glasses 100 providing notification content based on movement information of a user, according to an exemplary embodiment, will be described in detail with reference to FIGS. 5A through 5C.

Figure 5A:
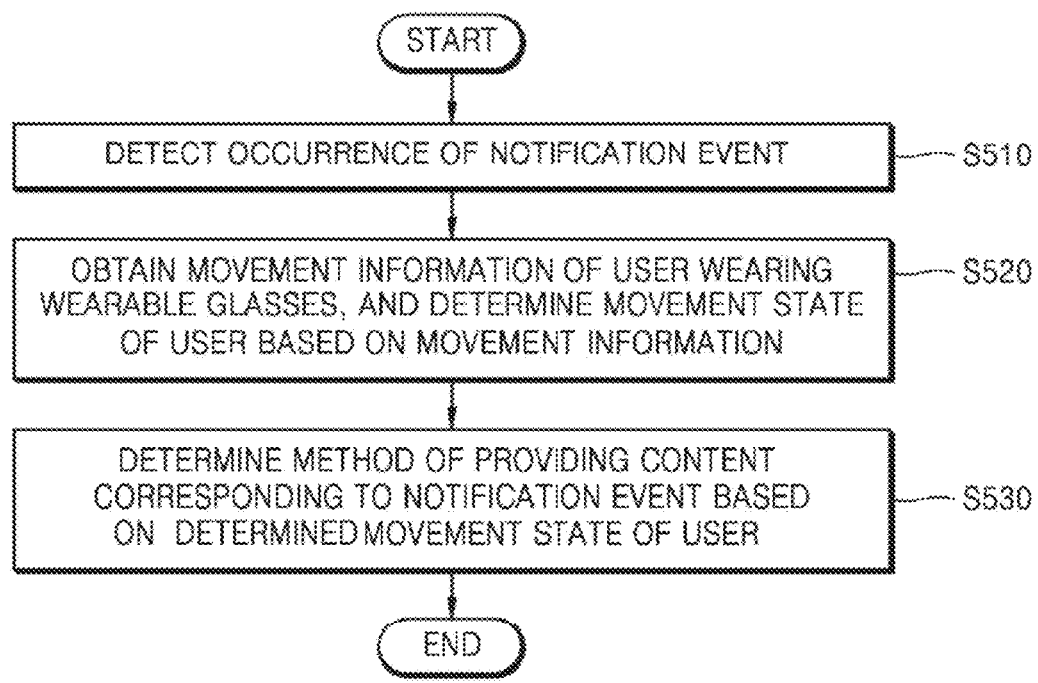
FIG. 5A illustrates a flowchart of a method used by a wearable glasses to provide content based on movement information of a user, according to an exemplary embodiment.

FIG. 5A illustrates a flowchart of a method used by a wearable glasses to provide content based on movement information of a user, according to an exemplary embodiment.

In operation S510, the wearable glasses 100 may detect an occurrence of a notification event.

According to an exemplary embodiment, the wearable glasses 100 may sense that internal system notification information or external notification information to be notified to the user is generated. For example, when a battery remaining amount is equal to a threshold value or less, the wearable glasses 100 may sense that an event for displaying a notification message regarding the battery remaining amount is generated.

Also, when receiving notification message information from the mobile terminal 200 or the server 300, the wearable glasses 100 may sense that an event for outputting the notification message information has occurred. Here, the wearable glasses 100 may receive notification message information via a communication interface.

Also, when an event for outputting notification message information has occurred, the wearable glasses 100 may change a color of the display 111. That is, the controller 120 may control the display 111 to change the color thereof based on reception of the notification message information.

For example, when a notification message has arrived, the display 111 may display the entire screen in, for example, orange for one second. As the entire display 111 is changed to orange, the user may sense that a notification message has arrived. However, this is only an example, and alternatively, the display 111 may display a portion of the screen in a certain color. Additionally, the time for displaying the notification message is also only an example, and the notification message may be displayed for more or less than one second.

In operation S520, upon detecting occurrence of a notification event, the wearable glasses 100 may obtain movement information of the user who is wearing the wearable glasses 100, and determine a movement state of the user based on the movement information.

Movement information of a user may be information about movement of a user who is wearing the wearable glasses 100. Movement information of a user may be information about movement of a user in a narrow sense.

Alternatively, or additionally, the movement information may include changes of biometric information of the user in a broad sense. For example, movement information of a user may include one or more of information about a movement of a user, movement speed information of the user, movement direction information of the user, tilt information of the user, altitude information of the user, biometric information of the user (e.g., body temperature information, pulse rate information, sweat secretion information, etc.), eyeball-tracking information of the user (e.g., pupil recognition information, eye blinking frequency information, eye blinking speed information, gaze direction information, etc.), and user position information (e.g., GPS coordinates information, regional information, building information, information about a variation in positions for a time period, etc.), but is not limited thereto. Movement information of a user may also include user voice information perceived through a microphone while the user is speaking, alcohol smell information measured based on user's drinking or the like.

According to an exemplary embodiment, the wearable glasses 100 may sense movement information of a user by using at least one sensor included in the wearable glasses 100. For example, the wearable glasses 100 may sense movement information of a user by using at least one of an acceleration sensor, a position sensor, a tilt sensor, a pressure sensor, an altitude (atmospheric pressure) sensor, a biometric sensor, an iris scan sensor, an image sensor, a microphone, a smell sensor, and a temperature sensor.

Also, the wearable glasses 100 may determine a movement state of a user based on movement information of a user. A movement state of a user may include, for example, a walking state, a standstill state, a running state, a sleeping state, a driving state, a commuting state, a speaking state (or conversation state), or an exercise state (e.g., jogging, swimming, tennis, basketball, or hiking) but is not limited thereto. An example of determining a movement state of a user based on user movement information, performed by the wearable glasses 100, will be described in detail.

FIGS. 5B and 5C illustrate diagrams for describing a method used by a wearable glasses to determine a movement state of a user based on movement information of the user, according to an exemplary embodiment.

Referring to FIGS. 5B and 5C, the wearable glasses 100 may determine whether the user is in a standstill state or a running state by using at least one of an acceleration sensor, a tilt sensor, a position sensor, and a pressure sensor. For example, the wearable glasses 100 may determine that, by using acceleration information measured using the acceleration sensor: 1) when the user has moved at the average speed of 0.001 km/h per a certain period, the user is in a standstill state (i.e., is resting); 2) when the user has moved at the average speed of 4 km/h per a certain period, the user is in a walking state; and 3) when the user has moved at the average speed of 15 km/h per a certain period, the user is in a running state. The certain period may be predetermined.

Alternatively, the wearable glasses 100 may determine, by using position variation information measured using a position sensor, whether the user is in a standstill state (e.g., position variation<first variation), in a walking state (e.g., first variation≤position variation<second variation), or in a running state (second variation≤position variation). Moreover, the wearable glasses 100 may used both acceleration information and position variation information in order to increase the certainty of the determination, or to provide verification.

Similarly, as another alternative, the wearable glasses 100 may determine, by using tilt information measured using a tilt sensor, whether the user is in a standstill state (e.g., tilt variation<first threshold), in a walking state (e.g., first threshold≤tilt variation<second threshold), or in a running state (e.g., second threshold≤tilt variation). The higher the movement speed of the user, the higher may be the tilt variation measured using the tilt sensor. As discussed above, the wearable glasses 100 may be more than one of the acceleration information, the position variation information, and the tilt information to provide additional certainty or to provide verification.

Similarly, the wearable glasses 100 may determine, by using pressure information regarding a pressure applied to a pressure sensor attached on nose pads of wearable glasses during movement of a user, whether the user is in a standstill state (e.g., measured pressure<first pressure), in a walking state (e.g., first pressure≤measured pressure<second pressure), or in a running state (e.g., second pressure≤measured pressure). The higher the movement speed of the user, the higher may be the pressure measured using the pressure sensor. As with the other information, the pressure information may be used as a single data point, or may be combined with one or more other information in order to provide additional certainty or verification.

The wearable glasses 100 may also determine whether the user is in a standing state, a sitting state or a lying down state by using an altitude sensor (atmospheric pressure sensor). For example, the wearable glasses 100 may determine, by using altitude information measured using the altitude sensor (atmospheric pressure sensor), that 1) when a measured altitude value is a first altitude or greater (altitude≥first altitude value), the user is standing; 2) when a measured altitude value is smaller than the first altitude value and equal to or greater than a second altitude value, the user is sitting (first altitude value>measured altitude≥second altitude value); and 3) when a measured altitude value is smaller than the second altitude value, the user is lying down (altitude<second altitude value). An altitude value measured using the altitude sensor may be smaller when the user is lying than when the user is standing.

Turning to FIG. 5C, the wearable glasses 100 may determine that a user is in a hiking state via at least one of an acceleration sensor, an altitude sensor, a position sensor, and a biometric sensor. For example, the wearable glasses 100 may determine that the user is hiking when an altitude variation during a certain period measured using the altitude sensor is equal to or greater than a threshold value (altitude variation≥threshold value), and/or when position information measured using the position sensor is 'mountainous area,' and/or an amount of sweat secretion, temperature variation, and/or an average pulse rate measured using the biometric sensor are greater than a threshold value (sweat secretion amount>threshold value, temperature variation>threshold value, average pulse rate>threshold value).

The wearable glasses 100 may determine that a user is in a sleeping state via at least one of an iris scan sensor, an image sensor, a microphone, an accelerate sensor, and a tilt sensor. For example, the wearable glasses 100 may determine that the user is in a sleeping state when the number of times of eye blinking of the user, which is measured using an iris scan sensor, is less than a threshold number of times (e.g., one time per ten minutes is detected) and/or when an iris is not scanned during a certain period of time (e.g., iris is not scanned for five minutes). The certain period of time may be predetermined.

Additionally or alternatively, the wearable glasses 100 may capture an image of the eyes of a user at certain periods of time by using an image sensor and may detect the pupils by performing edge analysis on the image of the eyes. The certain period of time may be predetermined. If the pupils are not detected from the image of the eyes for a certain period of time (for example, if the pupils are not detected for five minutes or more), the wearable glasses 100 may determine that the user is in a sleeping state.

Additionally or alternatively, the wearable glasses 100 may analyze a sound signal obtained through a microphone, and if a sound corresponding to a snoring pattern is sensed, the wearable glasses 100 may determine that the user is in a sleeping state. Moreover, if a motion value of the head measured using an acceleration sensor or a tilt sensor is equal or greater than a threshold value, the wearable glasses 100 may determine that the user is dosing off while sitting.

Additionally or alternatively, the wearable glasses 100 may determine whether the user is in a speaking state (or is having a conversation) based on sound information obtained through a microphone. For example, the wearable glasses 100 may analyze sound information obtained through the microphone, and if voice of the user is recognized, the wearable glasses 100 may determine that the user is speaking. Also, if a voice of other person than the voice of the user is recognized from the sound information obtained through the microphone, the wearable glasses 100 may determine that the user is having a conversation.

The wearable glasses 100 may determine a drinking state of a user based on smell information measured using a smell sensor. For example, the wearable glasses 100 may analyze smell information measured using a smell sensor, and if an alcohol smell is recognized for a period of time, the wearable glasses 100 may determine that the user is drinking alcohol. The period of time may be predetermined.

The wearable glasses 100 may determine whether a user is in a driving state by using at least one of an acceleration sensor, an image sensor, and a short-range communication module. For example, when a speed variation measured using the acceleration sensor is equal to or greater than a threshold value (e.g., an average of 40 km/h) and/or a steering wheel of a car is detected from an image captured using the image sensor (that is, when a steering wheel of a car is detected according to an eye angle of the user who is looking straight ahead), the wearable glasses 100 may determine that the user is in a driving state.

Additionally or alternatively, the wearable glasses 100 may determine that the user is in a driving state based on information received from a car through short-range communication (e.g., Bluetooth). For example, when the user touches a starting button, the car identifies a fingerprint of the user and transmits driving starting information to wearable glasses that match the fingerprint of the user with a certain fingerprint. In this case, the wearable glasses may recognize that the user is starting to drive based on the driving starting information received from the car. The certain fingerprint may be predetermined.

According to an exemplary embodiment, the wearable glasses 100 may determine a commuting state of a user based on context information of a user. Context information may be stored in a personalized server of the user or in the wearable glasses 100.

For example, the wearable glasses 100 may determine a commuting state of a user based on schedule information or life pattern information of the user. If the user moves from home to a certain location (e.g., workplace) at 8 am on weekdays, the wearable glasses 100 may receive commuting time information, commuting distance information, and workplace location information of the user as context information. The certain location may be predetermined. When current time is 8:20 am on Monday and a current position is near a subway station, the wearable glasses 100 may determine that the user is going to work.

Also, if an average movement speed of the user for a period of time is 0.0001 km/h and the user is located in an office for a period of time, the wearable glasses 100 may determine that the user is at work. The periods of time may be predetermined.

According to an exemplary embodiment, the wearable glasses 100 may analyze a movement state of the user based on biometric information measured using an external wearable device. The wearable device according to an exemplary embodiment may include a ring, a necklace, a band, a watch, shoes, an earring, a hair band, clothes, gloves, or a thimble, but is not limited thereto.

For example, the wearable glasses 100 may receive pulse rate information, blood pressure information, heart rate information, body temperature information or the like measured using a wearable device. The wearable glasses 100 may receive biometric information from the wearable device via the mobile terminal 200 or may receive biometric information directly from the wearable device. The wearable glasses 100 may determine that the user is exercising if an average pulse rate of the user is equal to a threshold frequency or higher for a period of time. The period of time may be predetermined.

According to an exemplary embodiment, the wearable glasses 100 may determine, based on acceleration information, pressure information, and/or altitude information measured from a peripheral wearable device, such as running shoes or shoe insoles, whether the user is in a resting state, a walking state, a running state, or a hiking state. For example, the wearable glasses 100 may determine that the user is in a hiking state when a movement speed of the user is equal to a threshold value or higher and a pressure pattern of soles measured from a pressure sensor attached to running shoes of the user is similar to a pattern in regard to hiking.

According to an exemplary embodiment, the wearable glasses 100 may determine a movement state of a user based on mode information set by the user. For example, the user may manually set an operating mode of the wearable glasses 100 to a driving mode, an exercise mode, or a commuting mode. For example, if the user sets an operating mode of the wearable glasses 100 to a driving mode, the wearable glasses 100 may determine that the user is driving.

The controller 120 may determine a movement state of a user based on movement information of the user, and may control the display 111 to display notification message information received according to the movement state of the user.

According to an exemplary embodiment, the wearable glasses 100 may request from an external device connected to the wearable glasses 100 movement state information of a user and receive the same. The external device may be the mobile terminal 200 or the server 300. An operation of an external device to analyze a movement state of a user will be described in detail later with reference to FIG. 13.

In operation S530, the wearable glasses 100 may determine a method of providing content corresponding to a notification event (notification message information) based on the determined movement state of the user.

According to an exemplary embodiment, the wearable glasses 100 may determine a time to provide notification content (notification message information). For example, the wearable glasses 100 may determine whether a movement speed of the user is less than a threshold speed based on a movement state of the user. When the movement speed of the user is less than a threshold speed (e.g., 3 km/h), the wearable glasses 100 may determine to output notification content at a present time. The present time may indicate a time period within a certain time from a time when the wearable glasses 100 has detected occurrence of a notification event (for example, within 30 seconds). The certain time may be predetermined.

Meanwhile, when a movement speed of a user is equal to or greater than a threshold speed, the wearable glasses 100 may determine to output notification content at a different time. The different time may be a time that is previously set (for example, 10 pm). Alternatively, the different time may be a certain amount of time later than a present time (e.g., in 10 minutes). Alternatively, the different time may be a certain amount of time later than a present time at which another determination of the movement state of the user is made. For example, if a user is determined to be in a running state, the wearable glasses 100 may determine to wait 10 minutes and then re-determine the movement state of the user. If the re-determined state of the user is a standing state, then the wearable glasses 100 may output the notification. Also, the different time may indicate a time when a certain event has occurred. The certain event may be predetermined.

The certain event may include at least one of an event for receiving a user input for requesting output of notification content, an event whereby an amount of time passes, and an event for changing a movement state of a user, but is not limited thereto.

According to an exemplary embodiment, the wearable glasses 100 may determine the method of providing the content by determining a form of providing notification content. The form of providing notification content may include display form for displaying the notification content. For example, the wearable glasses 100 may determine whether a movement speed of a user is less than a threshold speed (e.g., 4 km/h) based on movement state of the user. When the movement speed of the user is equal to or greater than the threshold speed, the wearable glasses 100 may determine to output a portion of notification content, and if the movement speed of the user is less than the threshold speed, the wearable glasses 100 may determine to output the entire notification content.

A portion of content may include at least one of a keyword of the content, summary information of the content, and a title of the content, but is not limited thereto.

According to an exemplary embodiment, the wearable glasses 100 may determine to provide notification content in the form of at least one of an audio signal and a video signal based on a movement state of the user. For example, when the user is in a speaking state (e.g., talking to another person), the wearable glasses 100 may determine to output notification content as a video signal, and if the user is in a driving state, the wearable glasses 100 may determine to output notification content as an audio signal.

Hereinafter, an operation of the wearable glasses 100 to provide notification content based on whether the user is wearing the wearable glasses 100 will be described in detail with reference to FIG. 6.

Figure 6:
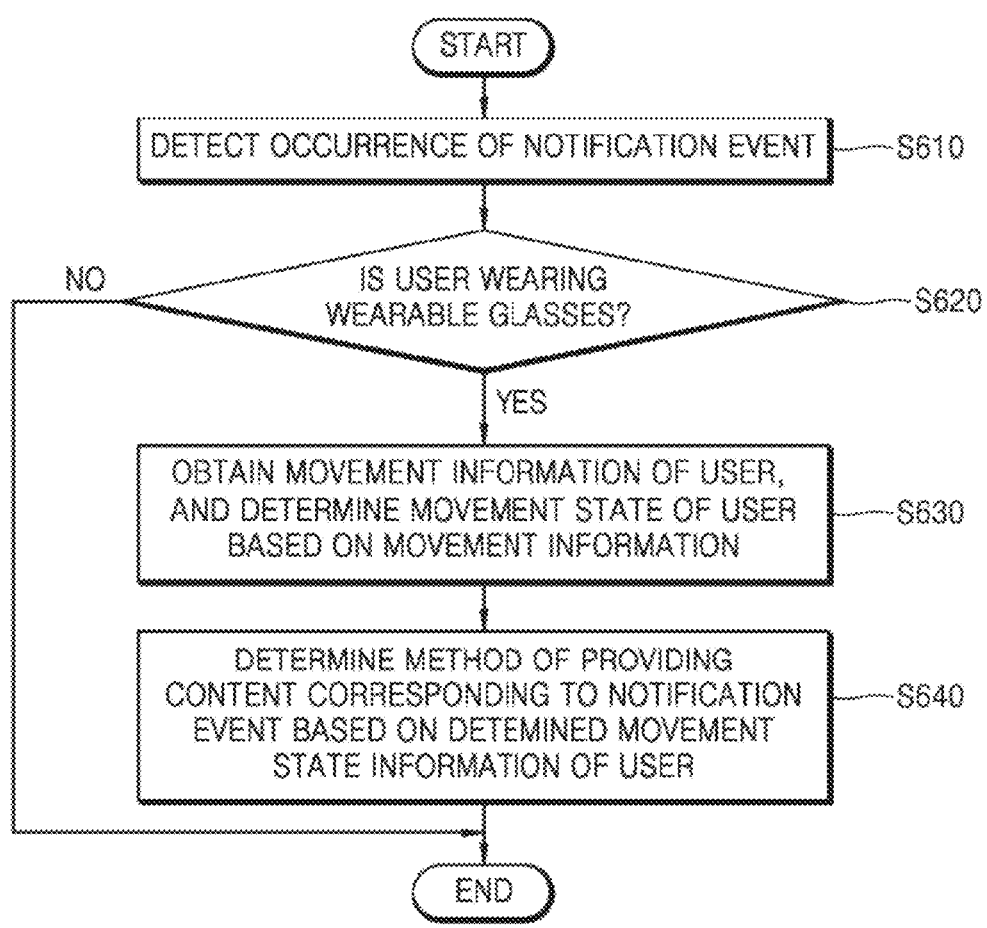
FIG. 6 illustrate a flowchart of a method used by a wearable glasses to provide content corresponding to a notification event based on whether a user is wearing a wearable glasses or not, according to an exemplary embodiment.

FIG. 6 illustrates a flowchart of a method used by a wearable glasses to provide content corresponding to a notification event based on whether a user is wearing a wearable glasses or not, according to an exemplary embodiment.

In operation S610, the wearable glasses 100 may detect an occurrence of a notification event. Operation S610 corresponds to operation S510 of FIG. 5, and thus detailed description thereof will be omitted.

In operation S620, the wearable glasses 100 may determine whether the user is wearing the wearable glasses 100.

According to an exemplary embodiment, the wearable glasses 100 may determine whether the user is wearing the wearable glasses 100 by using a sensor included in the wearable glasses 100 (e.g., at least one of a temperature sensor, a pressure sensor, an illuminance sensor, a proximity sensor, an iris scan sensor, and a pressure sensor, etc.). For example, when a value of a temperature sensor attached to nose pads or legs of glasses, or a value of a pressure sensor is equal to or greater than a threshold value, the wearable glasses 100 may determine that the user is wearing the wearable glasses 100. Alternatively, the wearable glasses 100 may scan an iris of the user. When the wearable glasses 100 succeeds in scanning an iris of the user by using an iris scan sensor, the wearable glasses 100 may determine that the user is wearing the wearable glasses 100.

Alternatively, when a tile value measured using a tilt sensor continuously changes, the wearable glasses 100 may determine that the user is wearing the wearable glasses 100.

Alternatively, when a speaker and a microphone are included inside legs of glasses, the wearable glasses 100 may output a sound signal through the speaker and obtain a reflected echo signal through the microphone. The wearable glasses 100 may determine whether the user is wearing the wearable glasses 100 based on information about the echo signal.

According to an exemplary embodiment, the wearable glasses 100 may combine pieces of information measured using a plurality of sensors to further accurately determine whether the user is wearing the wearable glasses 100.

When it is determined that the user is wearing the wearable glasses 100 (S620, YES), the wearable glasses 100 may obtain movement information of the user, and determine a movement state of the user based on the movement information in operation S630. In operation S640, the wearable glasses 100 may determine a method of providing notification content based on the determined movement state of the user. Operations S630 and S640 respectively correspond to operations S520 and S530 of FIG. 5, and thus detailed description thereof will be omitted.

On the other hand, when it is determined that the user is not wearing the wearable glasses 100 (S620, NO), the process ends without the wearable glasses 100 providing notification content even if occurrence of a notification event is sensed.

Figure 7:
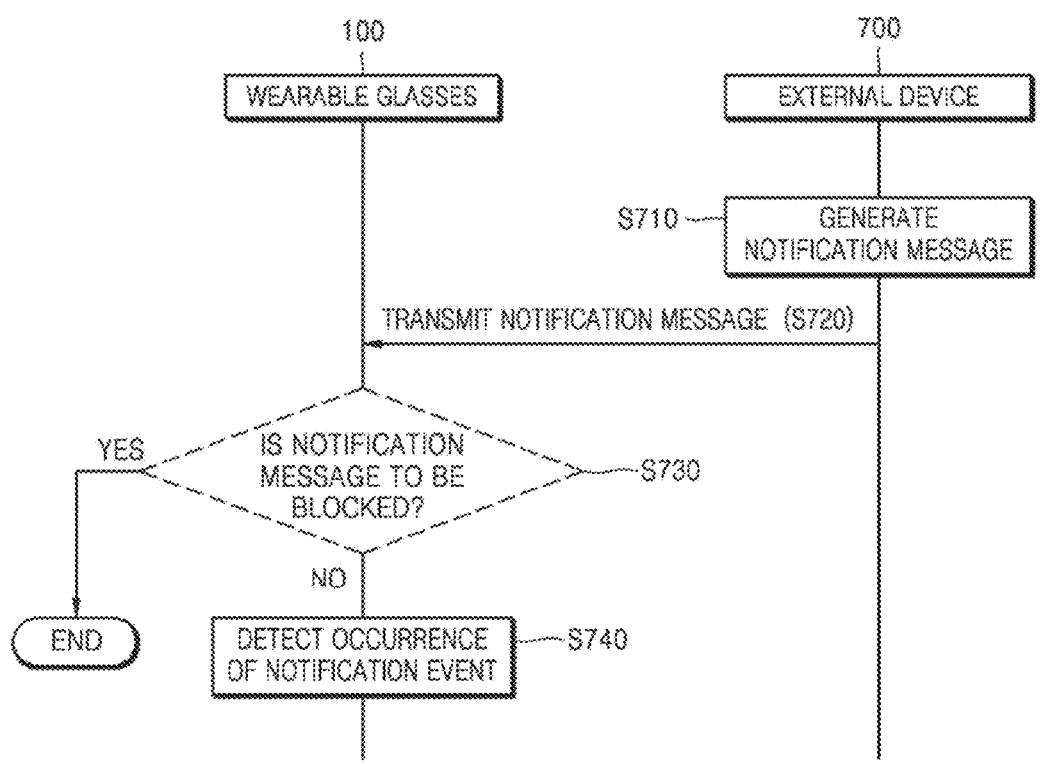
FIG. 7 illustrates a flowchart of a method used by a wearable glasses to detect an occurrence of a notification event, according to an exemplary embodiment.

FIG. 7 illustrates a flowchart of a method used by a wearable glasses to detect an occurrence of a notification event, according to an exemplary embodiment.

In operation S710, an external device 700 may generate a notification message. The notification message may be an advertisement message to be advertised to an unspecified number of persons, or a message only for the user of the wearable glasses 100. Also, according to an exemplary embodiment, a notification message may be a message related to application. The application may be predetermined.

The external device 700 may be at least one of the server 300 connected to the wearable glasses 100, the mobile terminal 200 connected to the wearable glasses 100, a wearable device connected to the wearable glasses 100, and a device of another person. However, the external device 700 is not limited thereto, and may be any device that is external to the wearable glasses 100 and that generates a notification message.

In operation S720, the external device 700 may transmit the generated notification message to the wearable glasses 100. The external device 700 may transmit the generated notification message to the wearable glasses 100 via at least one of short-range communication, wireless communication, and mobile communication.

In operation S730, when the wearable glasses 100 receives a notification message, the wearable glasses 100 may determine whether the notification message is to be blocked. For example, the user of the wearable glasses 100 may block reception of a push message related to an application or may block a text message received from a certain user, by using the wearable glasses 100 or the mobile terminal 200. The application may be predetermined and the certain user may be predetermined.

When the wearable glasses 100 determines that the notification message is not to be blocked (S730, NO) wearable glasses 100 may detect an occurrence of a notification event in operation S740. On the other hand, when the wearable glasses 100 determined that the notification message is to be blocked (S730, YES), the process ends.

According to an exemplary embodiment, operation S730 may be omitted. For example, when a notification message is received from the external device 700, the wearable glasses 100 may determine that a notification event has occurred.

Figure 8:
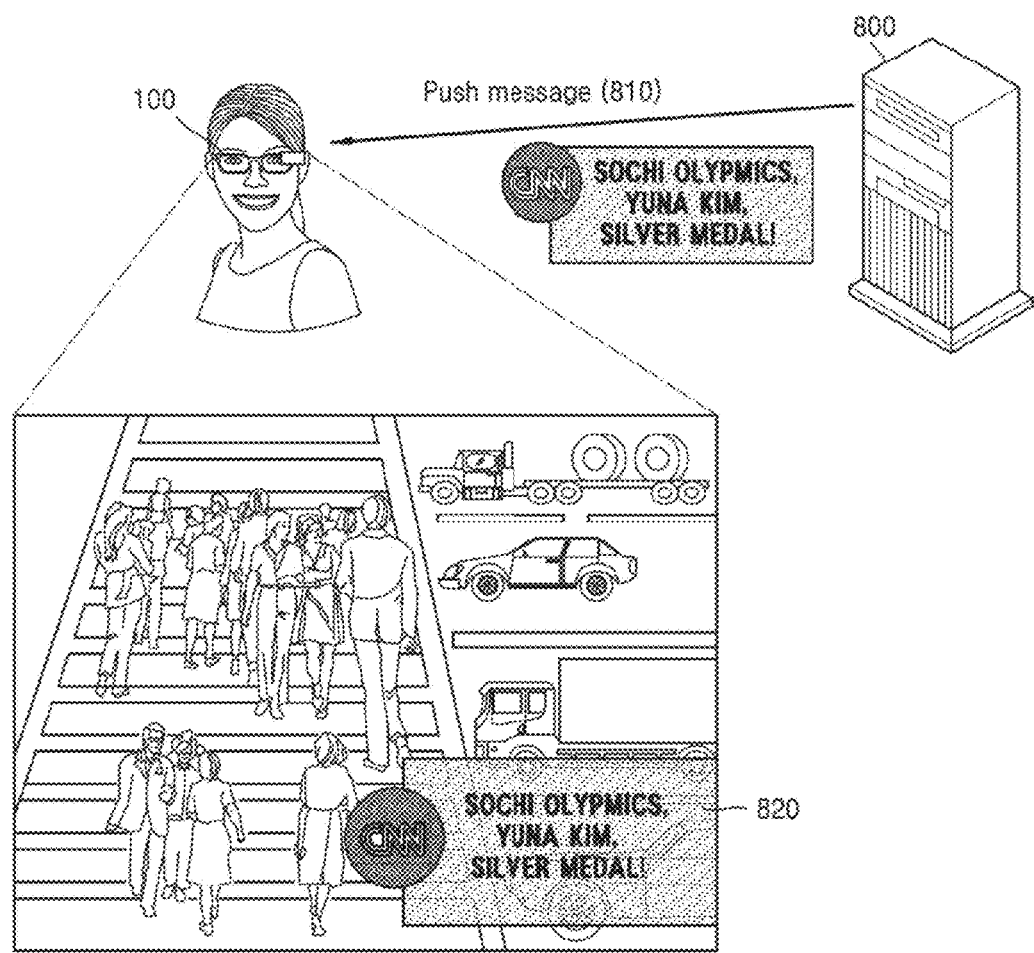
FIG. 8 illustrates an example of sensing, by a wearable glasses, an occurrence of a notification event by receiving a notification message from a server, according to an exemplary embodiment.

FIG. 8 illustrates an example of sensing, by a wearable glasses, an occurrence of a notification event by receiving a notification message from a server, according to an exemplary embodiment.

Referring to FIG. 8, the wearable glasses 100 may receive a push message 810 from a news providing server 800. For example, the wearable glasses 100 may receive a push message 810 including breaking news from the news providing server 800. For example, the breaking news may be "Sochi Olympics, Yuna Kim, Silver Medal!"

In this case, the wearable glasses 100 may sense that a notification event for displaying breaking news content has occurred (for example, "Sochi Olympics, Yuna Kim, silver medal!").

According to an exemplary embodiment, the wearable glasses 100 may receive the push message 810 directly from the news providing server 800. Also, the wearable glasses 100 may receive the push message 810 from a host device (e.g., the mobile terminal 200) when the host device is located within a short-range communication radius. The push message may then be displayed 820 by the wearable glasses 100 according to one of the processes discussed above.

Figure 9:
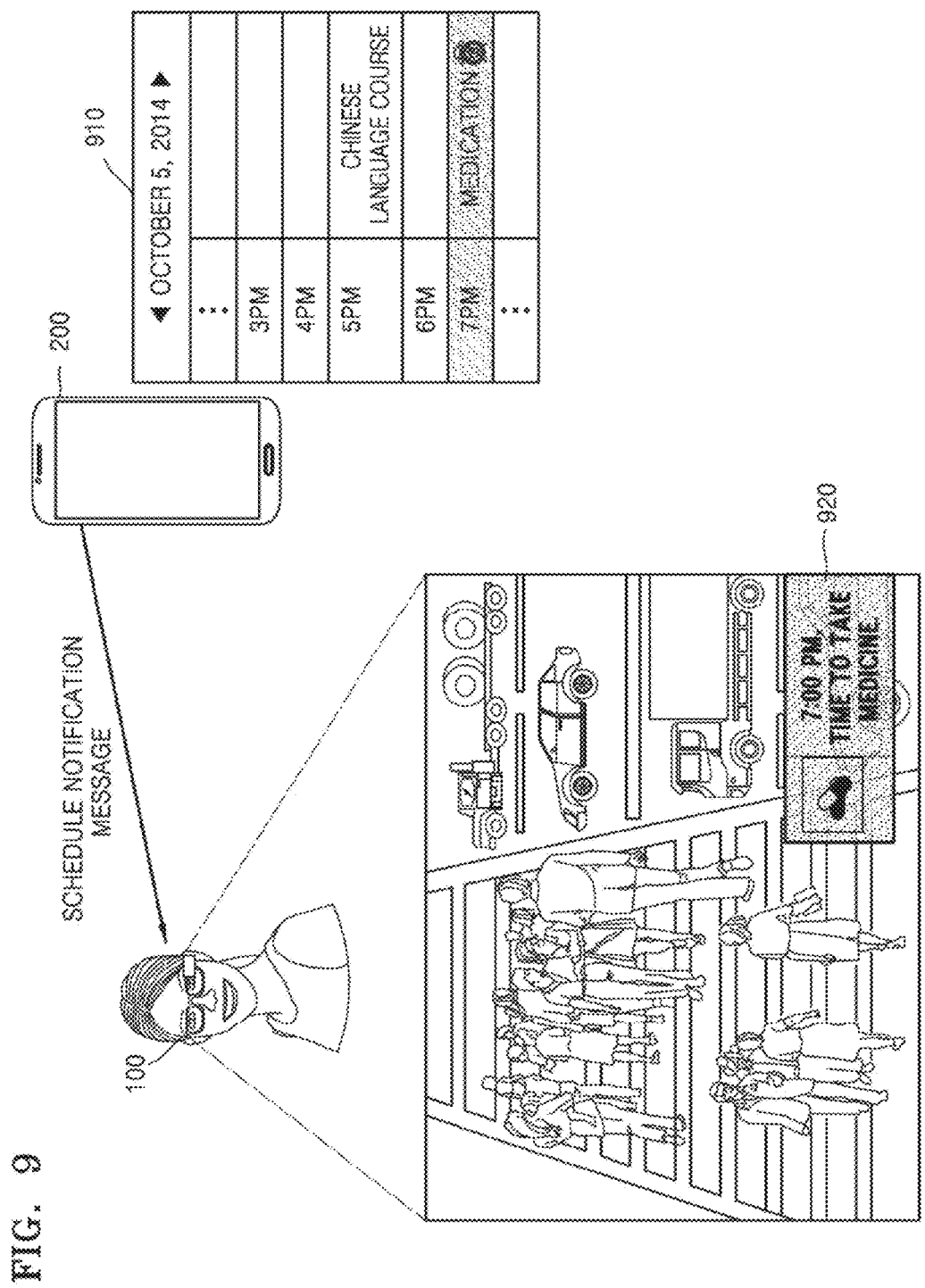
FIG. 9 illustrates an example of sensing, by a wearable glasses, an occurrence of a notification event by receiving a schedule notification message from a mobile terminal, according to an exemplary embodiment.

FIG. 9 illustrates an example of sensing, by a wearable glasses, an occurrence of a notification event by receiving a schedule notification message from a mobile terminal, according to another exemplary embodiment.

Referring to FIG. 9, schedule information 910 of a user may be stored in the mobile terminal 200 connected to the wearable glasses 100. For example, the user may register the schedule information 910 by using the mobile terminal 200. Alternatively the user may register the schedule information 910 using a computer and transmit or otherwise upload the schedule information 910 to the mobile terminal 200. The user may set the mobile terminal 200 such that a schedule notification message notifying "medication at 7 pm" is output by the wearable glasses 100.

When it is 7 pm, the mobile terminal 200 may transmit the schedule notification message notifying medication to the wearable glasses 100. The schedule notification message may include a command for displaying schedule notification content 920.

According to an exemplary embodiment, the mobile terminal 200 may transmit a schedule notification message to the wearable glasses 100 via short-range communication (e.g., Bluetooth, WFD, or NFC).

In this case, the wearable glasses 100 may sense that a notification event for displaying the schedule notification content 920 (e.g., "Time to take the medicine.") has occurred.

Figure 10:
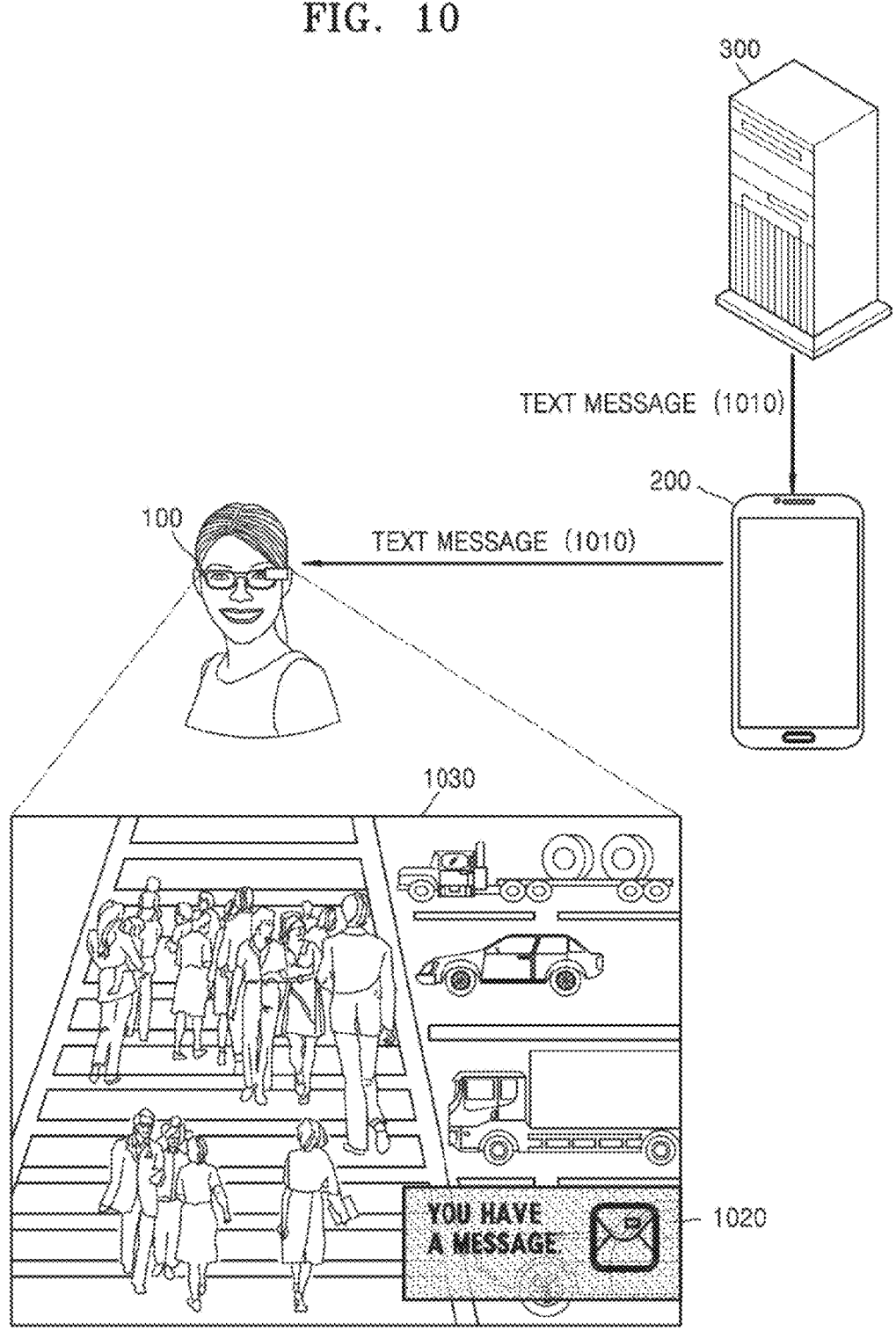
FIG. 10 illustrates an example of sensing, by a wearable glasses, an occurrence of a notification event by receiving a text message via a mobile terminal according to an exemplary embodiment.

FIG. 10 illustrates an example of sensing, by a wearable glasses, an occurrence of a notification event by receiving a text message via a mobile terminal, according to another exemplary embodiment.

Referring to FIG. 10, the mobile terminal 200 may receive a text message 1010 from the server 300. The server 300 may be, for example, a message server or a mobile communication server, but is not limited thereto.

When receiving the text message 1010, the mobile terminal 200 may determine whether a user is wearing the wearable glasses 100.

According to an exemplary embodiment, the mobile terminal 200 may request from the wearable glasses 100 at least one of temperature information, pressure information, iris scanning information, and tilt information, or other information on which the determination may be based. The mobile terminal 200 may receive at least one of temperature information, pressure information, iris scanning information, and tilt information or other information from the wearable glasses 100. The mobile terminal 200 may determine whether a user is wearing the wearable glasses 100 based on at least one of temperature information, pressure information, iris scanning information, and tilt information, or the other information. For example, the mobile terminal 200 may analyze temperature information received from the wearable glasses 100 and if a temperature measured using the wearable glasses 100 is similar to body temperature (e.g., 36.5° C.), the mobile terminal 200 may determine that the user is wearing the wearable glasses 100.

According to an exemplary embodiment, the mobile terminal 200 may request from the wearable glasses 100 position information and receive the same. The mobile terminal 200 may determine whether a user is wearing the wearable glasses 100 based additionally on a result of comparing position information of the mobile terminal 200 with the position information of the wearable glasses 100. In the example discussed above, when the temperature is similar to a body temperature and when a position difference between the mobile terminal 200 and the wearable glasses 100 is within a threshold range, the mobile terminal 200 may determine that the user who is carrying the mobile terminal 200 is also wearing the wearable glasses 100.

Alternatively, according to an exemplary embodiment, when the wearable glasses 100 is found via short-range communication (e.g., Bluetooth, WFD, etc.) in addition to using the other requested information, the mobile terminal 200 may determine that the user is wearing the wearable glasses 100.

According to an exemplary embodiment, when the user is wearing the wearable glasses 100, the mobile terminal 200 may transmit to the wearable glasses 100 a command for outputting the text message 1010 received from the server 300 and a notification message 1020 notifying arrival of the text message 1010 may be displayed on the display 1030.

In this case, the wearable glasses 100 may sense that a notification event for displaying the notification message 1020 notifying arrival of the text message 1010 (e.g., "You have a text message.") has occurred.

Figure 11:
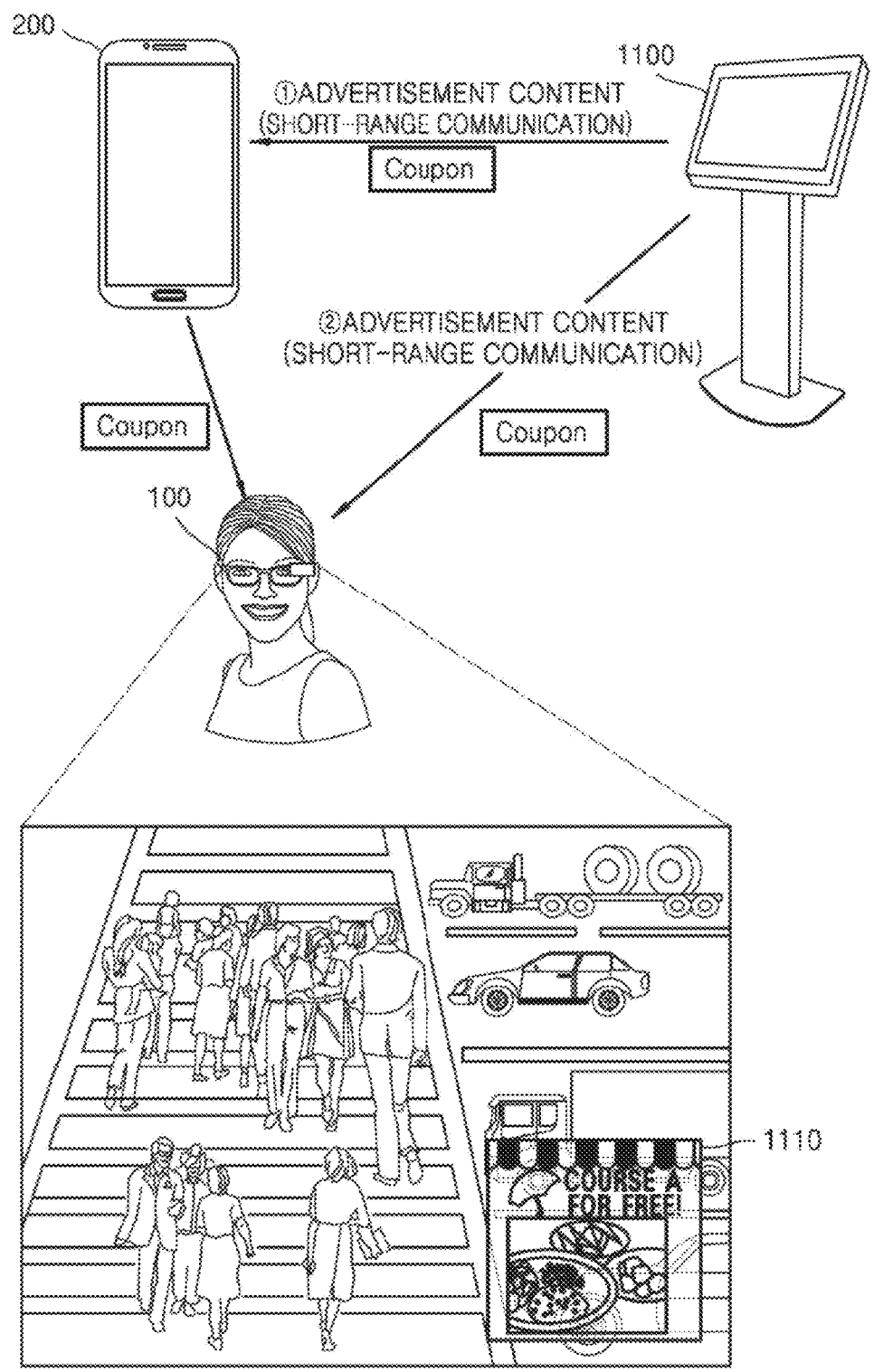
FIG. 11 illustrates an example of sensing, by a wearable glasses, an occurrence of a notification event by receiving advertisement content according to an exemplary embodiment.

FIG. 11 illustrates an example of sensing, by a wearable glasses, an occurrence of a notification event by receiving advertisement content, according to another exemplary embodiment.

According to an exemplary embodiment, the wearable glasses 100 may receive advertisement content from a kiosk 1100 via short-range communication. For example, when the wearable glasses 100 is located within a short-range communication radius of the kiosk 1100, the wearable glasses 100 may receive a mobile coupon broadcast from the kiosk 1100.

According to an exemplary embodiment, the wearable glasses 100 may receive advertisement content (e.g., mobile coupon) from the kiosk 1100 via the mobile terminal 200. According to another exemplary embodiment, the wearable glasses 100 may receive advertisement coupon (e.g., mobile coupon) directly from the kiosk 1100.

The wearable glasses 100 may sense that a notification event for displaying advertisement content 1110 received from the kiosk 1100 has occurred.

Hereinafter, an operation of the wearable glasses 100 to obtain movement information of a user will be described in detail.

Figure 12:
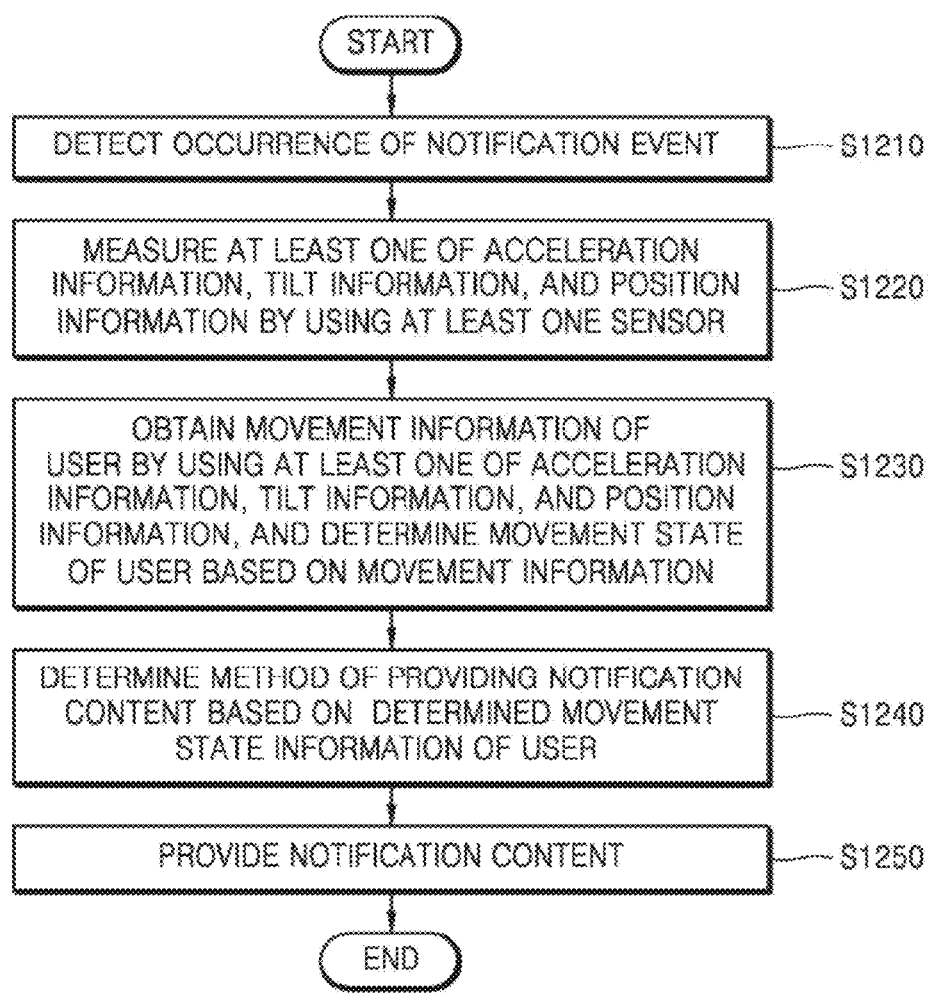
FIG. 12 illustrates a flowchart of a method used by a wearable glasses to obtain movement information of a user, according to an exemplary embodiment.

FIG. 12 illustrates a flowchart of a method used by a wearable glasses to obtain movement information of a user, according to an exemplary embodiment.

In operation S1210, the wearable glasses 100 may detect an occurrence of a notification event.

Operation S1210 corresponds to S510 of FIG. 5A, and thus detailed description thereof will be omitted.

In operation S1220, the wearable glasses 100 may measure at least one of acceleration information, tilt information, and position information by using at least one sensor.

According to an exemplary embodiment, the wearable glasses 100 may activate at least one sensor that is in an inactive state when the wearable glasses 100 has detected the occurrence of the notification event. The wearable glasses 100 may measure the at least one of acceleration information, tilt information, and position information by using the at least one activated sensor.

For example, the wearable glasses 100 may measure a movement speed of the wearable glasses 100 by using an acceleration sensor. Alternatively or additionally, the wearable glasses 100 may measure a variation in a tilt of the wearable glasses 100 by using a tilt sensor. In this case, the wearable glasses 100 may determine whether a user who is wearing the wearable glasses 100 is moving and an amount of movement of the user, based on the variation in the tilt of the wearable glasses 100.

Alternatively or additionally, the wearable glasses 100 may obtain position information of the user wearing the wearable glasses 100 by using a position sensor. Examples of the position sensor may include a global positioning system (GPS) module or a Wi-Fi module, but are not limited thereto.

For example, the wearable glasses 100 may obtain position information of the user wearing the wearable glasses 100 by using a GPS or a Wi-Fi positioning system (WPS). The GPS is a satellite navigation system whereby a present position of a user is calculated by receiving a signal sent from a satellite. The WPS is a technique in which a terminal receives a parameter (e.g., a MAC address, a signal intensity, etc.) of an RF signal emitted from a Wi-Fi access point (AP) and the terminal calculates a position of a user is calculated based on the received parameter.

In operation S1230, the wearable glasses 100 may obtain movement information of a user based on at least one of acceleration information, tilt information, and position information, and determine a movement state of the user based on the movement information. That is, the wearable glasses 100 may determine a movement state of a user based on at least one of acceleration information, tilt information, and position information.

For example, when a user moves at the average speed of 4 km/h for a period of time, the wearable glasses 100 may determine that the user is in the movement state of walking. Alternatively, when the user is moving at the average speed of 20 km/h for a period of time, the wearable glasses 100 may determine that the user is in the movement state of riding a bicycle.

Alternatively, when the average movement speed of the user for a period of time is 0.0001 km/h, and the user is in an office for a period of time, the wearable glasses 100 may determine that the user is in a movement state of being at work.

According to an exemplary embodiment, the wearable glasses 100 may obtain movement information of the user by using the image sensor 161. For example, the wearable glasses 100 may determine whether the user is in a moving state or is in a resting state based on a variation of an image obtained by using the image sensor 161.

In operation S1240, the wearable glasses 100 may determine a method of providing notification content based on the determined movement state of the user. According to an exemplary embodiment, the wearable glasses 100 may determine a time to provide notification content and a form of providing the notification content based on movement state of the user. Operation S1240 corresponds to operation S530 of FIG. 5, and thus detailed description thereof will be omitted.

In operation S1250, the wearable glasses 100 may provide notification content.

According to an exemplary embodiment, the wearable glasses 100 may provide notification content according to a time to provide notification content and/or a form of providing notification content, determined based on movement state of the user. In the present specification, providing of notification content may include displaying notification content, outputting notification content, replaying notification content, and/or transmitting notification content to an external device.

For example, the wearable glasses 100 may provide notification content at a present time or at a point when a certain event has occurred, based on movement state of the user. The certain event may be predetermined. Also, the wearable glasses 100 may output the entire notification content or a portion of notification content based on the determined movement state of the user.

The wearable glasses 100 may provide notification content via the display 111 of the wearable glasses 100 based on movement state of the user, or a user input, or via an external wearable device.

Figure 13:
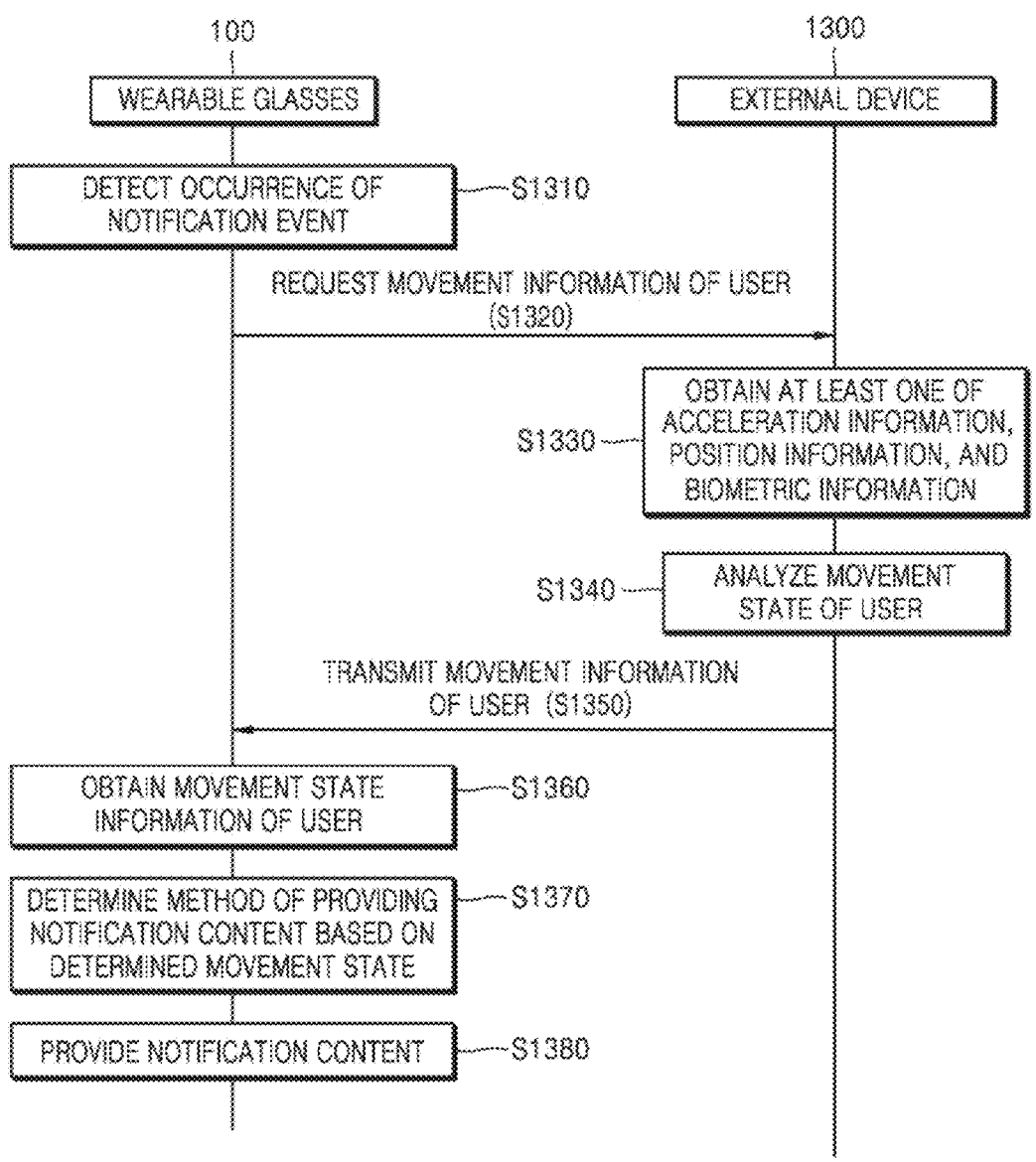
FIG. 13 illustrates a flowchart of a method used by a wearable glasses to obtain movement information of a user from an external device, according to an exemplary embodiment.

FIG. 13 illustrates a flowchart of a method used by a wearable glasses to obtain a movement state of a user from an external device, according to an exemplary embodiment.

In operation S1310, the wearable glasses 100 may detect an occurrence of a notification event. Operation S1310 corresponds to operation S510 of FIG. 5A, and thus detailed description thereof will be omitted.

In operation S1320, the wearable glasses 100 may request movement information of a user from an external device

1300. The external device 1300 may be the mobile terminal 200 or the server 300, but is not limited thereto.

According to an exemplary embodiment, the wearable glasses 100 may activate a communication interface when an occurrence of a notification event is detected. The wearable glasses 100 may request movement information of a user from an external device 1300. According to an exemplary embodiment, the wearable glasses 100 may transmit acceleration information, tilt information, and position information measured using the wearable glasses 100, to the external device 1300.

In operation S1330, the external device 1300 may obtain at least one of acceleration information of the wearable glasses 100, position information of the wearable glasses 100, and biometric information of the user wearing the wearable glasses 100.

According to an exemplary embodiment, the external device 1300 may receive from the wearable glasses 100 acceleration information measured using the wearable glasses 100, position information of the wearable glasses 100 or the like. The external device 1300 may also receive acceleration information or position information or the like measured by a wearable device (e.g., a smart watch, a wig, shoes, etc.).

Also, when the external device 1300 is the mobile terminal 200 of the user wearing the wearable glasses 100, the external device 1300 may measure acceleration and/or a position of the wearable glasses 100 directly by using sensors.

According to an exemplary embodiment, the external device 1300 may collect biometric information from at least one wearable device connected to the external device 1300. For example, the external device 1300 may receive pulse rate information, blood pressure information, heart rate information, body temperature information, sweat secretion information, respiratory rate information or the like measured by a wearable device (e.g., a smart watch, ear rings, a ring, a necklace, glasses, shoes, clothes, etc.).

In operation S1340, the external device 1300 may analyze a movement state of a user based on at least one of acceleration information, position information, and biometric information. That is, the external device 1300 may determine a movement state of the user based on at least one of acceleration information, position information, and biometric information.

For example, when an average pulse rate, an average respiratory rate, an amount of sweat secretion, and a body temperature of the user have increased for a period of time, the external device 1300 may determine that the user is exercising. The period of time may be predetermined. Alternatively, when the user is staying at home for a period of time and biometric information of the user changes little, the external device 1300 may determine that the user is in a movement state of taking a rest at home. When the user is moving at an average speed of 4 km/h in a park, the external device 1300 may determine that the user is in a movement state of taking a walk in the park.

In operation S1350, the external device 1300 may transmit the movement state of the user to the wearable glasses 100. The external device 1300 may transmit the movement state of the user to the wearable glasses 100 via at least one of short-range communication, mobile communication, and wireless communication. For example, the external device 1300 may transmit movement state information, movement speed information, and position information of the user to the wearable glasses 100. In this case, in operation S1360, the wearable glasses 100 may obtain the movement state of the user from the external device 1300.

In operation S1370, the wearable glasses 100 may determine a method of providing notification content based on the movement state of a user. For example, the wearable glasses 100 may determine a time to provide notification content and a form of providing the notification content.

In operation S1380, the wearable glasses 100 may provide notification content. For example, when the user is in a movement state of taking a walk, the wearable glasses 100 may output a portion of the notification content, and may output the entire notification content when the user is in a movement state of taking a rest at home.

Operations S1370 and S1380 respectively correspond to operations S1240 and S1250 of FIG. 12, and thus detailed description thereof will be omitted.

Hereinafter, an operation of the wearable glasses 100 to determine a time to provide notification content based on a movement state of a user, will be described in detail with reference to FIG. 14.

Figure 14:
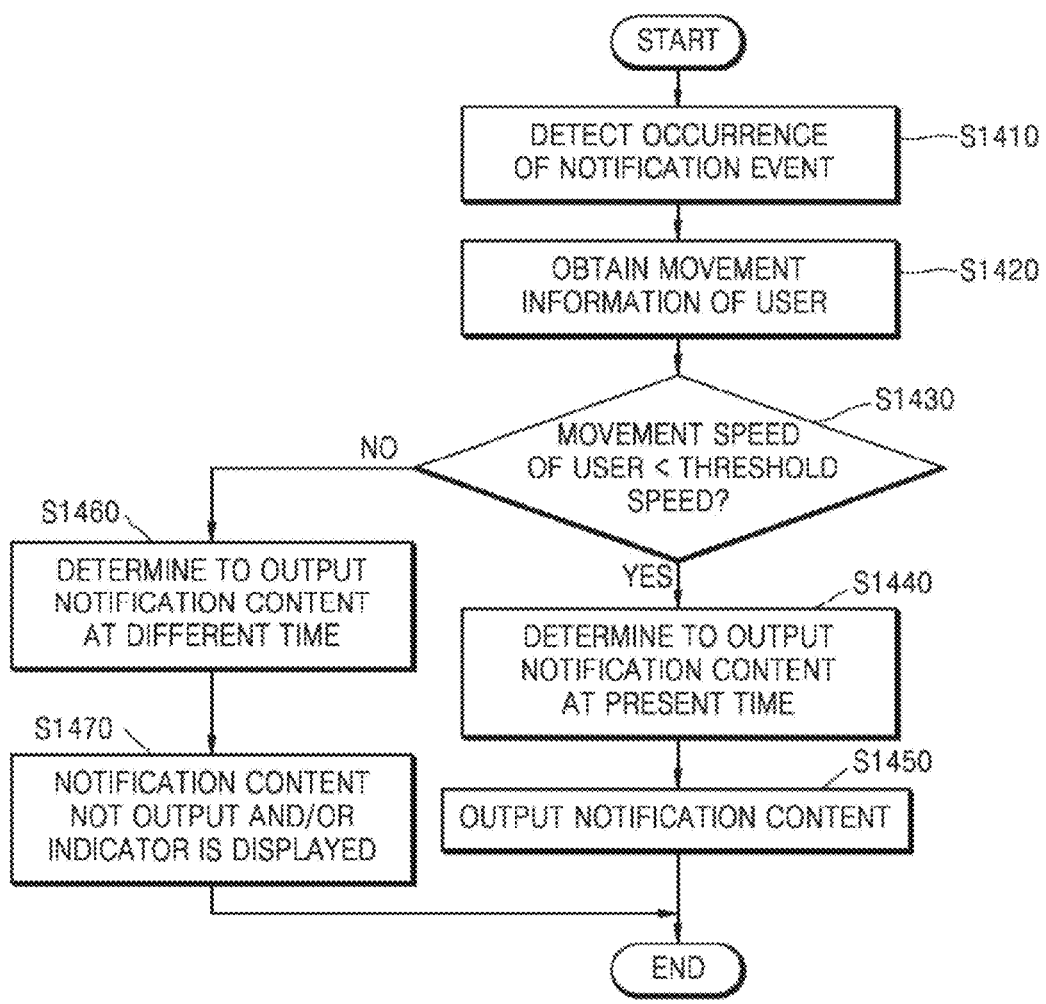
FIG. 14 illustrates a flowchart of a method used by a wearable glasses to determine a time to output content corresponding to a notification event based on a movement speed of a user, according to an exemplary embodiment.

FIG. 14 illustrates a flowchart of a method used by a wearable glasses to determine a time to output content corresponding to a notification event based on a movement speed of a user, according to an exemplary embodiment.

In operation S1410, the wearable glasses 100 may detect an occurrence of a notification event.

In operation S1420, the wearable glasses 100 may obtain movement information of a user when detecting occurrence of a notification event.

In operation S1430, the wearable glasses 100 may determine whether a movement speed of the user is less than a threshold speed based on the obtained movement information of the user. The threshold speed may be preset by the user or a system. The threshold speed may be determined, for example, based on an average movement speed of the user.

For example, the wearable glasses 100 may determine whether a movement speed of the user is 4 km/h, which is an average walking speed.

When the movement speed of the user is less than the threshold speed (S1430, YES), the wearable glasses 100 may determine to output notification content in operation S1440.

For example, when the movement speed of the user is less than 4 km/h which is the average walking speed, the wearable glasses 100 may determine to output notification content at a present time. The present time may be within a threshold period from a point when the wearable glasses 100 has detected the occurrence of a notification event (for example, within 30 seconds). The threshold period may be predetermined.

In operation S1450, the wearable glasses 100 may output notification content at the present time. For example, the wearable glasses 100 may replay notification content at the present time when the notification content is video content or audio content. The wearable glasses 100 may display notification content at the present time when notification content is still image content or text content.

On the other hand, when the movement speed is greater than or equal to the threshold speed (S1430, NO), the wearable glasses 100 may determine to output notification content at a different time in operation S1460. The different time may be preset, and may be for example a later time.

The different time may indicate previously set time (e.g., 10 pm). Alternatively, the different time may indicate a time when a certain event has occurred. The certain event may be predetermined. The certain event may include at least one of an event of receiving a user input requesting to output notification content, an event whereby a preset time passes, and an event for changing a movement state of the user, but is not limited thereto.

For example, the wearable glasses 100 may determine a point when notification content is output as a point when an input requesting to output notification content is received. The input may be predetermined. Also, the wearable glasses 100 may determine a point when notification content is output, as a point when a movement speed of the user becomes less than a threshold speed.

In operation S1470, the wearable glasses 100 may not output notification content at the present time. Alternatively or additionally, the wearable glasses 100 may display an indicator indicating that a notification event has occurred.

According to an exemplary embodiment, when the user wearing the wearable glasses 100 is moving at a threshold speed or higher, the wearable glasses 100 may display no notification content and/or may display a simple indicator indicating that a notification event has occurred in order not to obstruct the user's view or distract the user. An operation of the wearable glasses 100 to determine a time to provide notification content based on a movement state of the user will be described in more detail with reference to FIGS. 15A and 15B.

Figure 15A:
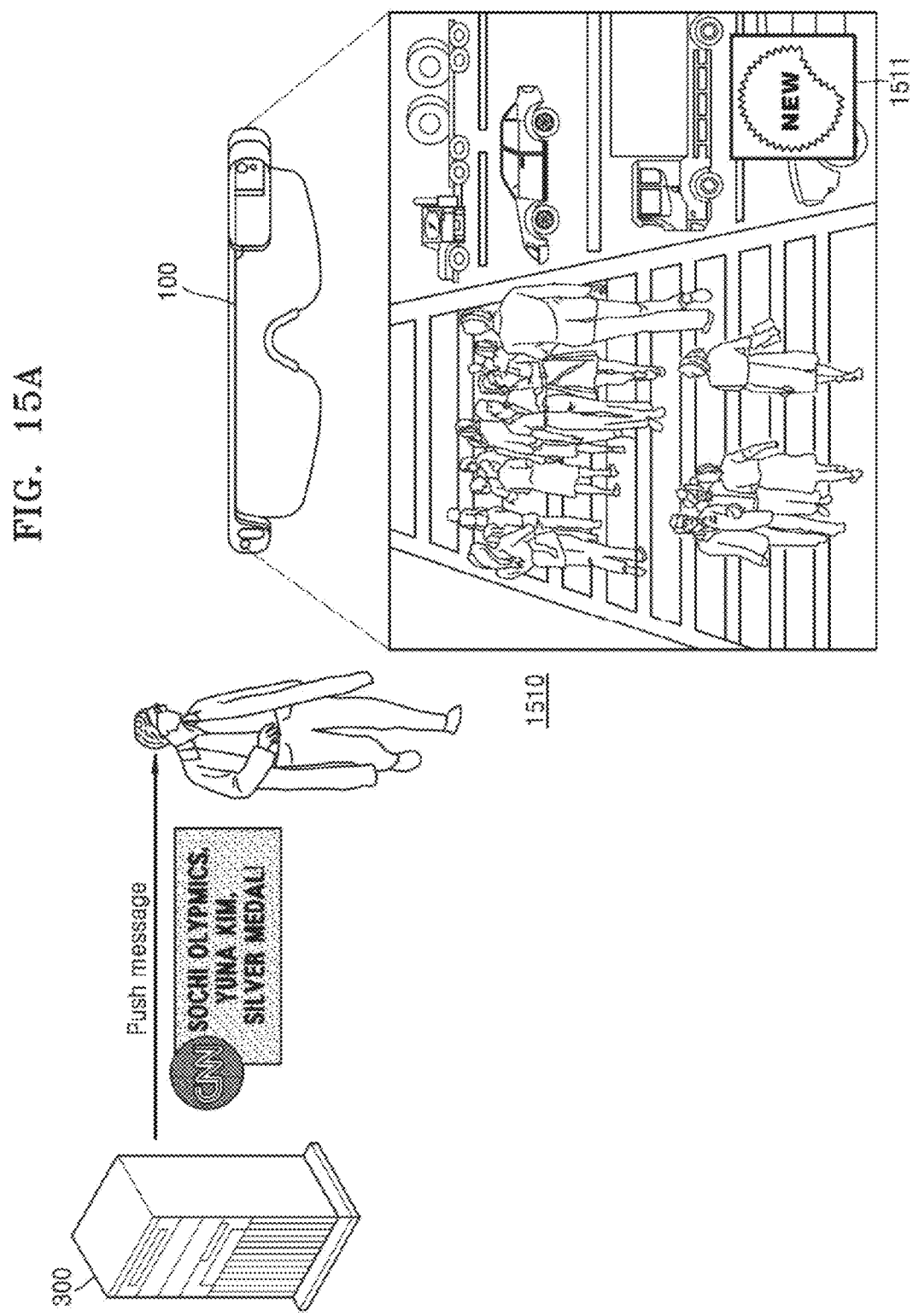

FIGS. 15A and 15B illustrate diagrams for describing an example of adjusting, by a wearable glasses, a time and a method to output content corresponding to a notification event based on a movement speed of a user, according to an exemplary embodiment.

Referring to FIG. 15A, while a user 1510 is crossing a pedestrian crossing, the wearable glasses 100 may receive a push message including news content from the server 300. In this case, the wearable glasses 100 may sense that a notification event for displaying news content (e.g., "Sochi Olympics, Yuna Kim, Silver medal!") has occurred.

According to an exemplary embodiment, the wearable glasses 100 may obtain movement information of the user 1510 before displaying the news content and determine whether a movement speed of the user 1510 is less than a threshold speed (e.g., 2 km/h). For example, as the user 1510 is crossing a pedestrian crossing, a movement speed of the user 1510 may be 3 km/h. In this case, the wearable glasses 100 may determine not to output news content at a present time as the movement speed of the user 1510 (e.g., 3 km/h) is equal to or greater than the threshold speed (2 km/h). The wearable glasses 100 may display a simple indicator 1511 indicating occurrence of the notification event.

According to an exemplary embodiment, the wearable glasses 100 may determine not to display news content while the user 1510 is crossing a pedestrian crossing but may instead display the indicator 1511, thereby minimizing obstruction of the view of the user 1510.

Referring to FIG. 15B, while a user 1520 wearing the Wearable glasses 100 is sitting and taking a rest at home, the Wearable glasses 100 may receive a push message including news content from the server 300. In this case, the wearable glasses 100 may sense that a notification event for displaying news content 1521 has occurred.

According to an exemplary embodiment, the wearable glasses 100 may obtain movement information of the user 1520 before displaying the news content 1521, and determine whether a movement speed of the user 1520 is less than a threshold speed (e.g., 2 km/h). For example, as the user 1520 is taking a rest at home, the movement speed of the user 1520 may be about 0 km/h. In this case, the wearable glasses 100 may determine to output the news content 1521 at a present time as the movement speed of the user 1520 (e.g., 0 km/h) is less than the threshold speed (2 km/h).

The wearable glasses 100 may display the news content 1521 (for example, "Sochi Olympics, Silver medal for Yuna Kim! Figure skater Yuna Kim has won a valuable silver medal at the Sochi Olympics!") in the form of AR, MR, or VR. In this case, the user 1520 may safely check the news content 1521 via the wearable glasses 100 even though the view of the user 1520 may be obstructed.

Hereinafter, an operation of the wearable glasses 100 to determine an output form of notification content based on movement information of a user will be described in detail with reference to FIG. 16.

Figure 16:
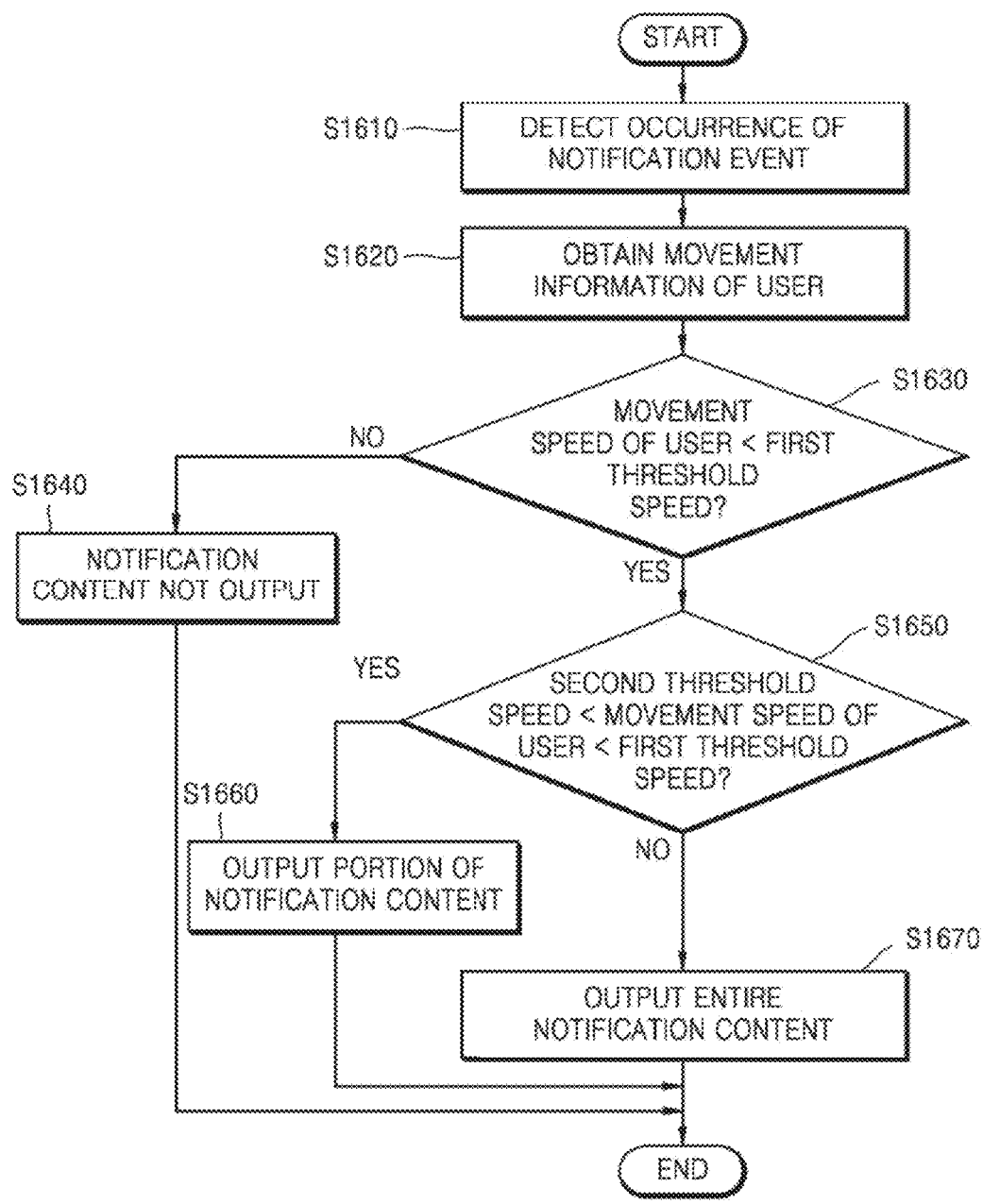
FIG. 16 illustrates a flowchart of a method of determining an output form of content corresponding to a notification event based on movement information of a user, according to an exemplary embodiment.

FIG. 16 illustrates a flowchart of a method of determining an output form of content corresponding to a notification event based on movement information of a user, according to an exemplary embodiment.

In operation S1610, the wearable glasses 100 may detect occurrence of a notification event. In operation S1620, the wearable glasses 100 may obtain movement information of a user. Operations S1610 and 1620 respectively correspond to operations S1410 and S1420 of FIG. 14, and thus detailed description thereof will be omitted.

In operation S1630, the wearable glasses 100 may determine whether a movement speed of the user is less than a first threshold speed. The first threshold speed may be a reference speed used to determine whether to output content. The first threshold speed may be preset by the user or by a system.

For example, when the first threshold speed is 10 km/h, the wearable glasses 100 may determine whether a movement speed of the user is less than 10 km/h based on movement information of the user.

When the movement speed of the user is equal to or greater than the first threshold speed (S1630, NO), the wearable glasses 100 may not output notification content at a present time, in operation S1640. For example, when the user wearing the wearable glasses 100 is riding a motorcycle, the movement speed of the user may be equal to or greater than the first threshold speed. The wearable glasses 100 may not output notification content in order not to obstruct the user's view.

On the other hand, when the movement speed of the user is less than the first threshold speed (S1630, YES), the wearable glasses 100 may determine whether a movement speed of the user is between the first threshold speed and a second threshold speed in operation S1650. The second threshold speed may be a reference speed for determining whether to output the entire notification content or a portion of notification content. The second threshold speed may be preset by the user or a system. Also, according to an exemplary embodiment, the first threshold speed and the second threshold speed may be determined based on a normal movement speed of the user.

According to an exemplary embodiment, when the first threshold speed is 10 km/h, and the second threshold speed is 2 km/h, the wearable glasses 100 may determine whether a movement speed of the user is between 10 km/h and 2 km/h based on movement information of the user.

When the movement speed of the user is between the first threshold speed and the second threshold speed (S1650, YES), the wearable glasses 100 may output a portion of notification content in operation S1660. A portion of notification content may include at least one of a keyword, summary information, and a title of the notification content, but is not limited thereto.

For example, when the movement speed of the user is between the first threshold speed and the second threshold speed, the wearable glasses 100 may extract at least one of a keyword, summary information, and a title of the notification content by using metadata of the notification content. Then, the wearable glasses 100 may provide the at least one of a keyword, summary information, and a title of the notification content.

On the other hand, when the movement speed of the user is not between the first threshold speed and the second threshold speed (S1650, NO), the wearable glasses 100 may output the entire notification content when a movement speed of the user is less than the second threshold speed, in operation S1670.

For example, when the user wearing the wearable glasses 100 is reading a book at home, a movement speed of the user may be less than the second threshold speed. In this case, the wearable glasses 100 may output the entire notification content.

Hereinafter, an example where the wearable glasses 100 determines an output form of notification content based on movement information of a user will be described in detail with reference to FIGS. 17 through 19.

Figure 17:
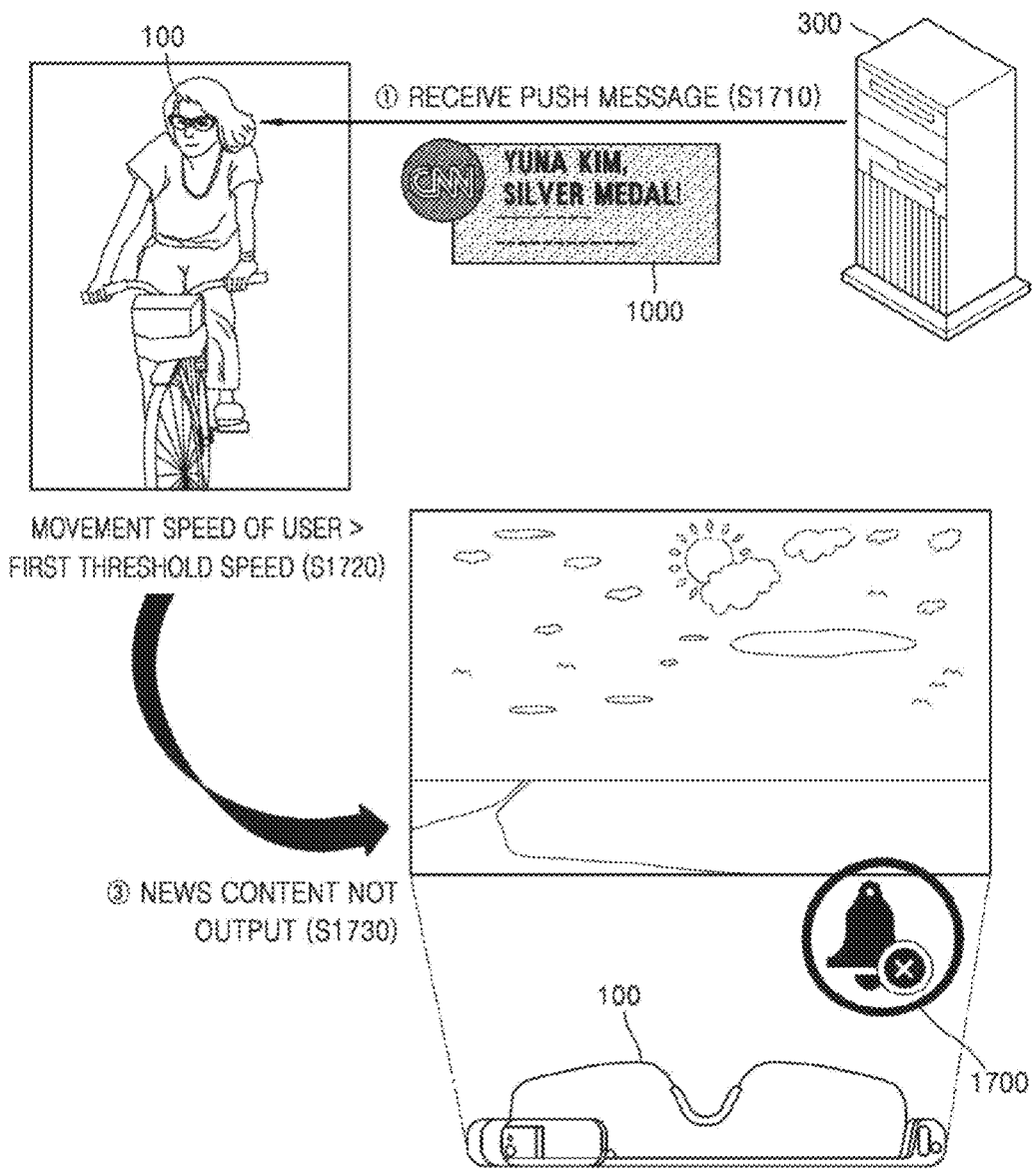
FIGS. 17 through 19 illustrate diagrams for describing an example of providing, by a wearable glasses, a portion of content or entire content corresponding to an notification event based on a movement speed of a user, according to an exemplary embodiment.
Figure 18:
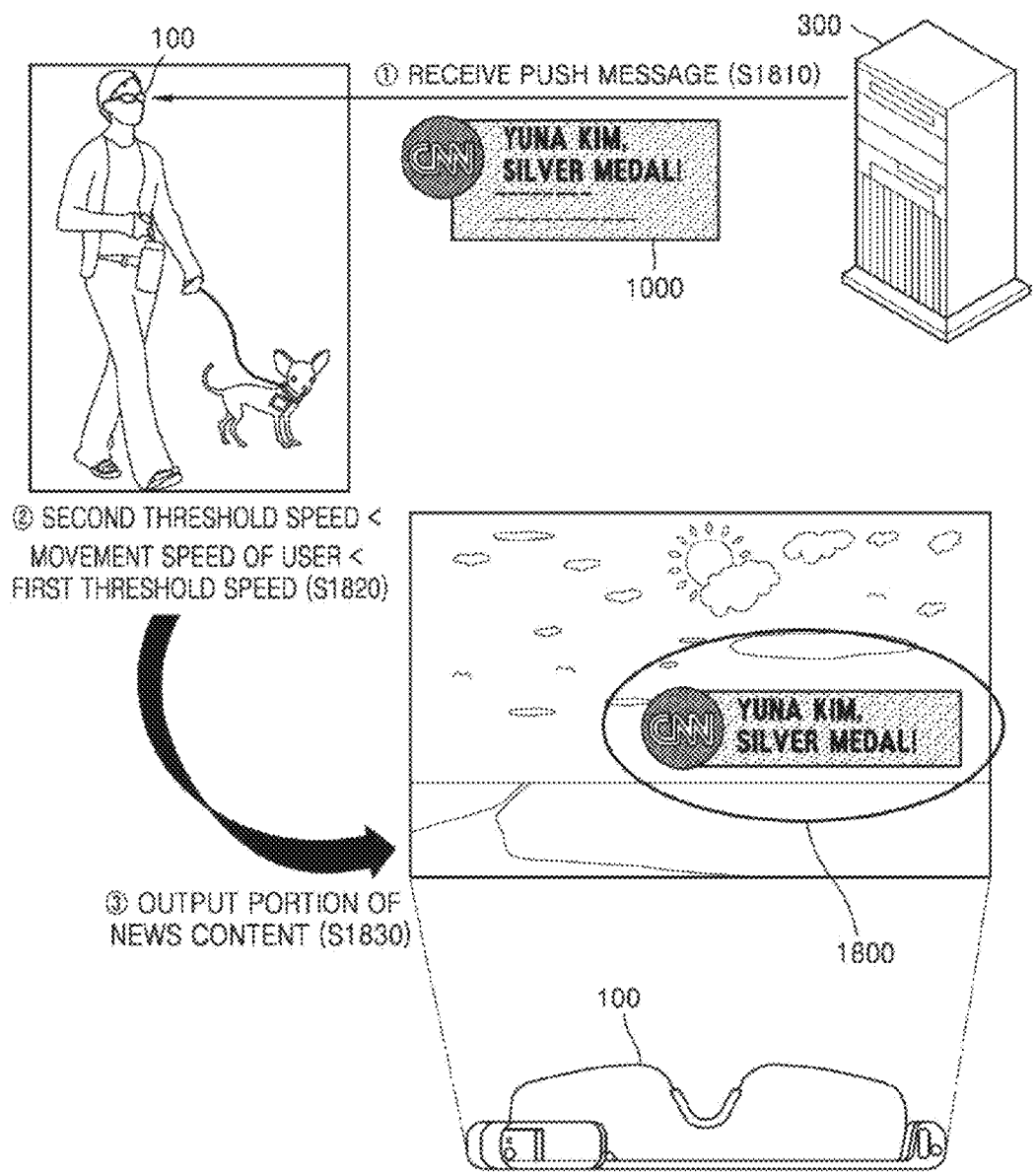
Figure 19:
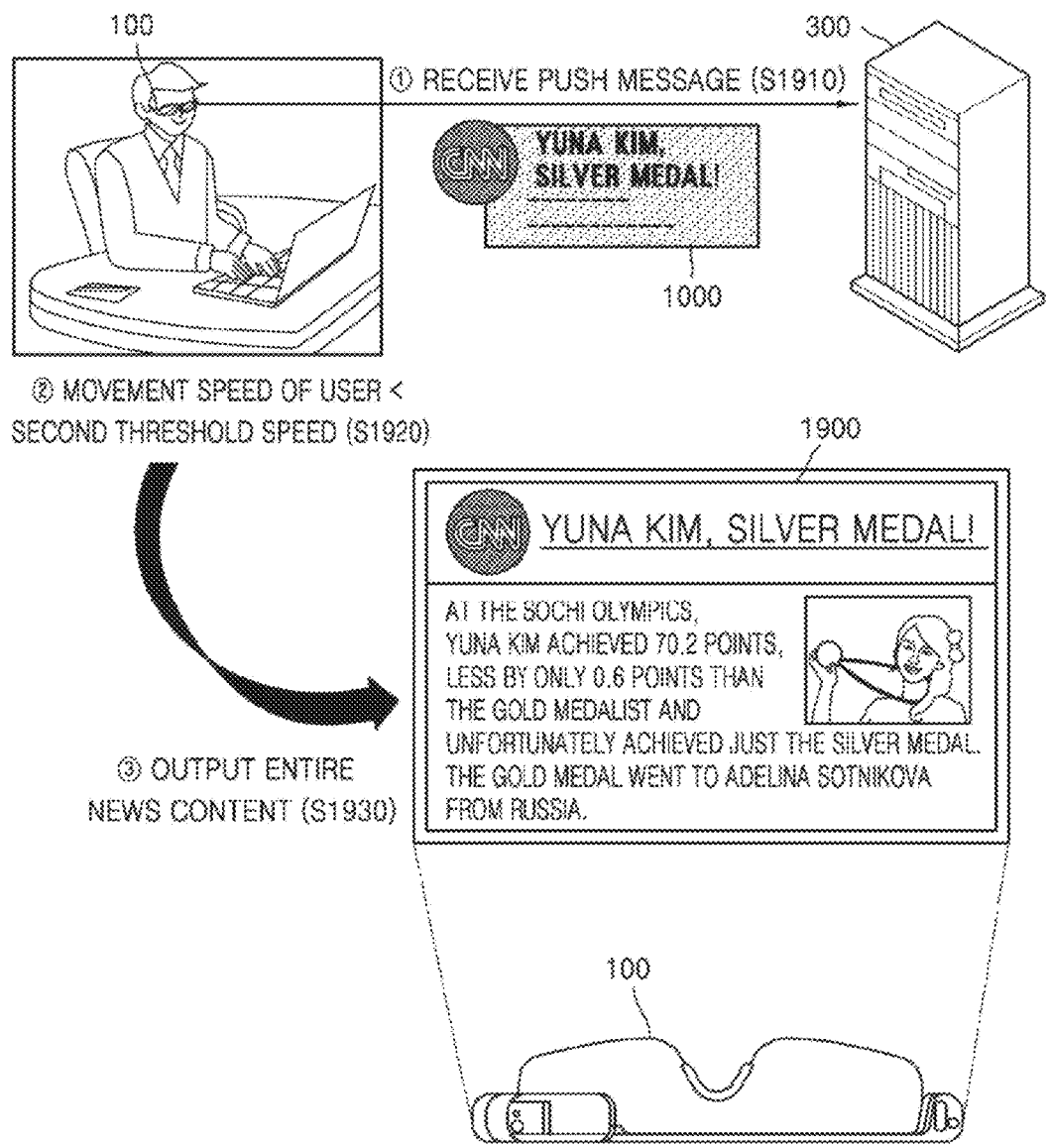

FIGS. 17 through 19 illustrate diagrams for describing an example of providing, by a wearable glasses, a portion of content or entire content corresponding to a notification event based on a movement speed of a user, according to exemplary embodiments.

An example where the user wearing the wearable glasses 100 is riding a bicycle will be described with reference to FIG. 17.

In operation S1710, the wearable glasses 100 may receive a push message including news content 1000 from the server 300.

In operation S1720, the wearable glasses 100 may determine whether a movement speed of the user is greater than a first threshold speed (e.g., 15 km/h) based on movement information of the user. As the user is riding a bicycle, an average movement speed of the user may be 18 km/h.

In operation S1730, the wearable glasses 100 may determine not to output (1700) the news content 1000 as a movement speed of the user (18 km/h) is greater than the first threshold speed (e.g., 15 km/h).

In regard to FIG. 18, an example where the user wearing the wearable glasses 100 is taking a walk with a dog will be described.

In operation S1810, the wearable glasses 100 may receive a push message including the news content 1000 from the server 300.

In operation S1820, the wearable glasses 100 may determine whether a movement speed of the user is between the first threshold speed (e.g., 15 km/h) and the second threshold speed (e.g., 2 km/h) based on movement information of the user. As the user is taking a walk, an average movement speed of the user may be 2.5 km/h.

In operation S1830, as the movement speed of the user (2.5 km/h) is between the first threshold speed (e.g., 15 km/h) and the second threshold speed (e.g., 2 km/h), the wearable glasses 100 may determine to output a portion of the news content 1000. For example, the wearable glasses 100 may extract a headline 1800 (e.g., "Yuna Kim, silver medal!") from the news content 1000, and provide the headline 1800 in the form of AR.

In regard to FIG. 19, an example where the user wearing the wearable glasses 100 is at work in an office will be described.

In operation S1910, the wearable glasses 100 may receive a push message including the news content 1000 from the server 300.

In operation S1920, the wearable glasses 100 may determine whether a movement speed of the user is less than the second threshold speed (e.g., 2 km/h) based on movement information of the user. As the user is sitting at a desk in an office, the movement speed of the user may be 0 km/h.

In operation S1930, as the movement speed of the user (0 km/h) is less than the second threshold speed (e.g., 2 km/h), the wearable glasses 100 may determine to output the entire news content 1000. For example, the wearable glasses 100 may provide the entire news article 1900 included in the news content 1000 in an AR form.

Figure 20:
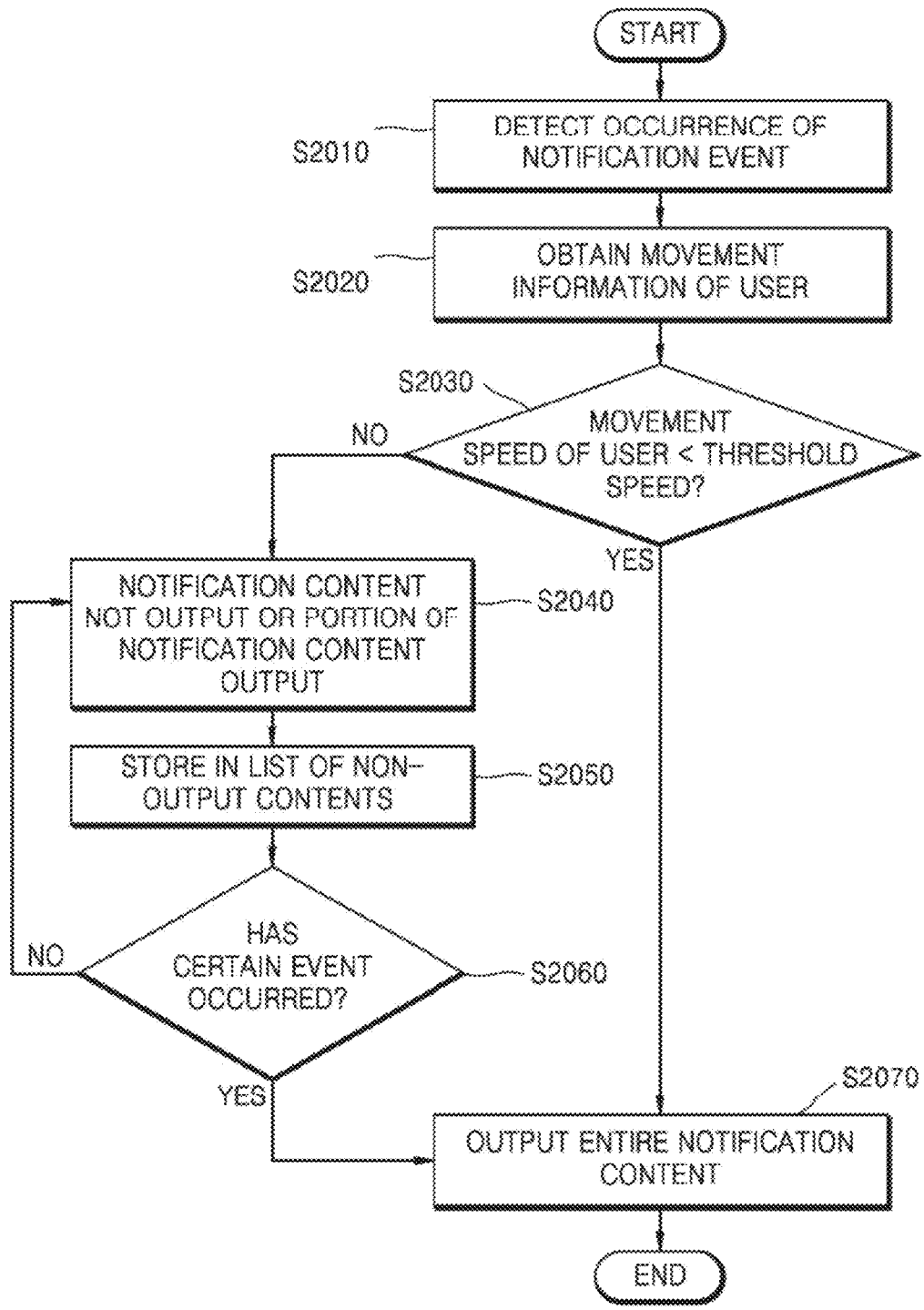
FIG. 20 illustrates a flowchart of a method used by a wearable glasses to output non-output content when an event has occurred, according to an exemplary embodiment.

FIG. 20 illustrates a flowchart of a method used by a wearable glasses to output non-output content when a certain event has occurred, according to an exemplary embodiment.

In operation S2010, the wearable glasses 100 may detect occurrence of a notification event.

In operation S2020, the wearable glasses 100 may obtain movement information of the user when detecting occurrence of the notification event.

In operation S2030, the wearable glasses 100 may determine whether a movement speed of the user is less than a threshold speed based on the movement information of the user. For example, the wearable glasses 100 may determine whether a movement speed of the user is less than 4 km/h which is the average walking speed.

When the movement speed of the user is equal to or greater than a threshold speed (S2030, NO), the wearable glasses 100 may not output notification content or may output a portion of the notification content. Here, according to an exemplary embodiment, when the movement speed of the user is equal to or greater than the threshold speed, the wearable glasses 100 may determine to output notification content at a point when a certain event has occurred. The certain event may be predetermined.

The certain event may include at least one of an event for receiving a user input for requesting to output notification content, an event whereby a preset time passes, and an event for changing a movement state of a user, but is not limited thereto. For example, the wearable glasses 100 may determine a point when a movement speed of the user becomes less than the threshold speed as a time to output notification content.

In operation S2050, the wearable glasses 100 may store non-output notification content or notification content including a portion which is output in a list of non-output notification content.

In operation S2060, the wearable glasses 100 may determine whether a certain event has occurred. When the certain event has not occurred (S2060, NO), the wearable glasses 100 may continuously not output notification content.

On the other hand, when the certain event has occurred (S2060, YES), the wearable glasses 100 may output the entire notification content in operation S2070. For example, when an event for changing a movement state of a user occurs, the wearable glasses 100 may output the entire notification content that has not been output yet or may output a remaining portion of a portion which has been output.

When notification content is video content or audio content, the wearable glasses 100 may replay the notification content. When notification content is still image content or text content, the wearable glasses 100 may display notification content at a present time.

Hereinafter, an operation of the wearable glasses 100 to output non-output content when a certain event has occurred will be described in detail with reference to FIG. 21.

Figure 21:
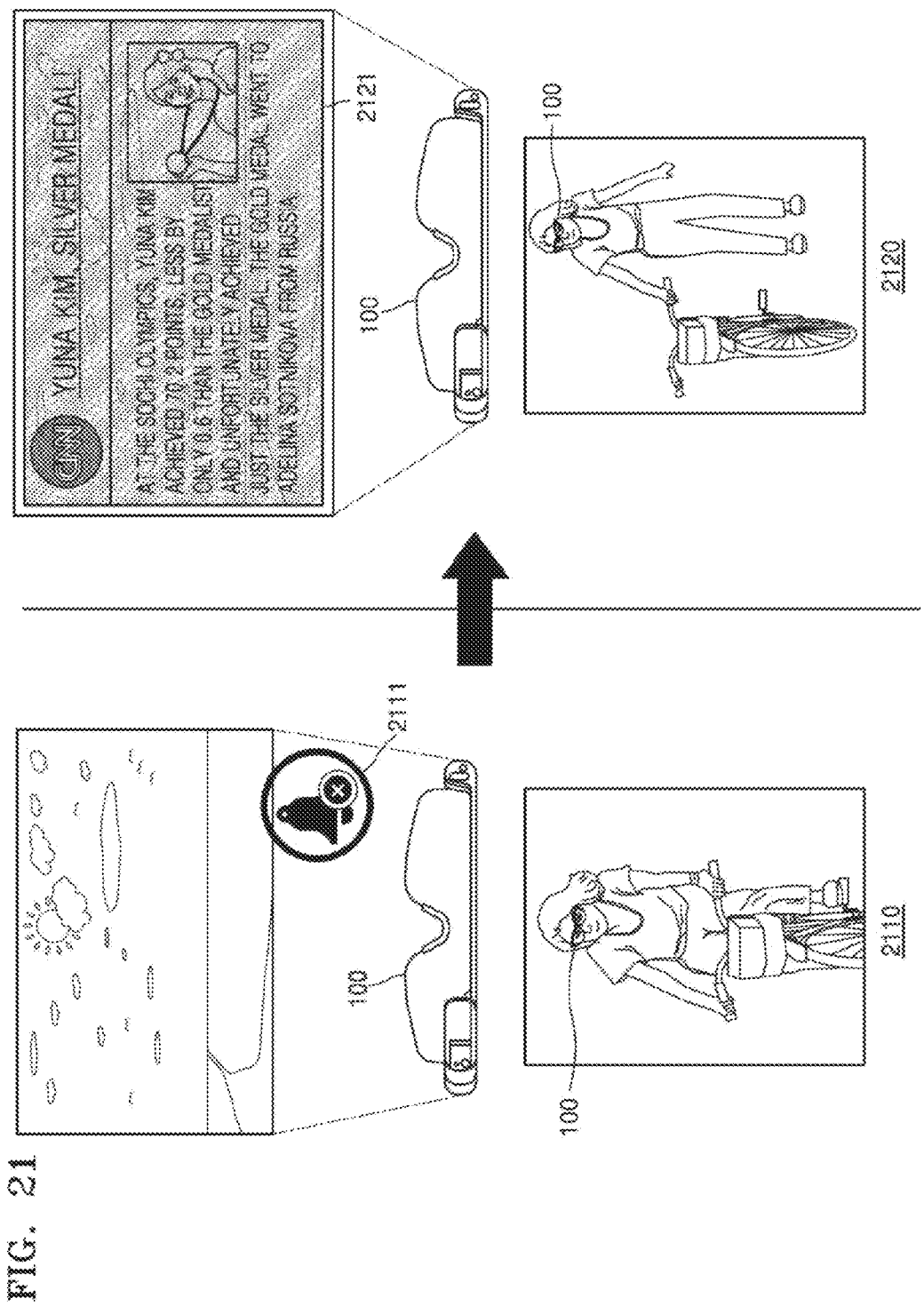
FIG. 21 illustrates an example of outputting, by a wearable glasses, content corresponding to a previously generated notification event based on a movement change event of a user, according to an exemplary embodiment.

FIG. 21 illustrates an example of outputting, by a wearable glasses, content corresponding to a previously occurred notification event based on a movement change event of a user.

Referring to 2110 of FIG. 21, while a user wearing the wearable glasses 100 is riding a bicycle, the wearable glasses 100 may receive a push message including news content 2121 from the server 300. In this case, the wearable glasses 100 may detect that a notification event for displaying news content 2121 has occurred.

The wearable glasses 100 may determine whether a movement speed of the user is greater than a threshold speed (e.g., 15 km/h) based on movement information of the user. The user is riding a bicycle, and thus an average movement speed of the user may be 18 km/h.

As the movement speed of the user (18 km/h) is greater than the threshold speed (e.g., 15 km/h), the wearable glasses 100 may not output news content 2121 at a present time (2111), and may determine to output news content 2121 when a certain event occurs. The certain event may be a point when the movement speed of the user becomes 2 km/h or less.

Referring to 2120 of FIG. 21, when the user wearing the wearable glasses 100 has stopped riding a bicycle, the wearable glasses 100 may detect that a certain event whereby a movement speed becomes 2 km/h or less has occurred.

The wearable glasses 100 may provide news content 2121 that is not output yet as a certain event is sensed. For example, the wearable glasses 100 may display the news content 2121 in the form of AR.

According to an exemplary embodiment, the wearable glasses 100 provides notification content when a movement speed of the user becomes a certain level or less, thereby preventing the user from being exposed to a dangerous situation.

Figure 22:
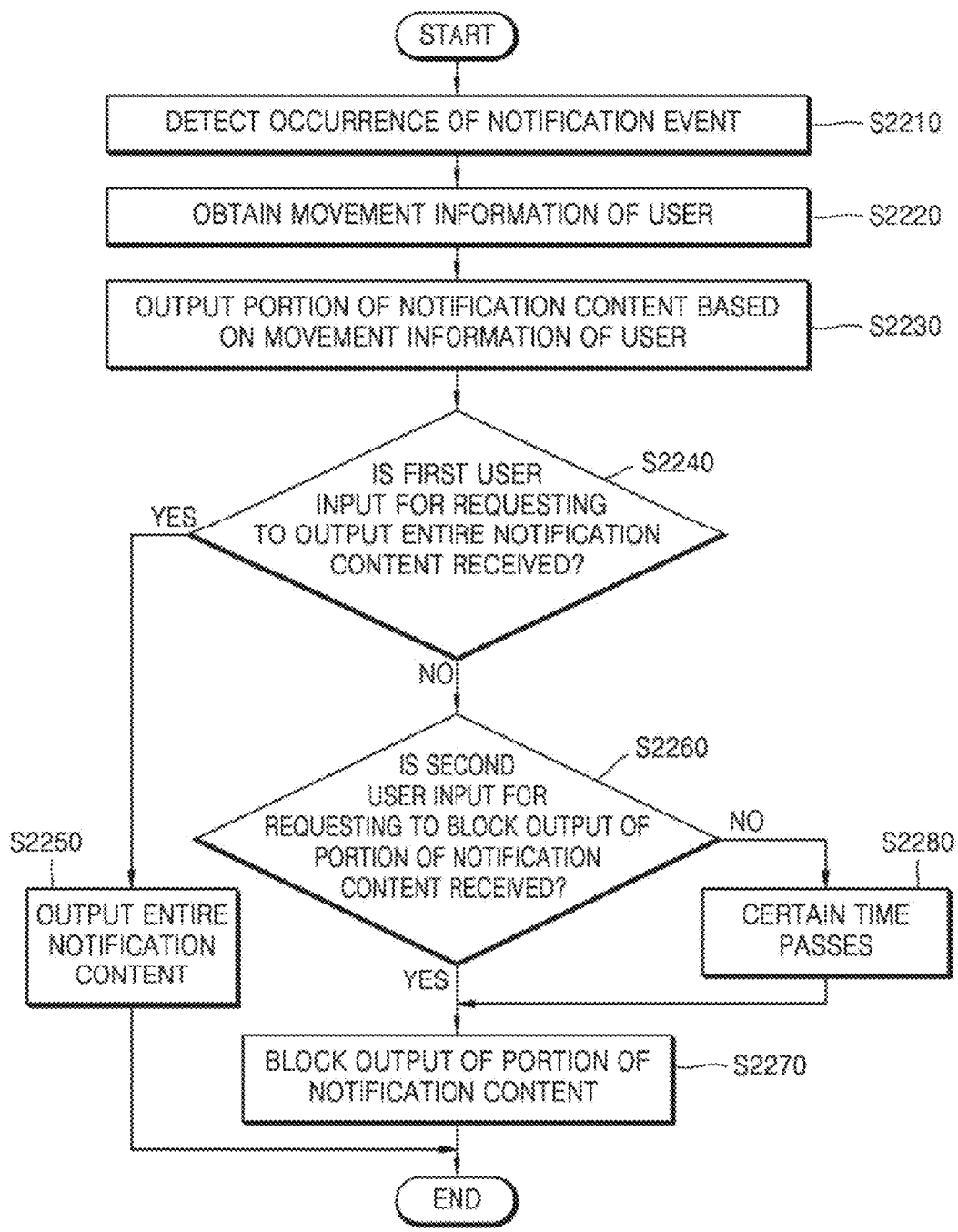
FIG. 22 illustrates a diagram for describing a method used by a wearable glasses that changes an output form of content based on a certain input by a user, according to an exemplary embodiment.

FIG. 22 illustrates a diagram for describing a method used by a wearable glasses that changes an output form of content based on a certain input by a user, according to an exemplary embodiment.

In operation S2210, the wearable glasses 100 may detect occurrence of a notification event.

In operation S2220, the wearable glasses 100 may obtain movement information of a user when detecting occurrence of a notification event.

In operation S2230, the wearable glasses 100 may output a portion of notification content based on movement information of the user. For example, the wearable glasses 100 may output a portion of notification content when it is determined that the user is walking the street.

In operation S2240, the wearable glasses 100 may determine whether a first user input for requesting to output the entire notification content is received or not.

According to an exemplary embodiment, examples of a first user input for requesting to output the entire content may vary. For example, the first user input may be at least one of a motion input, a touch input, a key input, a voice input, and a multiple input, but is not limited thereto.

According to an exemplary embodiment, the first user input for requesting to output the entire notification content may be preset. For example, a head up motion may be set as the first user input for requesting to output the entire content.

When the first user input for requesting to output the entire notification content is received (S2240, YES), the wearable glasses 100 may output the entire notification content in response to the first user input in operation S2250. For example, the wearable glasses 100 may replay the entire notification content when the notification content is video content or audio content. The wearable glasses 100 may display the entire notification content in the form of AR when the notification content is still image content or text content.

On the other hand, when the first user input for requesting to output the entire notification content is not received (S2240, NO), wearable glasses 100 may determine whether a second user input for requesting blocking of the output of the portion of the notification content has been received in operation S2260.

According to an exemplary embodiment, examples of the second user input for requesting blocking of partial output of notification content may vary. For example, the second user input may be at least one of a motion input, a touch input, a key input, a voice input, and a multiple input, but is not limited thereto.

According to an exemplary embodiment, a second user input for requesting blocking of partial output of notification content may be preset. For example, a user may set a shaking motion of shaking the head to the left and the right as the second user input for requesting blocking of partial output of notification content.

When the second user input for requesting to block output of a portion of the notification content is received (S2260, YES), the wearable glasses 100 may block partial output of notification content according to the second user input in operation S2270. In the present specification, 'blocking output' may indicate that an outputting condition is ended. For example, when the wearable glasses 100 blocks output of notification content, the notification content that was displayed in front of the eyes of the user may disappear or a sound signal may not be output anymore.

On the other hand, when the second user input for requesting to block output of a portion of the notification content is not received (S2260, NO), the wearable glasses 100 may wait for a certain amount of time to pass in operation S2280. When no additional user input is received after a certain period of time passes, the wearable glasses 100 may block the output of the portion of the notification content in operation S2270. For example, when a first user input requesting output of the entire notification content is not received after a portion of the notification content has been output, the wearable glasses 100 may not output a portion of the notification content anymore. That is, the user may decide that it is acceptable to output the entire content, or alternatively, the user may decide to quickly block the output of the portion of the notification or to take no action in which case the output of the portion of the notification is blocked after a certain time period has passed.

Hereinafter, an example of modifying, by the wearable glasses 100, an output form of content based on a certain input of a user will be described with reference to FIGS. 23 and 24.

Figure 23:
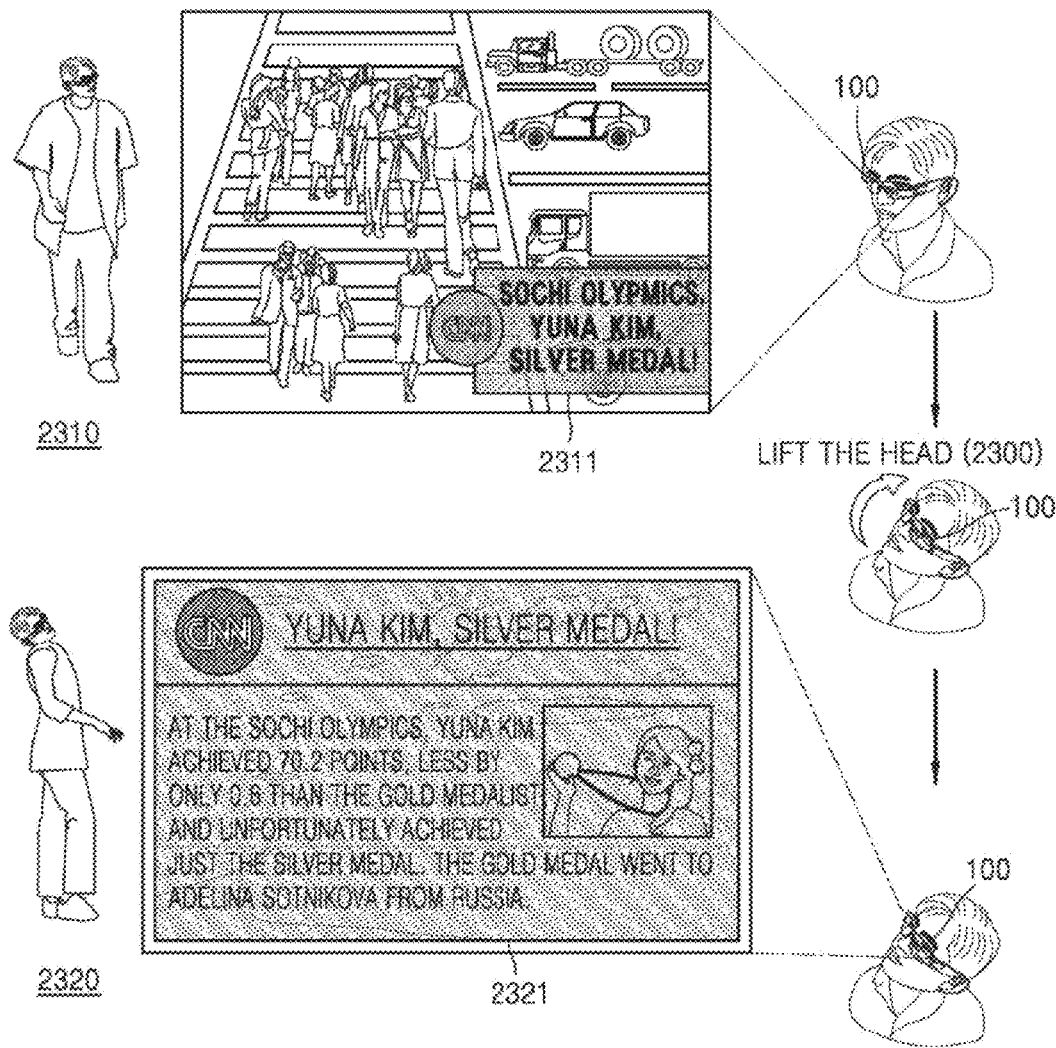
FIGS. 23 and 24 illustrate diagrams for describing an example of outputting, by a wearable glasses, entire content based on a head up motion of a user.
Figure 24:
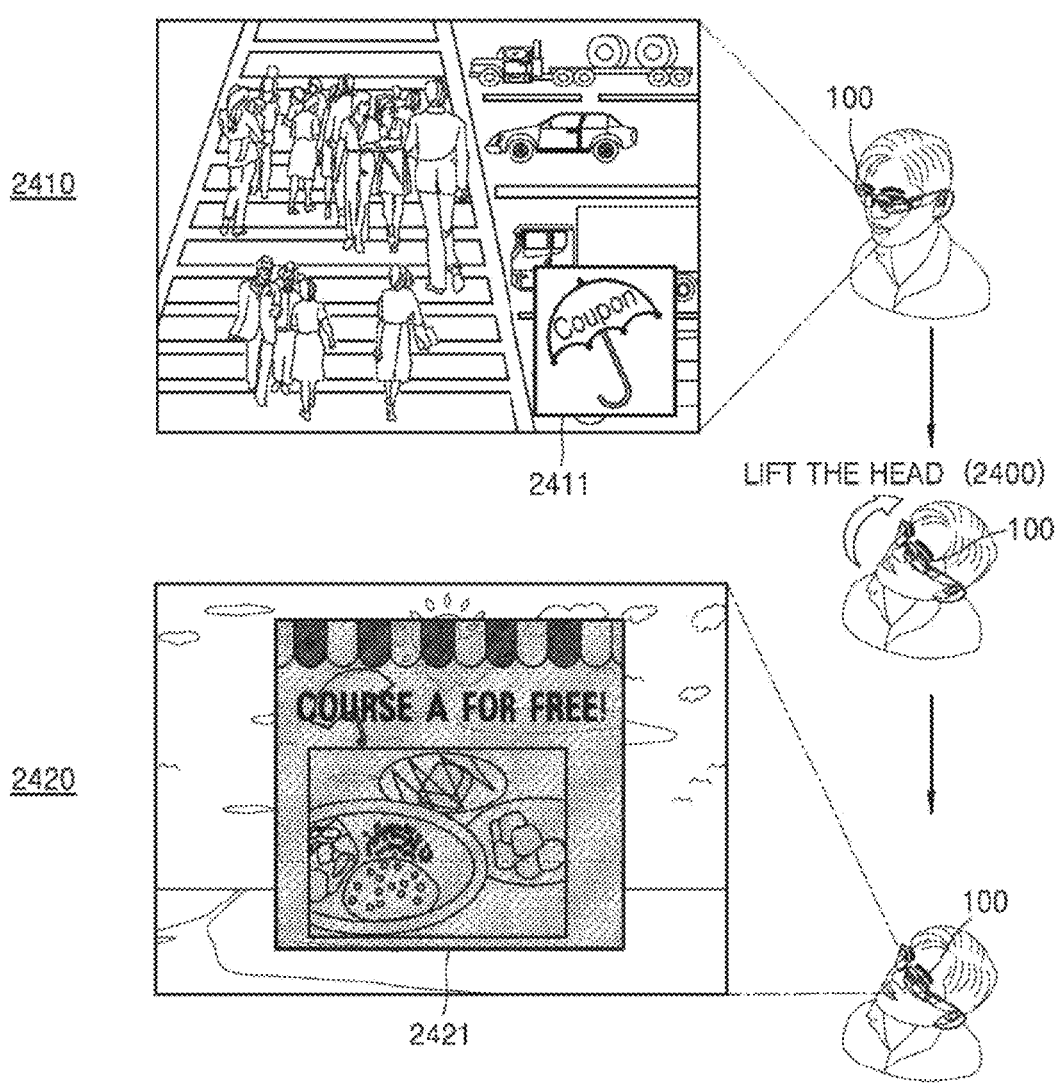

FIGS. 23 and 24 illustrate diagrams for describing an example of outputting, by a wearable glasses, entire content based on a head up motion of a user. In regard to FIGS. 23 and 24, an example where a user input for requesting to output the entire content is a head up motion will be described.

Referring to 2310 of FIG. 23, while a user wearing the wearable glasses 100 is crossing a pedestrian crossing, the wearable glasses 100 may receive a push message including news content from the server 300. In this case, the wearable glasses 100 may detect that a notification event for displaying news content has occurred.

According to an exemplary embodiment, the wearable glasses 100 may obtain movement information of a user before displaying the news content. For example, the wearable glasses 100 may determine that the user is moving at a speed of 3 km/h as discussed previously.

As the user is moving, the wearable glasses 100 may output a portion 2311 of the news content in order not to obstruct the user's view. For example, the wearable glasses 100 may extract a headline from the news content and output the extracted headline. In this case, the user may check the headline of the news content while crossing a pedestrian crossing.

According to an exemplary embodiment, after checking the headline of the news content, in order to view the entire news content 2321, the user may stop and look up to the sky after completely crossing the pedestrian crossing.

In this case, the wearable glasses 100 may sense a head up motion 2300 of the user while outputting the portion 2311 of the news content (e.g., a headline). For example, the wearable glasses 100 may sense the head up motion 2300 of the user via a tilt sensor, an acceleration sensor, a gyroscope sensor or the like, as described previously.

Referring to 2320 of FIG. 23, the wearable glasses 100 may output the entire news content 2321 according to the head up motion 2300 of the user. In this case, the user may safely check the entire news content 2321.

According to another exemplary embodiment, in order to prevent output of the entire news content 2321 regardless of the user's intention, the wearable glasses 100 may output the entire news content 2321 only when a time period of the head up motion 2300 is equal to or greater than a threshold time. For example, the wearable glasses 100 may measure a time period of the head up motion 2300 when the head up motion 2300 of the user is sensed. The wearable glasses 100 may output the entire news content 2321 when the time period of the head up motion 2300 is equal to or greater than a threshold time (e.g., two seconds). That is, in order to prevent the inadvertent output of the entire content when, for example, the user looks up at plane or bird in the sky, the wearable glasses 100 may check to ensure that the head up motion 2400 is an intended motion for viewing the entire content.

Referring to 2410 of FIG. 24, while the user wearing the wearable glasses 100 is crossing a pedestrian crossing, the wearable glasses 100 may receive a push message including advertisement content. In this case, the wearable glasses 100 may sense that a notification event for displaying advertisement content has occurred.

According to an exemplary embodiment, the wearable glasses 100 may obtain movement information of the user before displaying the advertisement content. For example, the wearable glasses 100 may determine that the user is moving at a speed of 3 km/h.

As the user is moving, in order not to obstruct the user's view much, the wearable glasses 100 may output a portion of the advertisement content. For example, the wearable glasses 100 may display a thumbnail image 2411 of the advertisement content. In this case, the user may determine that the advertisement content is received while crossing the pedestrian crossing.

According to an exemplary embodiment, the user may stop after completely crossing the pedestrian crossing and loop up to the sky in order to view the entire advertisement content 2421 after checking the thumbnail 2411 of the advertisement content. In this case, the wearable glasses 100 may sense the head up motion 2400 while outputting a portion of the advertisement content (e.g., the thumbnail image 2411). For example, the wearable glasses 100 may sense the head up motion 2400 by using a tilt sensor, an acceleration sensor, a gyroscope sensor or the like.

Referring to 2420 of FIG. 24, the wearable glasses 100 may output the entire advertisement content 2421 according to the head up motion 2400 of the user. In this case, the user may check the entire advertisement content 2421 in a safe condition.

According to another exemplary embodiment, in order to prevent that the entire advertisement content 2421 is output regardless of the user's intention, the wearable glasses 100 may output the entire advertisement content 2421 only when a time period of the head up motion 2400 is equal to or greater than a threshold time (e.g., three seconds). That is, in order to prevent the inadvertent output of the entire content when, for example, the user looks up at plane or bird in the sky, the wearable glasses 100 may check to ensure that the head up motion 2400 is an intended motion for viewing the entire content.

FIG. 25 illustrates a diagram for describing an example of blocking, by a wearable glasses which has output a portion of content, output of the content based on a user input. In regard to FIG. 25, an example where a user input for requesting to block output of content is a shaking motion will be described.

Referring to 2510 of FIG. 25, while a user wearing the wearable glasses 100 is crossing a pedestrian crossing, the wearable glasses 100 may receive a push message including news content from the server 300. In this case, the wearable glasses 100 may detect that a notification event for displaying news content has occurred.

According to an exemplary embodiment, the wearable glasses 100 may obtain movement information of the user before displaying the news content. For example, the wearable glasses 100 may determine that the user is moving at a speed of 3 km/h.

As the user is moving, in order not to obstruct the user's view much, the wearable glasses 100 may output a portion 2511 of the news content (e.g., a headline). The user may check a headline of the news content while crossing the pedestrian crossing.

According to an exemplary embodiment, after checking the headline of the news content, if the user does not wish to view the news content, the user may shake the head to the left and the right. In this case, the wearable glasses 100 may sense a shaking motion 2500 of the user while outputting the portion 2511 of the news content (e.g., a headline). For example, the wearable glasses 100 may sense the shaking motion 2500 of shaking the head to the left and the right a certain number of times (e.g., twice) by using a tilt sensor, an acceleration sensor, a gyroscope sensor or the like, as previously described.

Referring to 2520 of FIG. 25, the wearable glasses 100 may not display the portion 2511 of the news content (e.g., a headline) anymore based on the shaking motion 2500 of the user. According to an exemplary embodiment, the wearable glasses 100 may add the news content to a list of non-output contents, as previously described.

Although a motion input is described as an example of a user input with reference to FIGS. 23 through 25, the embodiments are not limited thereto. For example, the user may input to the wearable glasses 100 voice for requesting to output the entire notification content or voice for requesting to block output of notification content or may select a button included in the wearable glasses 100 to request or block output.

Figure 26:
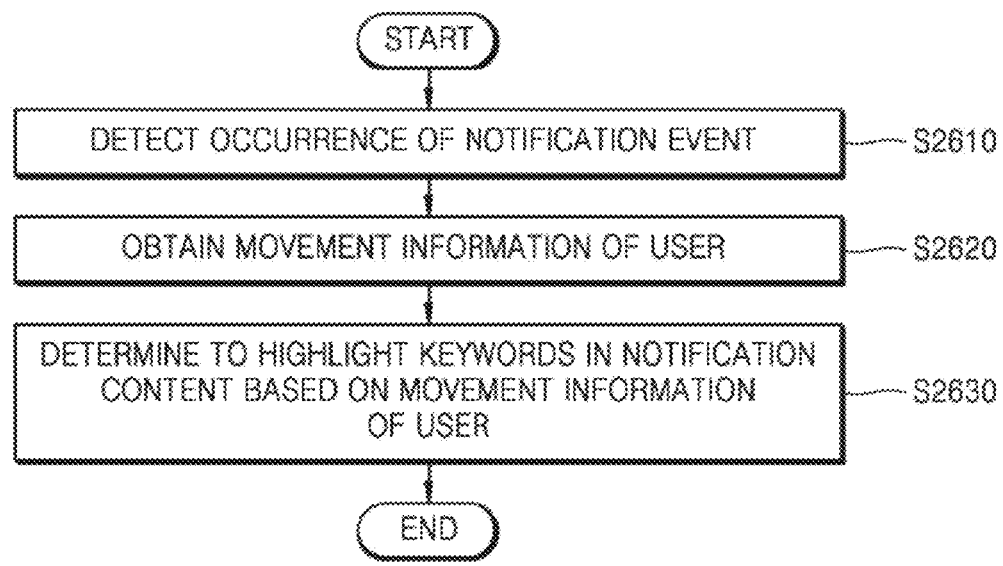
FIG. 26 illustrates a flowchart of a method used by a wearable glasses to highlight a keyword in content corresponding to an event, according to an exemplary embodiment.

FIG. 26 illustrates a flowchart of a method used by a wearable glasses to highlight a keyword in content corresponding to a notification event, according to an exemplary embodiment.

In operation S2610, the wearable glasses 100 may detect occurrence of a notification event.

In operation S2620, the wearable glasses 100 may obtain movement information of a user when detecting occurrence of a notification event.

In operation S2630, the wearable glasses 100 may determine to highlight a keyword in notification content based on movement information of the user.

For example, based on movement information of the user, when a movement speed of the user is equal to or greater than a threshold speed (e.g., 4 km/h), the wearable glasses 100 may extract keywords from notification content. According to an exemplary embodiment, information about keywords may be stored in metadata of the notification content.

According to an exemplary embodiment, the wearable glasses 100 may highlight keywords in the notification content. For example, the wearable glasses 100 may adjust sizes or colors of keywords or may underline the keywords. An operation of the wearable glasses 100 to highlight keywords in notification content will be described in more detail with reference to FIG. 27.

Figure 27:
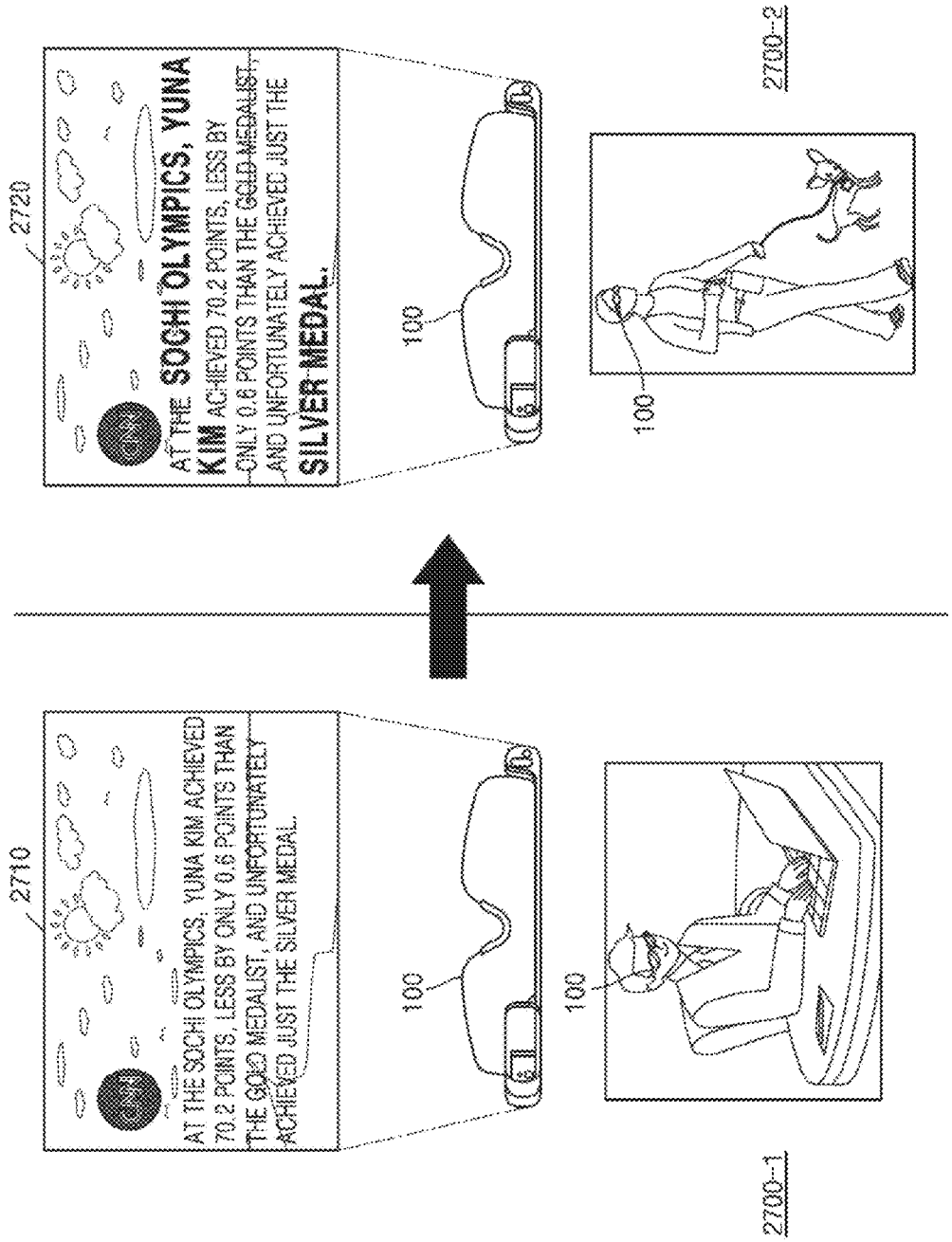
FIG. 27 illustrates a diagram for describing an example of highlighting, by a wearable glasses, a keyword in content based on movement information of a user, according to an exemplary embodiment.

FIG. 27 illustrates a diagram for describing an example of highlighting, by a wearable glasses, a keyword in content based on movement information of a user, according to an exemplary embodiment.

Referring to 2700-1 of FIG. 27, the wearable glasses 100 may receive a push message including news content from the server 300. In this case, the wearable glasses 100 may detect that a notification event for displaying news content has occurred.

According to an exemplary embodiment, the wearable glasses 100 may obtain movement information of the user before displaying the news content. For example, when an average movement speed of the user is 0.0001 km/h for a period of time and the user is in an office for a period of time, the wearable glasses 100 may determine that the user is sitting on a chair and working. The periods of time may be predetermined.

When the user is sitting on a chair and working, since this situation is not dangerous even if the user's view is obstructed, the wearable glasses 100 may output the entire news content 2710 (e.g., "At the Sochi Olympics, Yuna Kim achieved 70.2 points, less by only 0.6 points than the gold medallist, and unfortunately achieved just the silver medal." received from the server 300 at a present time.

Referring to 2700-2 of FIG. 27, while a user wearing the wearable glasses 100 is taking a walk, the wearable glasses 100 may receive a push message including news content from the server 300. In this case, the wearable glasses 100 may detect that a notification event for displaying news content has occurred.

According to an exemplary embodiment, the wearable glasses 100 may obtain movement information of a user before displaying the news content. For example, the wearable glasses 100 may determine that the user is moving at an average speed of 3 km/h for a period of time.

When the user is moving at a threshold speed (e.g., 2 km/h) or greater, since the user is not able to concentrate on the entire news content 2710 (e.g., "At the Sochi Olympics, Yuna Kim achieved 70.2 points, less by only 0.6 points than the gold medallist, and unfortunately achieved just the silver medal."), the wearable glasses 100 may extract keywords included in the news content and highlight the keywords.

For example, the wearable glasses 100 may extract 'Yuna Kim,' 'Sochi Olympics,' and 'silver medal' from the news content as keywords and adjust the size, thickness, and color of Yuna Kim,' 'Sochi Olympics,' and 'silver medal.'

Figure 28:
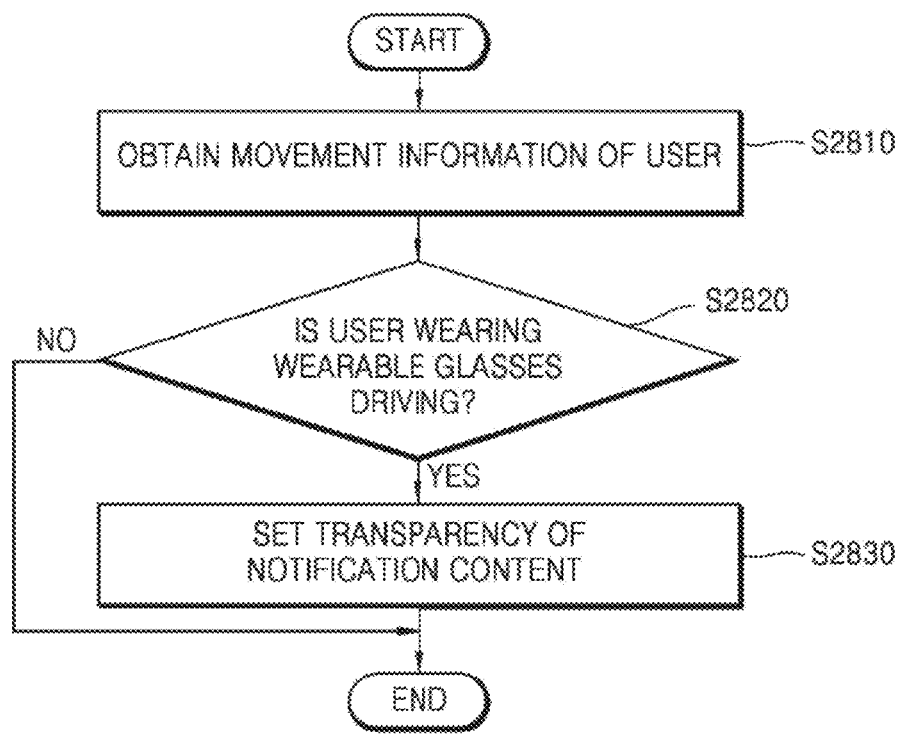
FIG. 28 illustrates a flowchart of a method used by a wearable glasses to adjust a transparency of content corresponding to an event, according to an exemplary embodiment.

FIG. 28 illustrates a flowchart of a method used by a wearable glasses to adjust a transparency of content corresponding to a notification event, according to an exemplary embodiment.

In operation S2810, the wearable glasses 100 may obtain movement information of a user when a notification event has occurred.

In operation S2820, the wearable glasses 100 may determine whether the user wearing the wearable glasses 100 is driving or not, based on movement information of the user.

According to an exemplary embodiment, the wearable glasses 100 may measure a movement speed of the user by using an acceleration sensor included in the wearable glasses 100. The wearable glasses 100 may determine that the user is driving if the user is moving at 80 km/h.

According to an exemplary embodiment, the wearable glasses 100 may determine whether a user is driving or not, based on acceleration information received from the mobile terminal 200 connected to the wearable glasses 100 or a navigation device included in a car.

According to an exemplary embodiment, when the user sets an operating mode of the wearable glasses 100 to a navigation mode, the wearable glasses 100 may determine that the user is driving.

In operation S2830, when it is determined that the user is driving, the wearable glasses 100 may set a transparency of notification content. For example, when it is determined that the user is driving, the wearable glasses 100 may display the notification content by setting a transparency of the notification content to 50%.

According to an exemplary embodiment, the Wearable glasses 100 may adjust a transparency of notification content based on a driving speed. For example, the wearable glasses 100 may increase a transparency of notification content to become more transparent as the driving speed increases.

Figure 29:
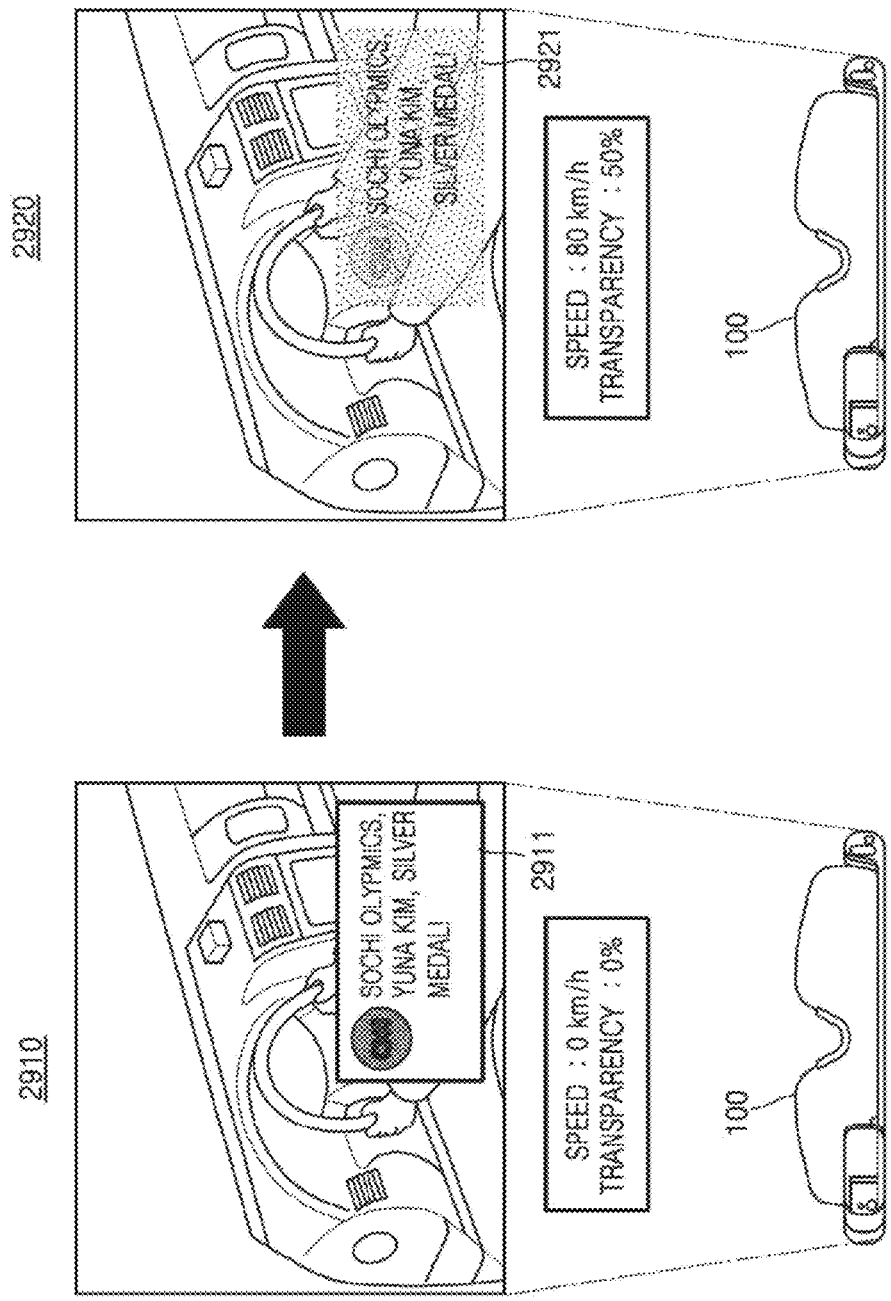
FIG. 29 illustrates a diagram illustrating an example of adjusting, by a wearable glasses, a transparency of content based on speed information of a user when the user is driving, according to an exemplary embodiment.

FIG. 29 illustrates a diagram illustrating an example of a wearable glasses that adjusts a transparency of content based on speed information of a user when the user is driving, according to an exemplary embodiment.

Referring to 2910 of FIG. 29, the user wearing the wearable glasses 100 may receive a push message including news content from the server 300. In this case, the wearable glasses 100 may detect that a notification event for displaying news content has occurred.

According to an exemplary embodiment, the wearable glasses 100 may obtain movement information of the user before displaying the news content. For example, the wearable glasses 100 may determine that an average movement speed of the user is 0 km/h during a period of time. The period of time may be predetermined.

As the user is in a standstill state, the wearable glasses 100 may set a transparency of the news content to 0% and thus display opaque news content 2911.

Referring to 2920 of FIG. 29, on the other hand, while the user wearing the wearable glasses 100 is driving, the wearable glasses 100 may receive a push message including news content from the server 300. In this case, the wearable glasses 100 may detect that a notification event for displaying news content has occurred.

According to an exemplary embodiment, the wearable glasses 100 may obtain movement information of the user before displaying the news content. For example, the wearable glasses 100 may determine that an average movement speed of the user during a period of time is 80 km/h and that the user is driving.

As the user is in a driving state, the wearable glasses 100 may set a transparency of the news content to 50% and display semi-transparent news content 2921.

According to an exemplary embodiment, the wearable glasses 100 may adjust a transparency of notification content to prevent obstruction of the view of the user who is driving.

Figure 30:
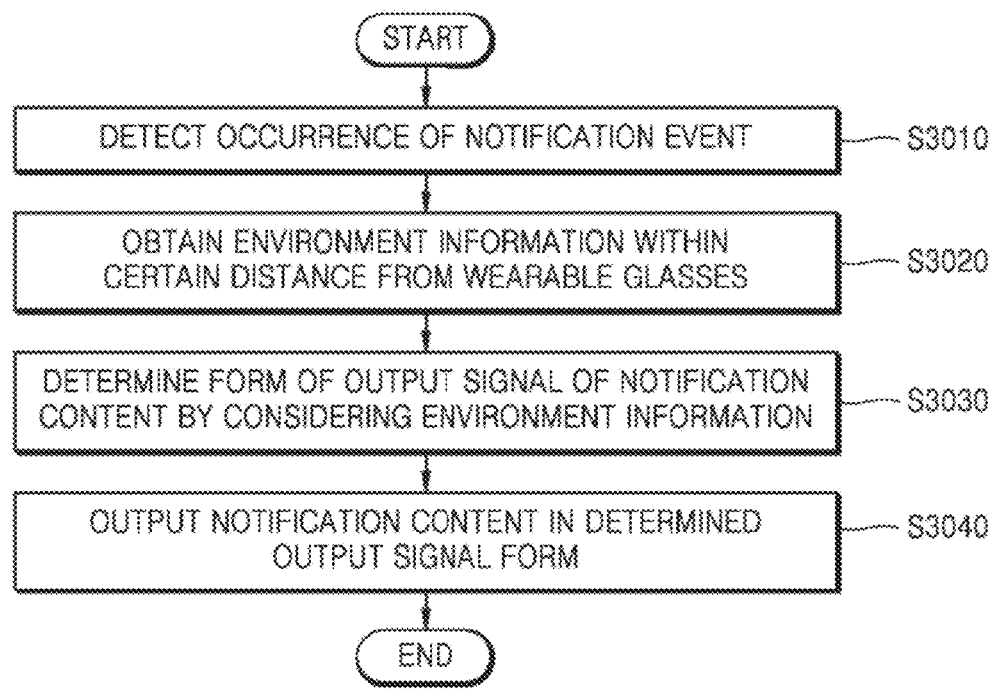
FIG. 30 illustrates a diagram for describing a method used by a wearable glasses to determine a form of an output signal based on environment information, according to an exemplary embodiment.

FIG. 30 illustrates a diagram for describing a method used by a wearable glasses to determine a form of an output signal based on environment information, according to an exemplary embodiment.

In operation S3010, the wearable glasses 100 may detect occurrence of a notification event.

In operation S3020, the wearable glasses 100 may obtain environment information about an environment within a certain distance from the wearable glasses 100. The certain distance may be predetermined. Environment information may include at least one of information about external sounds generated within a certain distance from the wearable glasses 100 and information about an external image obtained using the image sensor 161.

For example, the wearable glasses 100 may capture an image of the surroundings by using the image sensor 161. The image sensor 161 may be mounted near the eyes of the user when the user wears the wearable glasses 100 so as to capture an image similar to an image recognized by the eyes of the user. The wearable glasses 100 may analyze a captured image to obtain information about an external image. For example, the wearable glasses 100 may obtain object information, edge information, atmosphere information, and color information included in a captured image.

The wearable glasses 100 may detect surrounding sounds via a microphone. The wearable glasses 100 may analyze detected surrounding sounds to obtain external sound information. For example, the wearable glasses 100 may obtain information about an amount of surrounding noise, information on whether there are multiple voices or the like.

The wearable glasses 100 may also obtain environment information about an environment within a certain distance from another wearable device of the user wearing the wearable glasses 100 existing within a radius of short-range communication or from the mobile terminal 200. For example, when the mobile terminal 200 has obtained information about an external image by analyzing an image captured using a necklace, the wearable glasses 100 may receive the information about an external image from the mobile terminal 200.

Also, the wearable glasses 100 may receive information about an external sound obtained using the mobile terminal 200 or a watch, from the mobile terminal 200 or the watch.

In operation S3030, the wearable glasses 100 may determine an output signal form of notification content by considering environment information.

According to an exemplary embodiment, the wearable glasses 100 may determine to provide notification content in the form of at least one of an audio signal and a video signal, by considering environment information. For example, when a level of surrounding noise is equal to or greater than a threshold value or a plurality of voices are detected, the wearable glasses 100 may determine to output notification content in the form of a video signal. Also, when edges that are more than a certain number are detected from a captured image, the wearable glasses 100 may determine to output notification content in the form of an audio signal. The certain number may be a predetermined number.

In operation S3040, the wearable glasses 100 may output notification content in the form of the determined output signal form. This operation will be described with reference to FIGS. 31 and 32.

Figure 31:
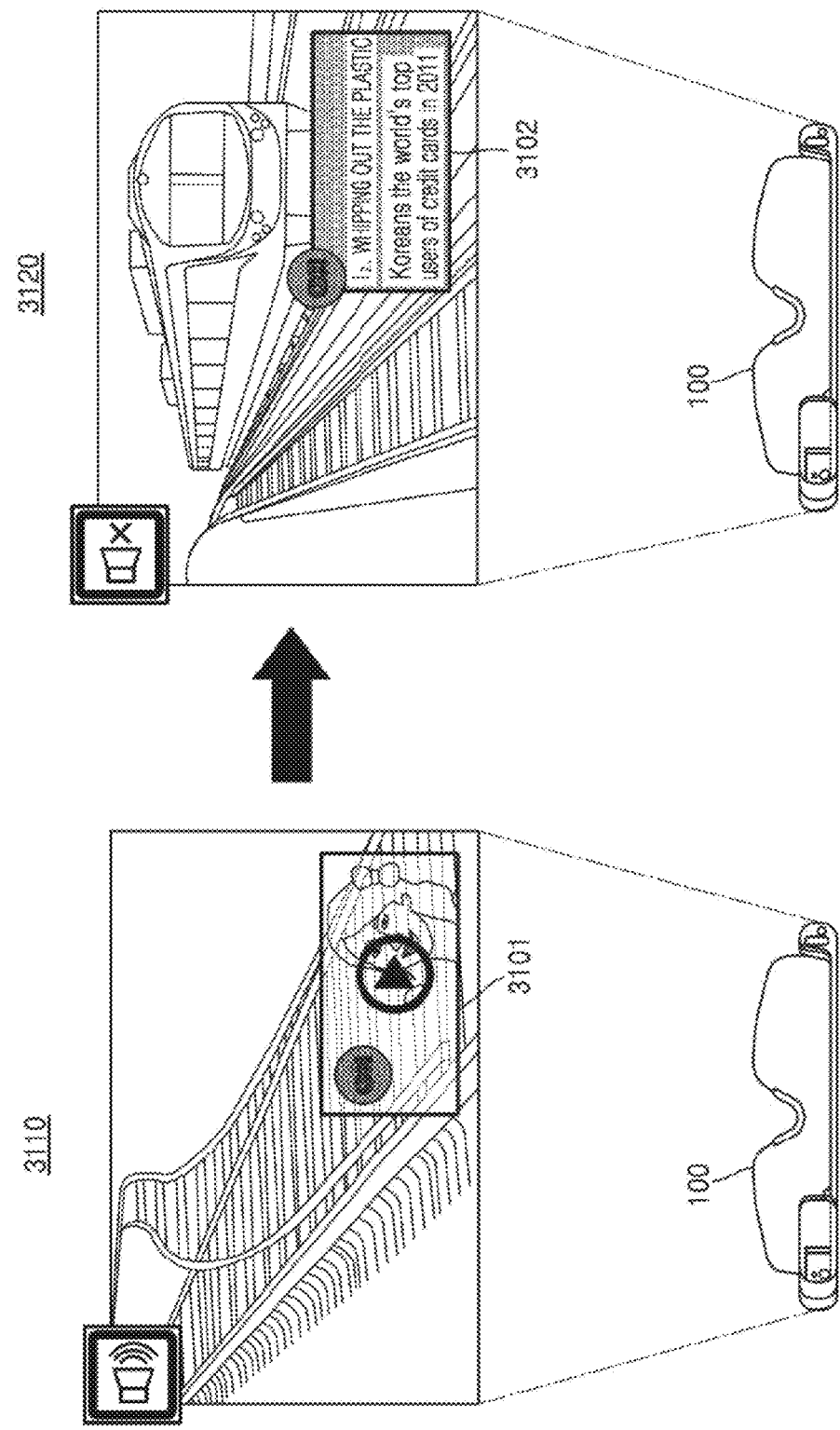
FIGS. 31 and 32 illustrate diagrams illustrating an example of adjusting, by a wearable glasses, a form of an output signal based on external sound information, according to an exemplary embodiment.
Figure 32:
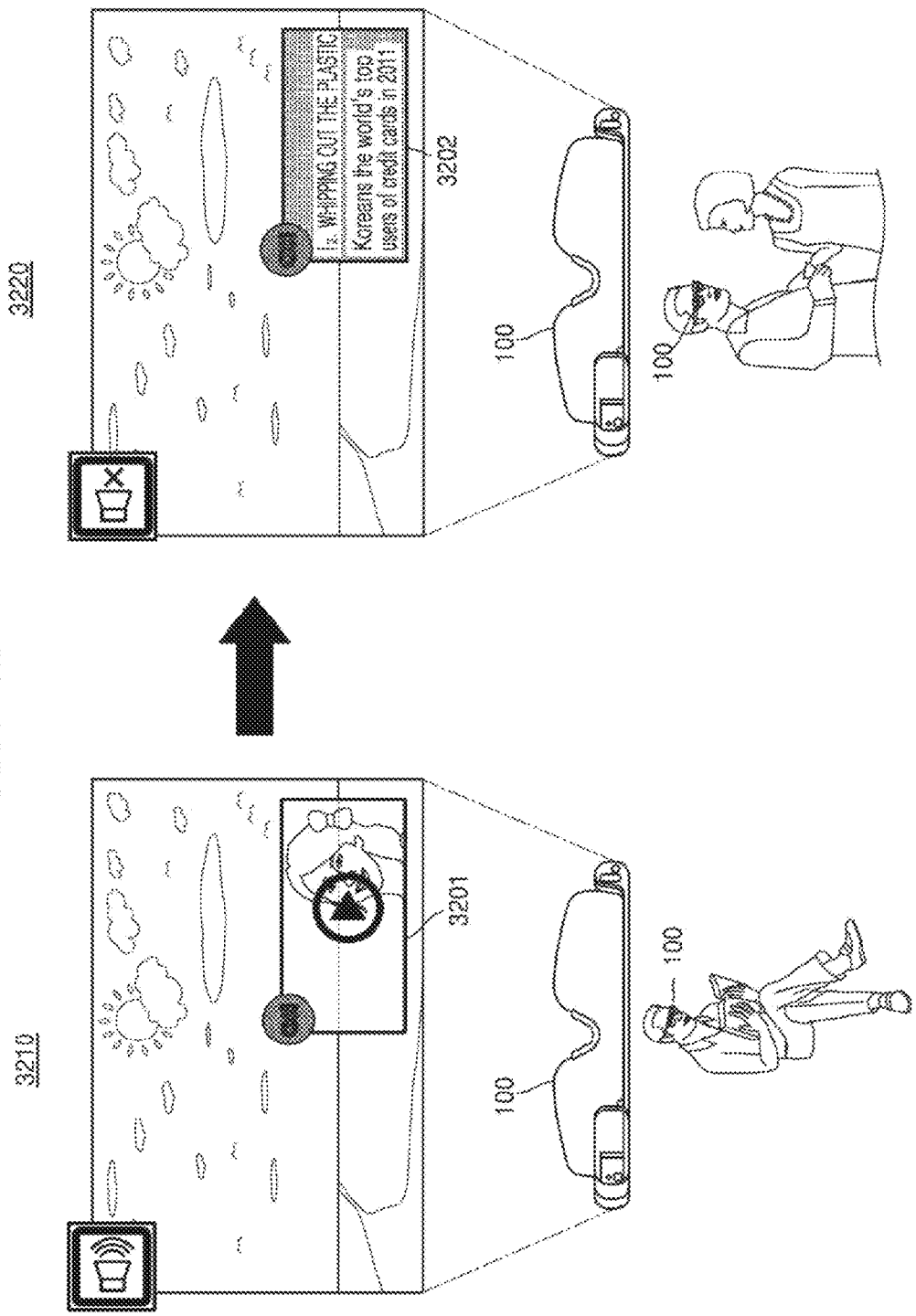

FIGS. 31 and 32 illustrate diagrams illustrating an example of adjusting, by a wearable glasses, a form of an output signal based on external sound information, according to an exemplary embodiment.

Referring to 3110 of FIG. 31, while a user wearing the wearable glasses 100 is waiting for a train, the wearable glasses 100 may receive a push message including news video content 3101 from the server 300. In this case, the wearable glasses 100 may detect that a notification event for displaying the news video content 3101 has occurred.

According to an exemplary embodiment, the wearable glasses 100 may obtain movement information of the user before displaying the news video content 3101. For example, the wearable glasses 100 may determine that an average movement speed of the user for a period of time is 0 km/h and that the user is in a standstill state.

As the user is in a standstill state, the wearable glasses 100 may determine to output the news video content 3101. The wearable glasses 100 may further include information about an environment within a certain distance therefrom. For example, the wearable glasses 100 may activate a microphone to detect surrounding sounds. As level of the surrounding sounds is equal to a threshold value or less (e.g., 70 dB), the wearable glasses 100 may replay the news video content 3101.

Referring to 3120 of FIG. 31, a subway train is coming in to the platform, and thus, the level of the surrounding sounds (e.g., 85 dB) may be greater than a threshold value (e.g., 70 dB). In this case, the wearable glasses 100 may convert an audio signal of the news video content 3101 to a text signal and display the text signal.

For example, the wearable glasses 100 may convert voice included in the news video content 3101 to text based on a speech to text (STT) technique to thereby generate a transcript 3102 corresponding to the news video content 3101. In the present specification, a transcript may refer to a record including text converted from speech.

According to an exemplary embodiment, when surrounding sounds are equal to or greater than a threshold value, the wearable glasses 100 may provide a transcript corresponding to audio content so that the user may visually recognize notification content.

Referring to 3210 of FIG. 32, while the user wearing the wearable glasses 100 is sitting and reading a book in a park, the wearable glasses 100 may receive a push message including news video content 3201 from the server 300. In this case, the wearable glasses 100 may detect that a notification event for displaying the news video content 3201 has occurred.

According to an exemplary embodiment, the wearable glasses 100 may obtain movement information of the user before displaying the news video content 3201. For example, the wearable glasses 100 may determine that an average movement speed of the user during a period of time is 0 km/h and that the user is in a standstill state.

As the user is in a standstill state, the wearable glasses 100 may determine to output the news video content 3201. The wearable glasses 100 may further include environment information about an environment within a certain distance therefrom. For example, the wearable glasses 100 may activate a microphone to detect surrounding sounds. As the level of the surrounding sounds is equal to a threshold value or less (e.g., 70 dB), the wearable glasses 100 may replay the news video content 3201.

Referring to 3220 of FIG. 32, as the user wearing the wearable glasses 100 is having conversation with another person, the wearable glasses may detect multiple voices. When multiple voices are detected, if the HMS apparatus 100 replays the news video content 3201, the replaying may disturb the conversation, and thus, the HMS apparatus 100 may convert an audio signal of the news video content 3201 to a text signal and display the text signal. For example, the wearable glasses 100 may convert voice included in the news video content 3201 to a text 3202 based on a STT technique and display the text 3202.

Figure 33:
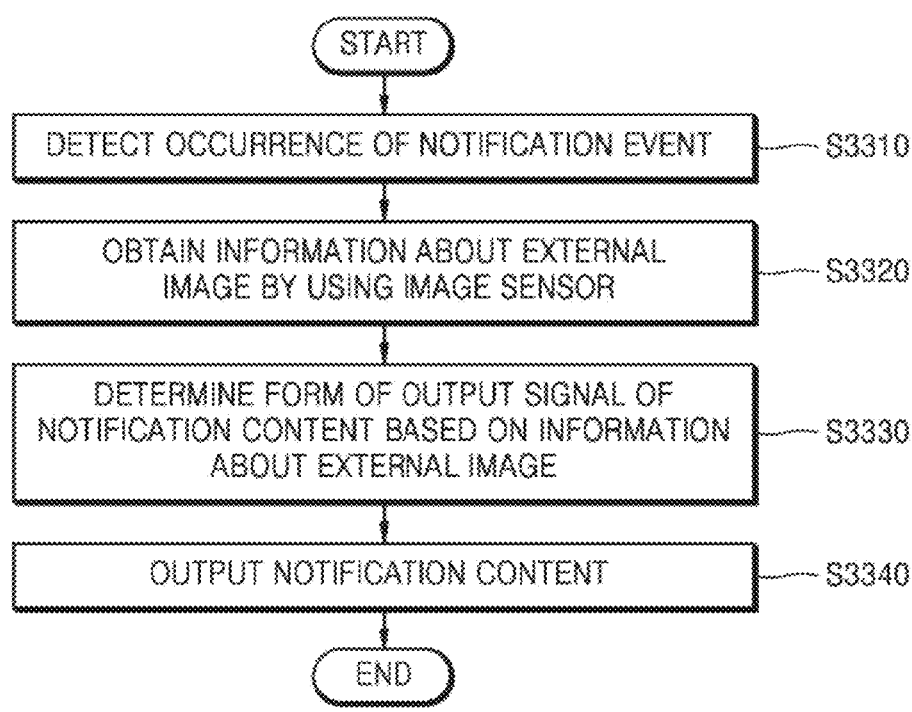
FIG. 33 illustrates a flowchart of a method used by a wearable glasses to determine an output form of content corresponding to a notification event based on external image information, according to an exemplary embodiment.

FIG. 33 illustrates a flowchart of a method used by a wearable glasses to determine an output form of content corresponding to a notification event based on external image information, according to an exemplary embodiment.

In operation S3310, the wearable glasses 100 may detect occurrence of a notification event.

In operation S3320, the wearable glasses 100 may obtain information about an external image by using the image sensor 161 included in the wearable glasses 100.

The information about an external image may include at least one of variation information about a variation of the external image, color information of the external image, and object information about objects included in the external image, but is not limited thereto.

According to an exemplary embodiment, the wearable glasses 100 may obtain information about an external image by analyzing the external image captured using the image sensor 161.

According to another exemplary embodiment, the wearable glasses 100 may request analysis of an external image while transmitting the captured external image to the mobile terminal 200 or the server 300. The wearable glasses 100 may receive from the mobile terminal 200 or the server 300 at least one of variation information of the external image, color information of the external image, and object information about objects included in the external image.

In operation S3330, the wearable glasses 100 may determine an output form of notification content based on the information about an external image.

According to an exemplary embodiment, the wearable glasses 100 may determine to provide notification content in at least one of an audio signal and a video signal based on information about an external image. For example, when more edges than a threshold number of edges are detected from a captured image or a variation of a captured image is equal to or greater than a threshold value, the wearable glasses 100 may determine to output notification content in the form of an audio signal. The threshold number of edges may be preset.

According to an exemplary embodiment, the wearable glasses 100 may determine to output a portion of or the entire notification content based on information about an external image. For example, when more edges than a threshold number are detected in the captured image or a variation of a captured image is equal to or greater than a threshold value, the wearable glasses 100 may determine to output a portion of notification content. A portion of notification content may include at least one of a keyword, summary information, and a title of the notification content, but is not limited thereto.

In operation S3340, the wearable glasses 100 may output notification content in the determined output form. For example, the wearable glasses 100 may provide notification content in the form of at least one of an audio signal and a video signal. The wearable glasses 100 may first output a portion of notification content and then may output the entire notification content when a user input for outputting the entire notification content is received.

An operation of the wearable glasses 100 to output notification content in different forms based on information about an external image will be described in detail with reference to FIG. 34.

Figure 34:
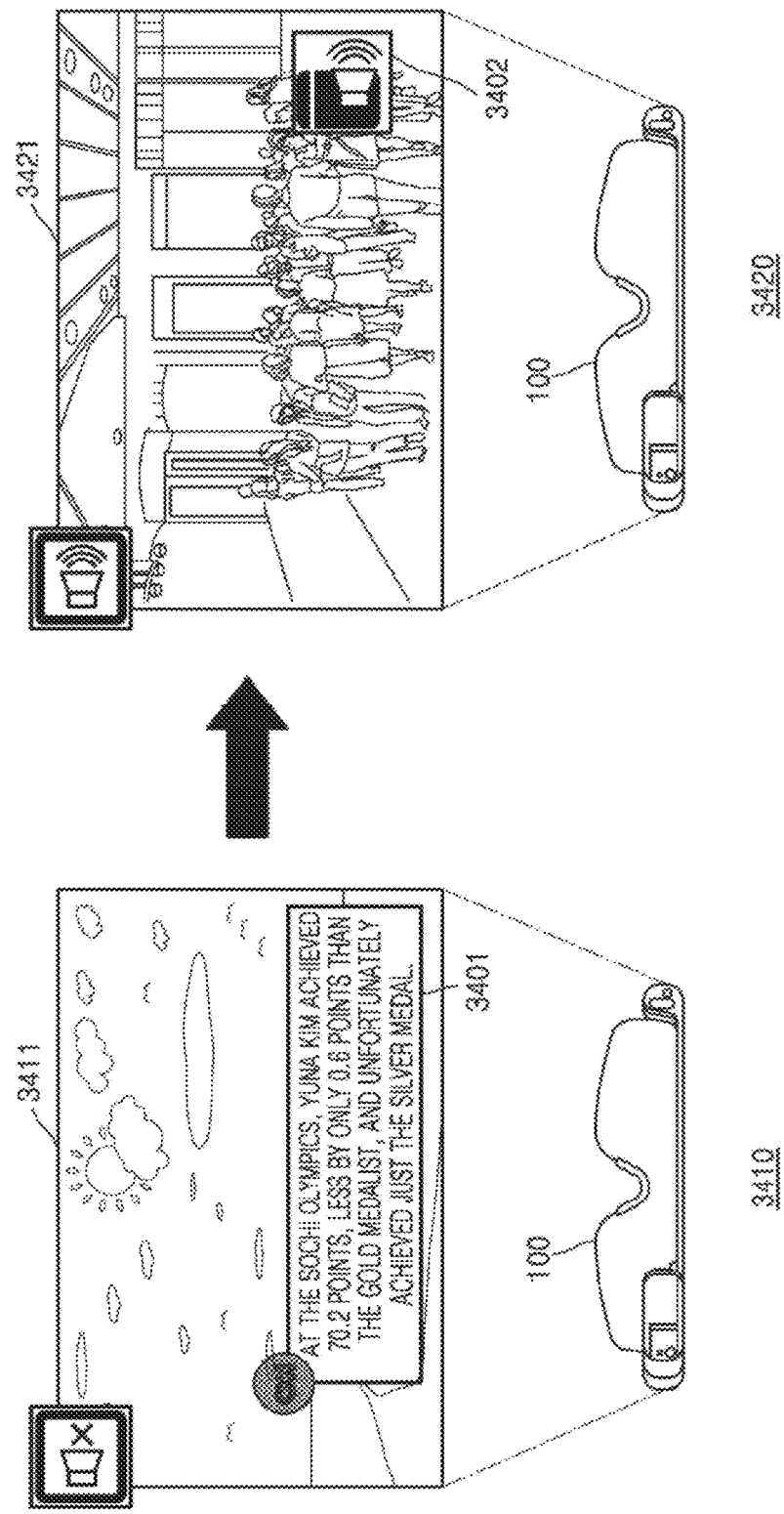
FIG. 34 illustrates an example of adjusting, by a wearable glasses, a form of an output signal based on external image information, according to an exemplary embodiment.

FIG. 34 illustrates an example of adjusting, by a wearable glasses, a form of an output signal based on external image information, according to an exemplary embodiment.

Referring to 3410 of FIG. 34, while a user wearing the wearable glasses 100 stops and looks up to the sky, the wearable glasses 100 may receive a push message including news content 3401 from the server 300. The wearable glasses 100 may obtain information about an external image. For example, the wearable glasses 100 may capture a sky image 3411 and analyze the sky image 3411. As there are fewer edges than a threshold number in the sky image 3411 as a result of analysis, the wearable glasses 100 may display the news content 3401 as a video signal.

Referring to 3420 of FIG. 34, while a user wearing the wearable glasses 100 is walking in a public place where there are many people, the wearable glasses 100 may receive a push message including the news content 3401 from the server 300. The wearable glasses 100 may obtain information about an external image. For example, the wearable glasses 100 may capture a public place image 3421 and analyze the public place image 3421.

As a result of analysis, more edges than a threshold number are in the public place image 3421, and thus the wearable glasses 100 may display the news content 3401 as audio signal 3402.

According to an exemplary embodiment, if an external image viewed through the eyes of the user is complicated, it is difficult for the user to visually identify notification content, and thus, the wearable glasses 100 may provide notification content as an audio signal instead of a video signal.

Figure 35:
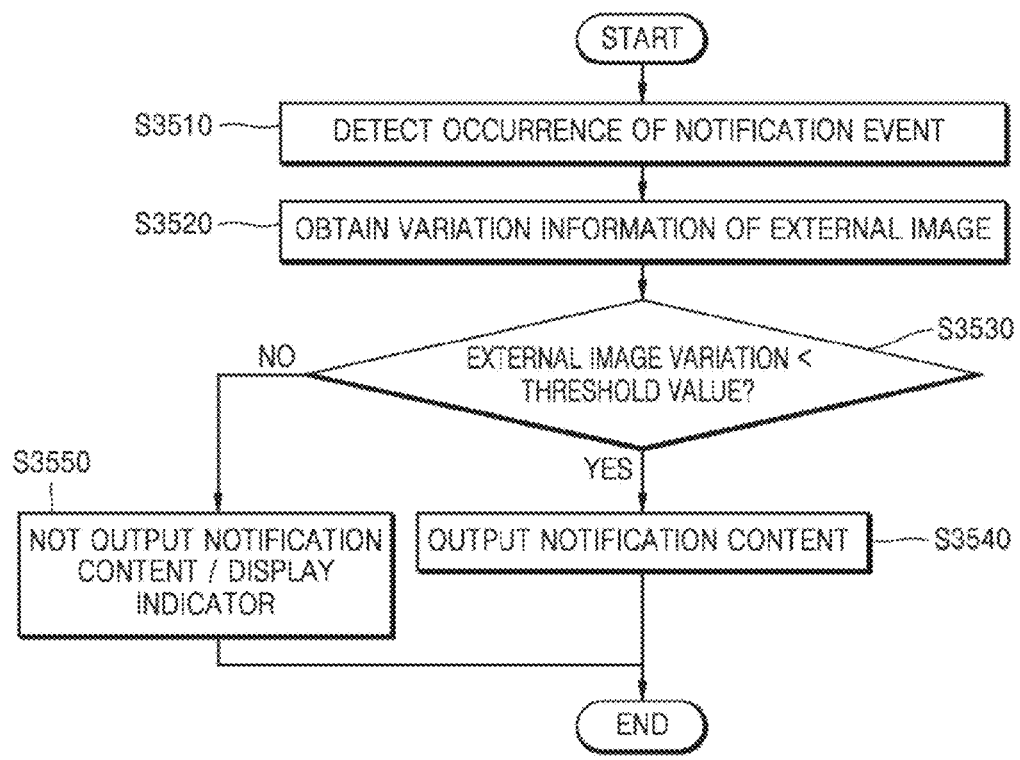
FIG. 35 illustrates a flowchart of a method used by a wearable glasses to determine whether to output notification content based on variation information of an external image, according to an exemplary embodiment.

FIG. 35 illustrates a flowchart of a method used by a wearable glasses to determine whether to output notification content based on variation information of an external image, according to an exemplary embodiment.

In operation S3510, the wearable glasses 100 may detect occurrence of a notification event.

In operation S3520, the wearable glasses 100 may obtain variation information about an external image when detecting occurrence of a notification event. The variation information about an external image may indicate information about a degree of change of an external image observed by the user.

According to an exemplary embodiment, the wearable glasses 100 may obtain a plurality of external images by using the image sensor 161. The wearable glasses 100 may calculate a variation in an external image by comparing respective frames of a plurality of external images obtained for a period of time. For example, when the user wearing the wearable glasses 100 is moving, a variation in an external image calculated by the wearable glasses 100 may be greater than a variation in an external image of when the user wearing the wearable glasses 100 is in a standstill state.

According to an exemplary embodiment, the wearable glasses 100 may request analysis of an external image while transmitting the captured external image to the mobile terminal 200 or the server 300. The wearable glasses 100 may receive variation information of the external image from the mobile terminal 200 or the server 300.

In operation S3530, the wearable glasses 100 may determine whether the variation of the external image is less than a threshold value.

For example, the wearable glasses 100 may determine whether a difference between a first frame obtained at an n-th second and a second frame obtained at (n+1)th second is less than a threshold value (e.g., 30%).

When the variation of the external image is less than a threshold value (S3530, YES), the wearable glasses 100 may determine to output notification content in operation S3540. The wearable glasses 100 may output notification content at a present time.

For example, when a movement speed of a user is less than a threshold speed or if a gaze of the user is not distractible, a variation of an external image may be less than a threshold value. In this case, even when notification content is output, the user may be not in a danger, and thus, the wearable glasses 100 may determine to output notification content.

On the other hand, when the variation of the external image is equal to or greater than a threshold value (S3530, NO), the wearable glasses 100 may not output notification content, and may determine to display an indicator indicating occurrence of a notification event, in operation S3550.

For example, when the variation of the external image is equal to or greater than a threshold value, the wearable glasses 100 may not display notification content or may display a simple indicator indicating occurrence of a notification event in order not to obstruct the user's view. An operation of the wearable glasses 100 to determine whether to output notification content based on variation information of an external image will be described in detail with reference to FIG. 36.

Figure 36:
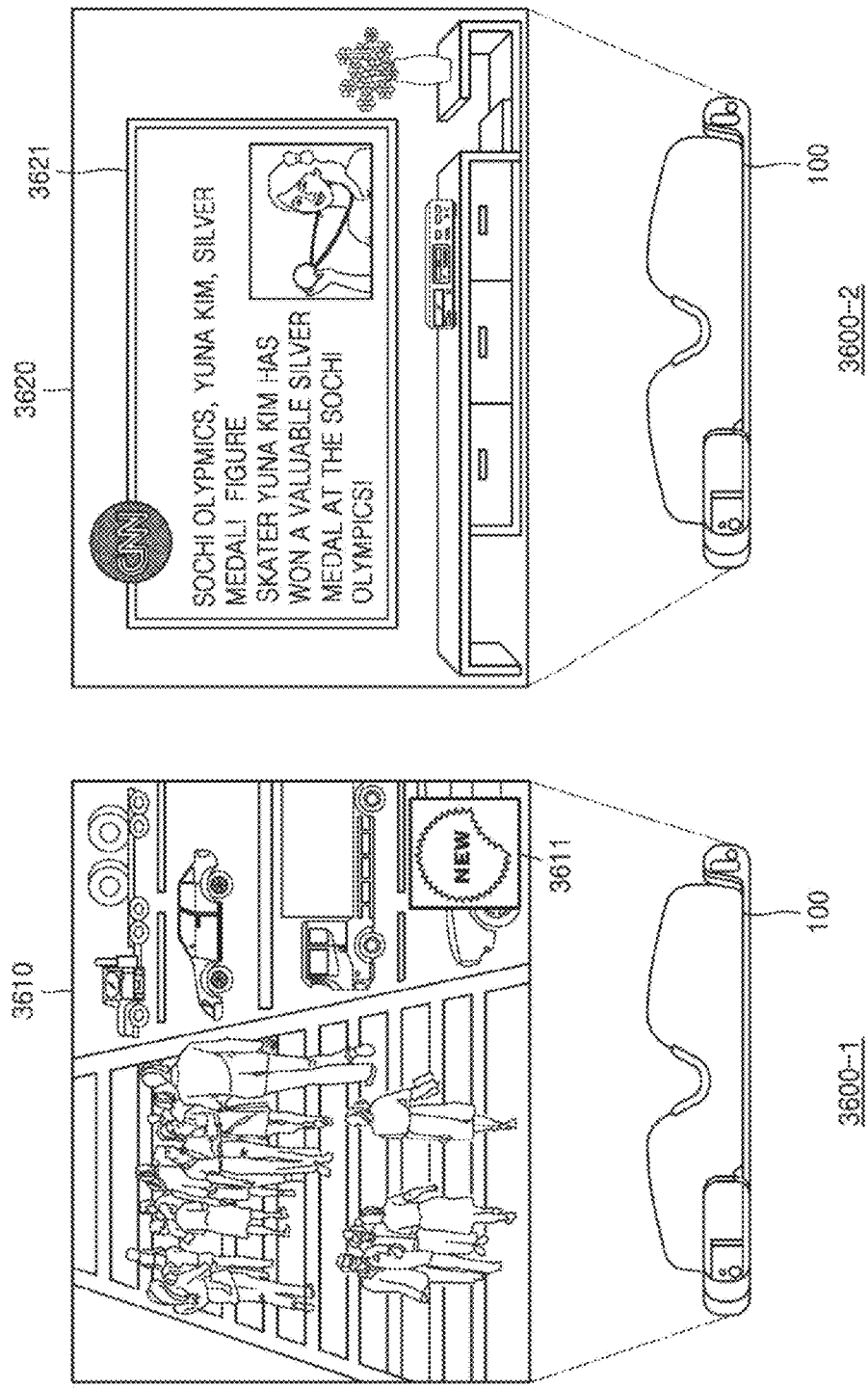
FIG. 36 illustrates an example of changing, by a wearable glasses, an output form of content corresponding to a notification event based on variation information of an external image, according to an exemplary embodiment.

FIG. 36 illustrates an example of changing, by a wearable glasses, an output form of content corresponding to a notification event based on variation information of an external image.

Referring to 3600-1 of FIG. 36, while a user wearing the wearable glasses 100 is crossing a pedestrian crossing, the wearable glasses 100 may receive a push message including news content from the server 300. In this case, the wearable glasses 100 may detect that a notification event for displaying news content has occurred.

According to an exemplary embodiment, the wearable glasses 100 may obtain variation information of an external image before displaying the news content, and determine whether the variation of the external image is less than a threshold value. For example, as the user is crossing a pedestrian crossing, the wearable glasses 100 may obtain variation image of a surrounding image 3610 around the pedestrian crossing. In this case, as the variation of the surrounding image 3610 around the pedestrian crossing is equal to or greater than the threshold value, the wearable glasses 100 may determine not to output the news content at a present time. The wearable glasses 100 may display a simple indicator 3611 indicating occurrence of the notification event.

According to an exemplary embodiment, the wearable glasses 100 may not display the news content while the user is passing the pedestrian crossing but display the indicator 3611 to thereby minimize obstruction of the view of the user.

Referring to 3600-2 of FIG. 36, while a user wearing the wearable glasses 100 is sitting and looking at the wall, the wearable glasses 100 may receive a push message including news content 3621 from the server 300. In this case, the wearable glasses 100 may detect that a notification event for displaying the news content 3621 has occurred.

According to an exemplary embodiment, the wearable glasses 100 may obtain variation information of the external image before displaying the news content 3621 and determine whether the variation of the external image is less than a threshold value. For example, as the user is looking at the wall at home, the wearable glasses 100 may obtain variation information of a wall image 3610. In this case, the wearable glasses 100 may determine to output the news content 3621 at a present time as the variation of the wall image 3620 is less than the threshold value.

The wearable glasses 100 may display the news content 3621 (for example, "Sochi Olympics, Silver medal for Yuna Kim! Figure skater Yuna Kim has won a valuable silver medal at the Sochi Olympics!") in the form of AR, MR, or VR. In this case, the user may check the news content 3621 via the wearable glasses 100 in a situation that is not dangerous even though the view of the user is obstructed.

Hereinafter, an operation of the wearable glasses 100 to adjust a transparency, a color, and chroma of notification content will be described in detail with reference to FIG. 37.

Figure 37:
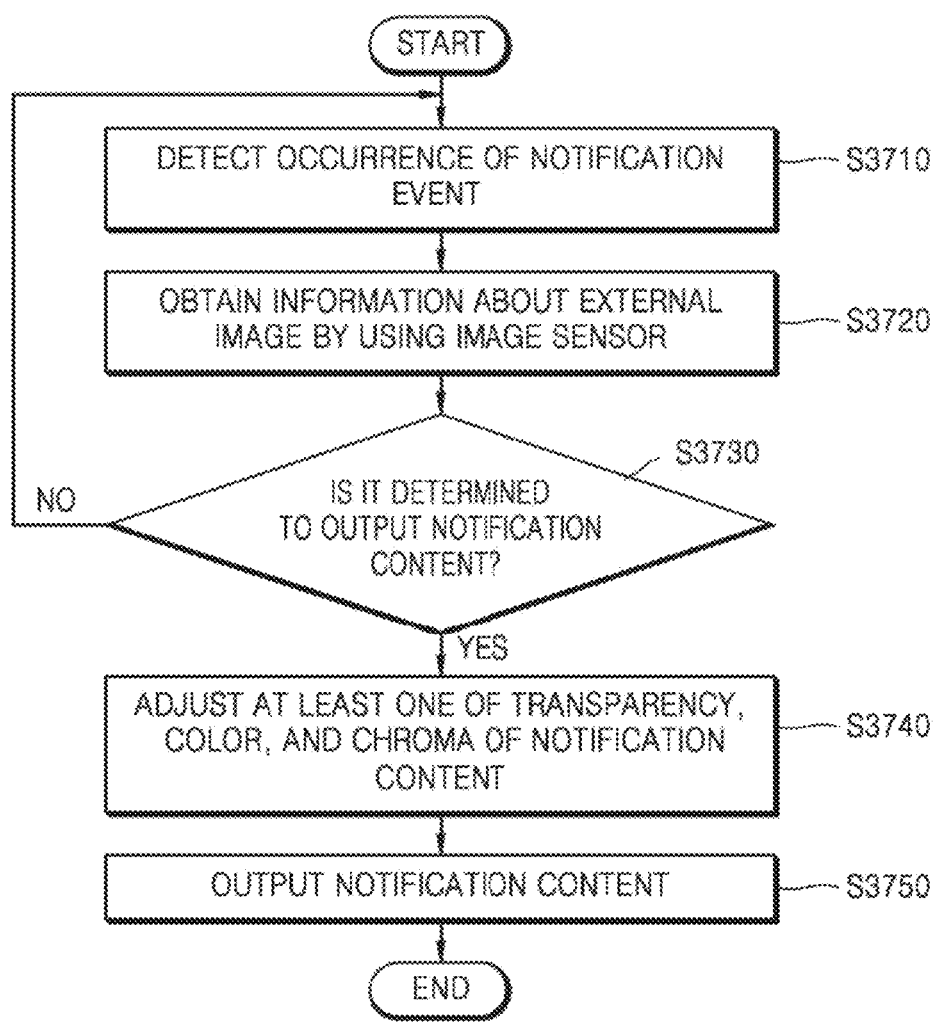
FIG. 37 illustrates a flowchart of a method used by a wearable glasses to adjust at least one of a transparency, a color, and a chroma of content corresponding to a notification event based on external image information, according to an exemplary embodiment.

FIG. 37 illustrates a flowchart of a method used by a wearable glasses to adjust at least one of a transparency, a color, and a chroma of content corresponding to a notification event based on external image information, according to an exemplary embodiment.

In operation S3710, the wearable glasses 100 may detect occurrence of a notification event.

In operation S3720, the wearable glasses 100 may obtain information about an external image by using the image sensor 161. Information about an external image may include at least one of variation information of the external image, color information of the external image, and object information about objects included in an external image, but is not limited thereto.

Operations S3710 and S3720 respectively correspond to operations S3310 and S3320 of FIG. 33, and thus detailed description thereof will be omitted.

In operation S3730, the wearable glasses 100 may determine whether to output notification content based on the information about an external image.

According to an exemplary embodiment, the wearable glasses 100 may determine not to output notification content when a number of edges detected from the external image is greater than or equal to a threshold number. The threshold number may be preset. On the contrary, when a number of edges detected from the external image is less than the threshold number, the wearable glasses 100 may determine to output notification content.

According to an exemplary embodiment, when a variation of the external image is equal to or greater than a threshold value, the wearable glasses 100 may determine not to output notification content. On the contrary, the wearable glasses 100 may determine to output notification content when a variation of the external image is less than a threshold value.

In operation S3740, the wearable glasses 100 may adjust at least one of a transparency, a color, and a chroma of notification content when it is determined to output the notification content.

According to an exemplary embodiment, the wearable glasses 100 may adjust at least one of a transparency, a color, and a chroma of notification content based on illuminance information. For example, the wearable glasses 100 may measure an illuminance value by using an illuminance sensor. When a measured illuminance value is less than a threshold value, the wearable glasses 100 may reduce a transparency of notification content and increase a chroma of the notification content.

According to an exemplary embodiment, the wearable glasses 100 may adjust at least one of a transparency, a color, and a chroma of notification content based on acceleration information. For example, the wearable glasses 100 may increase a transparency of notification content as a movement speed of a user increases.

According to an exemplary embodiment, the wearable glasses 100 may adjust at least one of a transparency, a color, and a chroma of notification content based on color information of an external image. For example, the wearable glasses 100 may display notification content in a color that is complementary to a color of the external image.

In operation S3750, the wearable glasses 100 may output notification content based on at least one of the adjusted transparency, color, and chroma. This operation will be described below with reference to FIG. 38.

Figure 38:
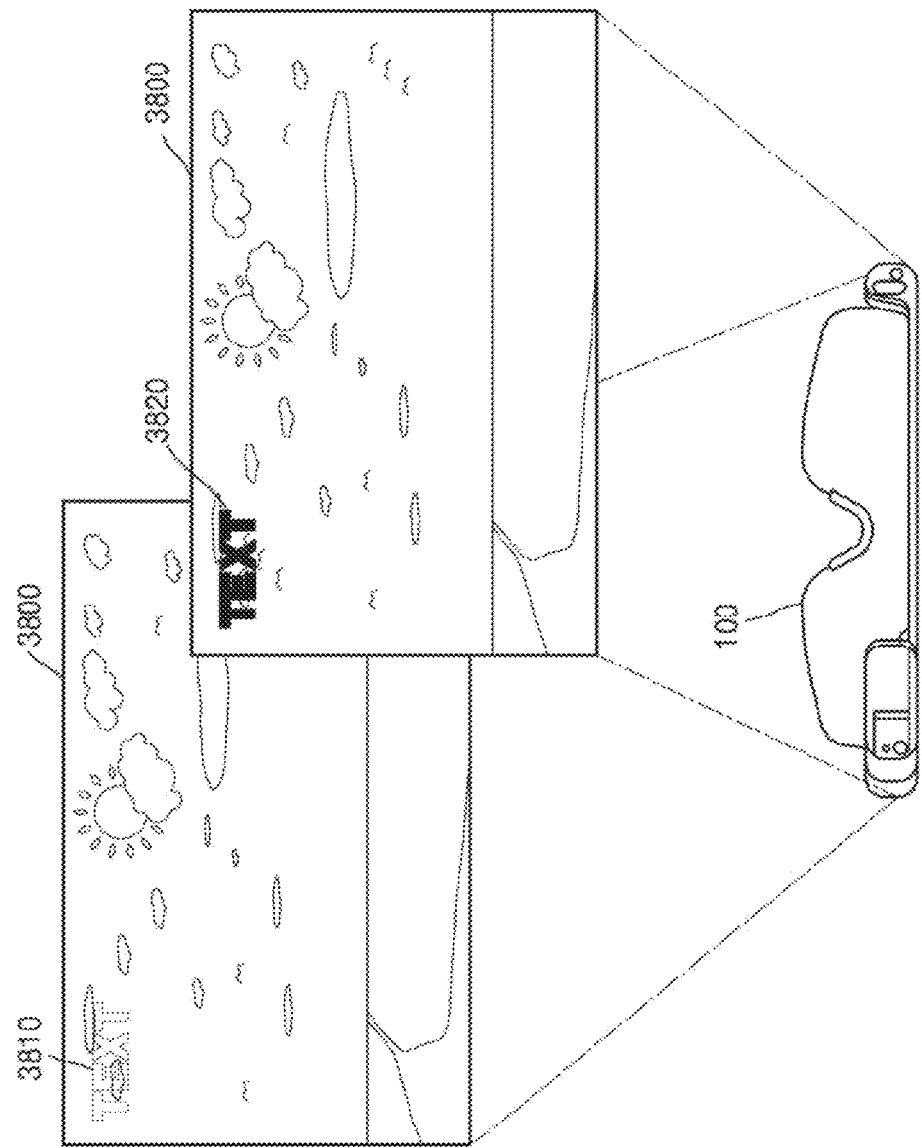
FIG. 38 illustrates a diagram for describing an example of adjusting, by a wearable glasses, a color of content corresponding to a notification event based on external image information, according to an exemplary embodiment.

FIG. 38 illustrates a diagram for describing an example of adjusting, by a wearable glasses, a color of content corresponding to a notification event based on external image information.

Referring to FIG. 38, while a user wearing the wearable glasses 100 is looking up to the sky, the wearable glasses 100 may detect occurrence of a notification event. In this case, the wearable glasses 100 may obtain a sky image 3800.

The wearable glasses 100 may adjust a color of notification content based on color information of the sky image 3800. For example, when a basic color of the notification content is blue 3810, it may be difficult for the user to identify the notification content displayed in blue 3810 and in an AR form on the sky image 3800.

Accordingly, the wearable glasses 100 may change the color of the notification content from blue 3810 to yellow 3820 and display the notification content in yellow 3820.

Figure 39:
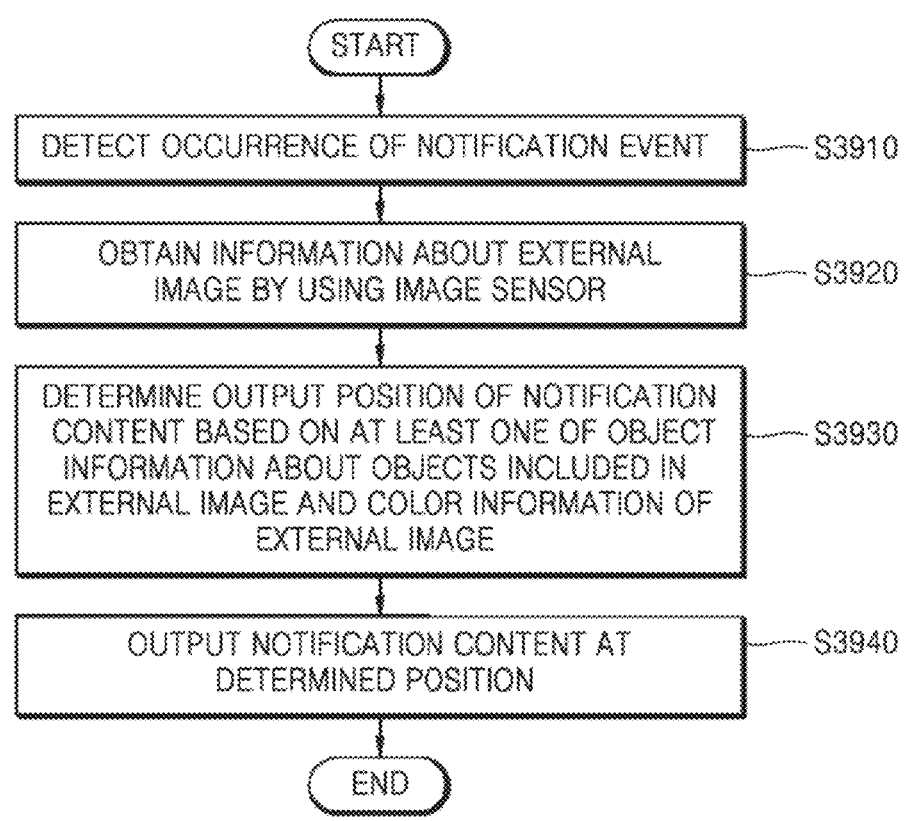
FIG. 39 illustrates a flowchart of a method of a wearable glasses determining an output position of content corresponding to a notification event, according to an exemplary embodiment.

FIG. 39 illustrates a flowchart of a method used by a wearable glasses to determine an output position of content corresponding to a notification event, according to an exemplary embodiment.

In operation S3910, the wearable glasses 100 may detect occurrence of a notification event.

In operation S3920, the wearable glasses 100 may obtain information about an external image by using the image sensor 161. Information about an external image may include at least one of color information of the external image and object information about objects included in the external image, but is not limited thereto.

Operations S3910 and 3920 respectively correspond to operations S3310 and S3320 of FIG. 33, and thus detailed description thereof will be omitted.

In operation S3930, the wearable glasses 100 may determine an output position of notification content based on at least one of object information about objects included in the external image and color information of the external image.

For example, the wearable glasses 100 may determine a position that does not overlap with an actual object (e.g., a conversation partner) as an output position of notification content, based on object information about objects included in the external image. Also, the wearable glasses 100 may determine an area where a basic color of notification content and a complementary thereof are displayed, as an output position of notification content.

In operation S3940, the wearable glasses 100 may output notification content at the determined output position. This operation will be described below with reference to FIG. 40.

FIG. 40 illustrates a diagram for describing an example of changing, by a wearable glasses, an output position of content corresponding to a notification event.

Referring to FIG. 40, while a first user who is wearing the wearable glasses 100 is having conversation with a second user, the wearable glasses 100 may receive a push message including news content 4000 from the server 300. In this case, the wearable glasses 100 may detect that a notification event for displaying the news content 4000 has occurred.

As shown in 4010 of FIG. 4, when the wearable glasses 100 displays the news content 4000 in a center portion, the face of the second user may be covered by the news content 4000.

Accordingly, the wearable glasses 100 may obtain information about an external image before displaying the news content 4000. For example, the wearable glasses 100 may obtain a capture image including the second user, by using the image sensor 161. The wearable glasses 100 may analyze the capture image to detect a position of the second user. The wearable glasses 100 may determine an area that does not overlap with the second user, as a display position of the news content 4000.

As shown in 4020 of FIG. 40, the wearable glasses 100 may display the news content 4000 in an area that does not overlap with the face of the second user.

According to an exemplary embodiment, as the face of the second user is shifted, the wearable glasses 100 may adaptively change the display position of the news content 4000.

FIG. 41 illustrates a flowchart of a method used by a wearable glasses to determine a method of providing content corresponding to a notification event based on setting information of a user, according to an exemplary embodiment.

In operation S4110, the wearable glasses 100 may receive setting information related to providing of notification content. For example, the wearable glasses 100 may receive setting information about at least one of a time to provide notification content, a place of providing notification content, and a form of providing notification content.

According to an exemplary embodiment, the wearable glasses 100 may receive setting information related to providing of notification content from the mobile terminal 200 or the server 300. For example, the user may set whether to output notification content, a time to output notification content, an output form of notification content, and a place of outputting notification content by using the mobile terminal 200.

In operation S4120, the wearable glasses 100 may detect occurrence of a notification event.

In operation S4130, when detecting occurrence of notification event, the wearable glasses 100 may determine a method of providing notification content based on setting information. For example, the wearable glasses 100 may determine a time to provide notification content, a place of providing notification content, and a form of providing notification content based on setting information.

In operation S4140, the wearable glasses 100 may provide notification content. For example, the wearable glasses 100 may provide notification content at a time and in a form according to setting information. The time and the form may be predetermined.

Hereinafter, an operation of the wearable glasses 100 to provide notification content based on setting information will be described in detail with reference to FIGS. 42 through 44.

FIG. 42 illustrates an example of setting information 4200 related to output of content corresponding to a notification event.

As illustrated in FIG. 42, a user may select whether to output notification content according to a position 4201 or an application 4202.

For example, when a user is in a library, the user may set to block output of notification content; when the user is at home, the user may set to output the entire notification content output; and when the user is in an office, the user may set to output a portion of notification content.

Also, the user may set to output a portion of notification content corresponding to a first application and block output of notification content corresponding to a second application.

According to an exemplary embodiment, the wearable glasses 100 may obtain the setting information 4200 related to output of notification content from the mobile terminal 200 or the server 300 and store the setting information 4200 in a memory.

Also, when a notification event has occurred, the wearable glasses 100 may output notification content based on setting information. This will be described below with reference to FIGS. 43 and 44.

Figure 43:
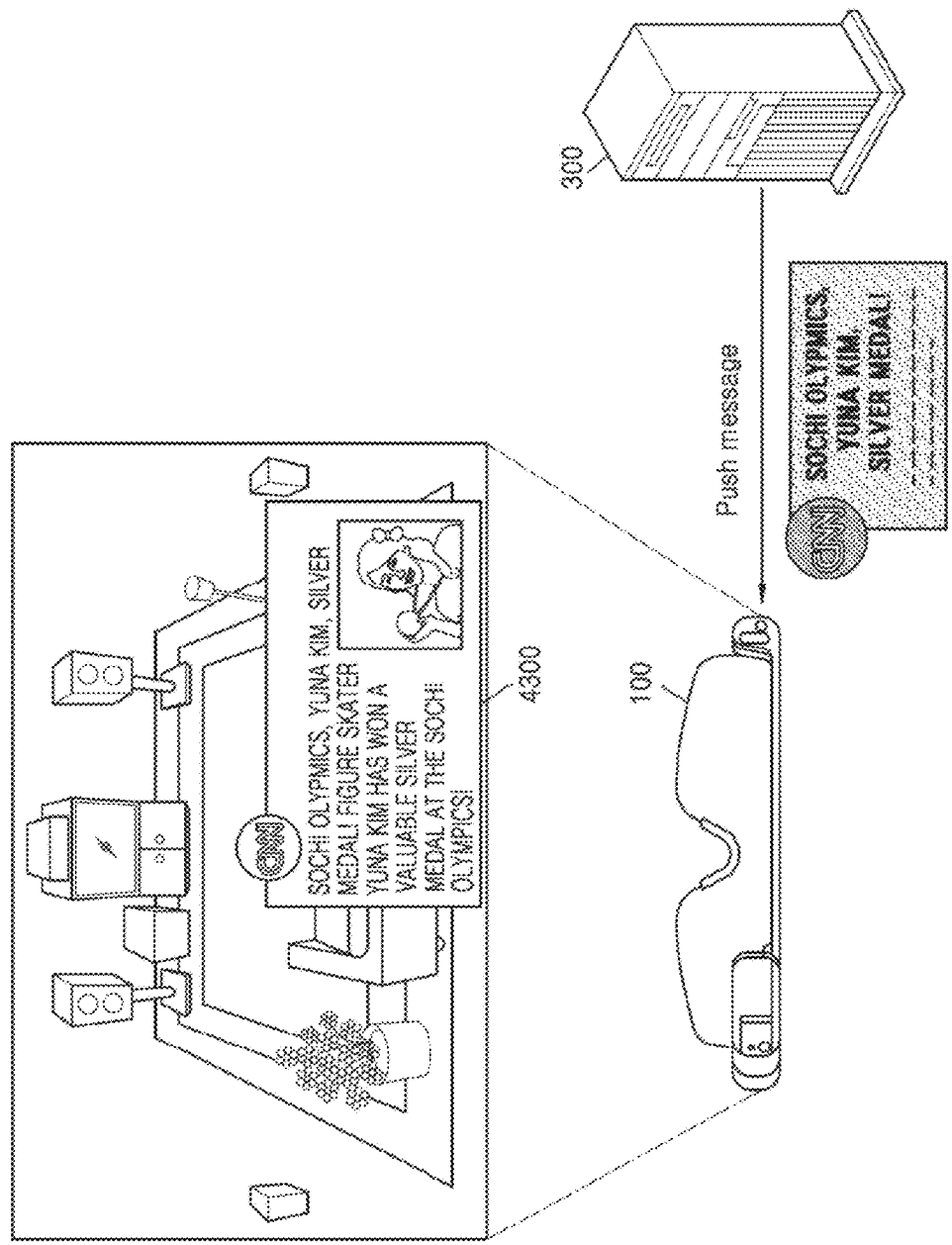
FIGS. 43 and 44 illustrate an example of outputting, by a wearable glasses, content corresponding to a notification event based on setting information of a user, according to an exemplary embodiment.
Figure 44:
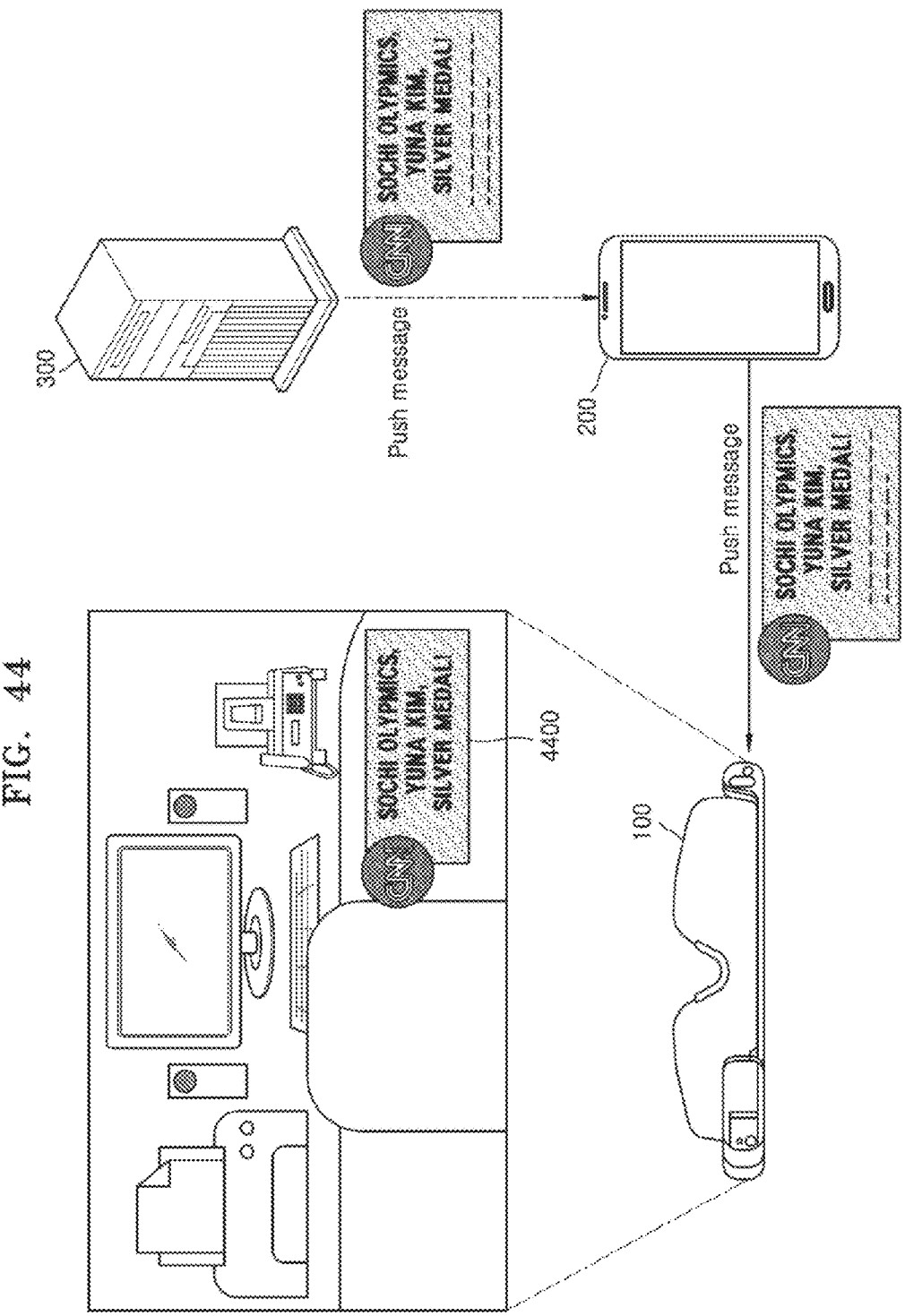

FIGS. 43 and 44 illustrate an example of outputting, by a wearable glasses, content corresponding to a notification event based on setting information of a user.

Referring to FIG. 43, while a user wearing the wearable glasses 100 is staying at home, the wearable glasses 100 may receive a push message including news content from the server 300. In this case, the wearable glasses 100 may detect that a notification event for displaying news content has occurred.

The wearable glasses 100 may check setting information 4200 related to output of a notification event before outputting the notification event. As the setting information 4200 is set to output the entire notification content when the user wearing the wearable glasses 100 is at home, the wearable glasses 100 may output the entire news content 4300.

Referring to FIG. 44, while the user wearing the wearable glasses 100 is in an office, the wearable glasses 100 may receive a push message including news content via the mobile terminal 200. In this case, the wearable glasses 100 may detect that a notification event for displaying news content has occurred.

The wearable glasses 100 may check the setting information 4200 related to output of a notification event before outputting the notification event. As the setting information 4200 is set to output a portion of notification content when the user wearing the wearable glasses 100 is in an office, the wearable glasses 100 may output a portion of news content 4400 (e.g., a headline).

Figure 45:
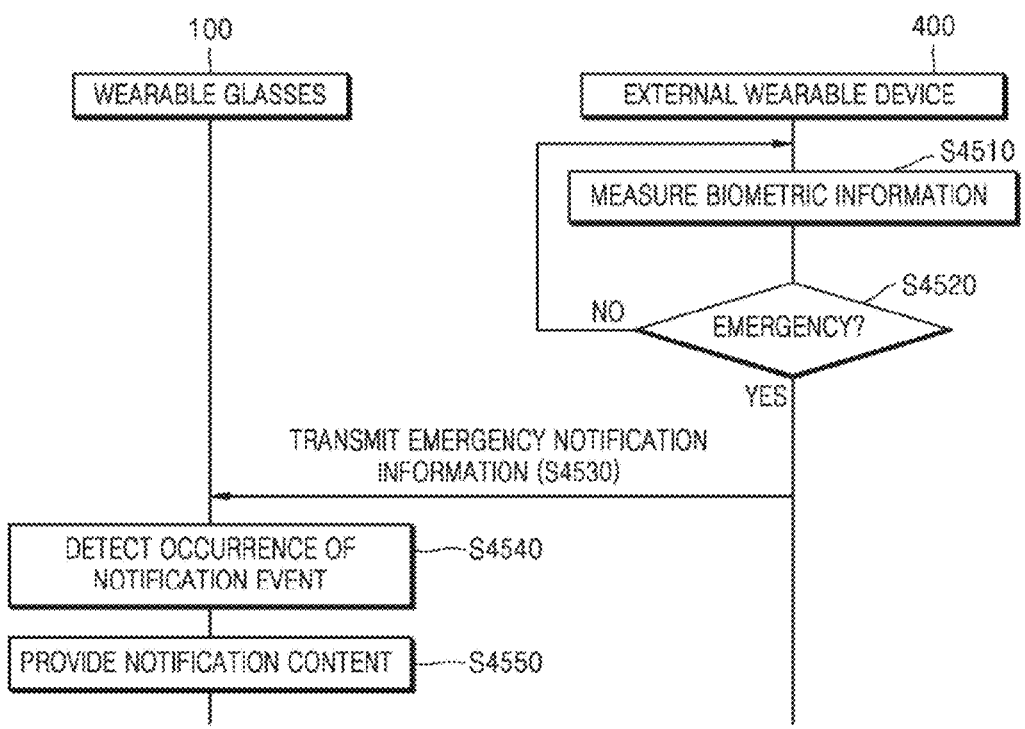
FIG. 45 illustrates a flowchart of a method used by a wearable glasses to receive emergency notification information from an external wearable device, according to an exemplary embodiment.

FIG. 45 illustrates a flowchart of a method used by a wearable glasses to receive emergency notification information from an external wearable device 400, according to an exemplary embodiment.

In operation S4510, the external wearable device 400 may measure biometric information of a user.

The external wearable device 400 may include, for example, a ring, a necklace, a band, a watch, shoes, an ear ring, a hair band, clothes, gloves, or a thimble, but is not limited thereto.

According to an exemplary embodiment, the external wearable device 400 may measure pulse rate information, blood pressure information, heart rate information, body temperature information or the like.

In operation S4520, the external wearable device 400 may determine an emergency based on the biometric information.

For example, the external wearable device 400 may determine that an emergency occurred when a pulse rate of the user is equal to or greater than a threshold rate (e.g., 100 times per minute) for a period of time or when a body temperature of a user is equal to a threshold temperature or higher (e.g., 38° C.).

In operation S4530, when it is determined that an emergency occurred, the external wearable device 400 may transmit emergency notification information to the wearable glasses 100. Emergency notification information may include biometric information measured by the external wearable device 400, a message notifying the user of the emergency, an icon indicating the emergency, and the like.

According to an exemplary embodiment, the external wearable device 400 may transmit emergency notification information to the wearable glasses 100 via short-range communication (e.g., Bluetooth, WFD, NFC, etc.).

According to an exemplary embodiment, the external wearable device 400 may transmit emergency notification information to the wearable glasses 100 via the mobile terminal 200 or the server 300.

In operation S4530, the wearable glasses 100 may detect occurrence of a notification event. For example, the wearable glasses 100 may detect that a notification event for outputting an emergency notification message has occurred.

In operation S4550, the wearable glasses 100 may provide notification content.

According to an exemplary embodiment, since it is an emergency, the wearable glasses 100 may promptly provide an emergency notification message regardless of movement information of the user or external image information. An operation of the wearable glasses 100 to output an emergency notification message will be described in detail with reference to FIG. 46.

Figure 46:
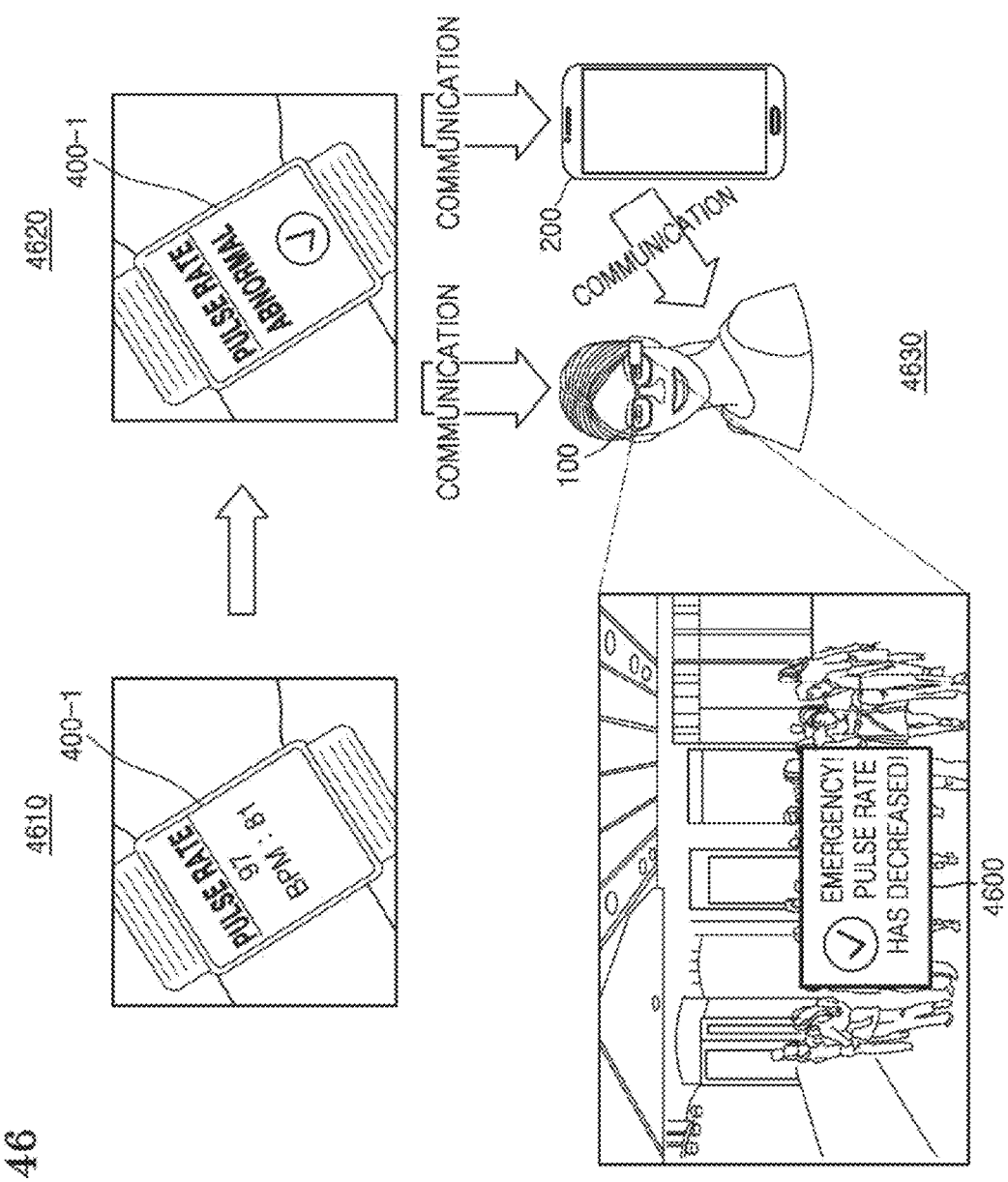
FIG. 46 illustrates an example of displaying, by a wearable glasses pulse rate information received from an external wearable device, according to an exemplary embodiment.

FIG. 46 illustrates an example of displaying, by a wearable glasses, pulse rate information received from an external wearable device.

Referring to 4610 of FIG. 46, a smart watch 400-1 may measure a pulse rate of a user. The smart watch 400-1 measures a pulse rate of a user at certain periods of time. The smart watch 400-1 may measure a pulse rate of a user when a certain event has occurred. A certain event may include an event for setting an exercise mode by a user and an event for selecting a button for requesting to measure a pulse rate, and the like, but is not limited thereto.

For example, a pulse rate of a user measured by the smart watch 400-1 may be 97 beats per minute (BPM). A normal pulse rate of the user may be 81 BPM.

Referring to 4620 of FIG. 46, the smart watch 400-1 may compare the measured pulse rate (97 BPM) and the typical normal pulse rate of the user (81 BPM). As a difference between the measured pulse rate (97 BPM) and the normal pulse rate of the user (81 BPM) exceeds a threshold value (e.g., 10 BPM), the smart watch 400-1 may determine that the pulse rate of the user is abnormal.

In this case, the smart watch 400-1 may output a notification message 'abnormal pulse rate.' Also, the smart watch 400-1 may transmit to the wearable glasses 100 emergency notification information notifying the user that pulse rate is abnormal.

Referring to 4630 of FIG. 46, the wearable glasses 100 may receive emergency information directly from the smart watch 400-1 or via the mobile terminal 200.

The wearable glasses 100 may output emergency notification content (e.g., "Emergency! Pulse rate decreased.") based on the received emergency notification information.

According to an exemplary embodiment, the user may check biometric information measured using the external wearable device 400 and emergency notification content in real time by using the wearable glasses 100.

Figure 47:
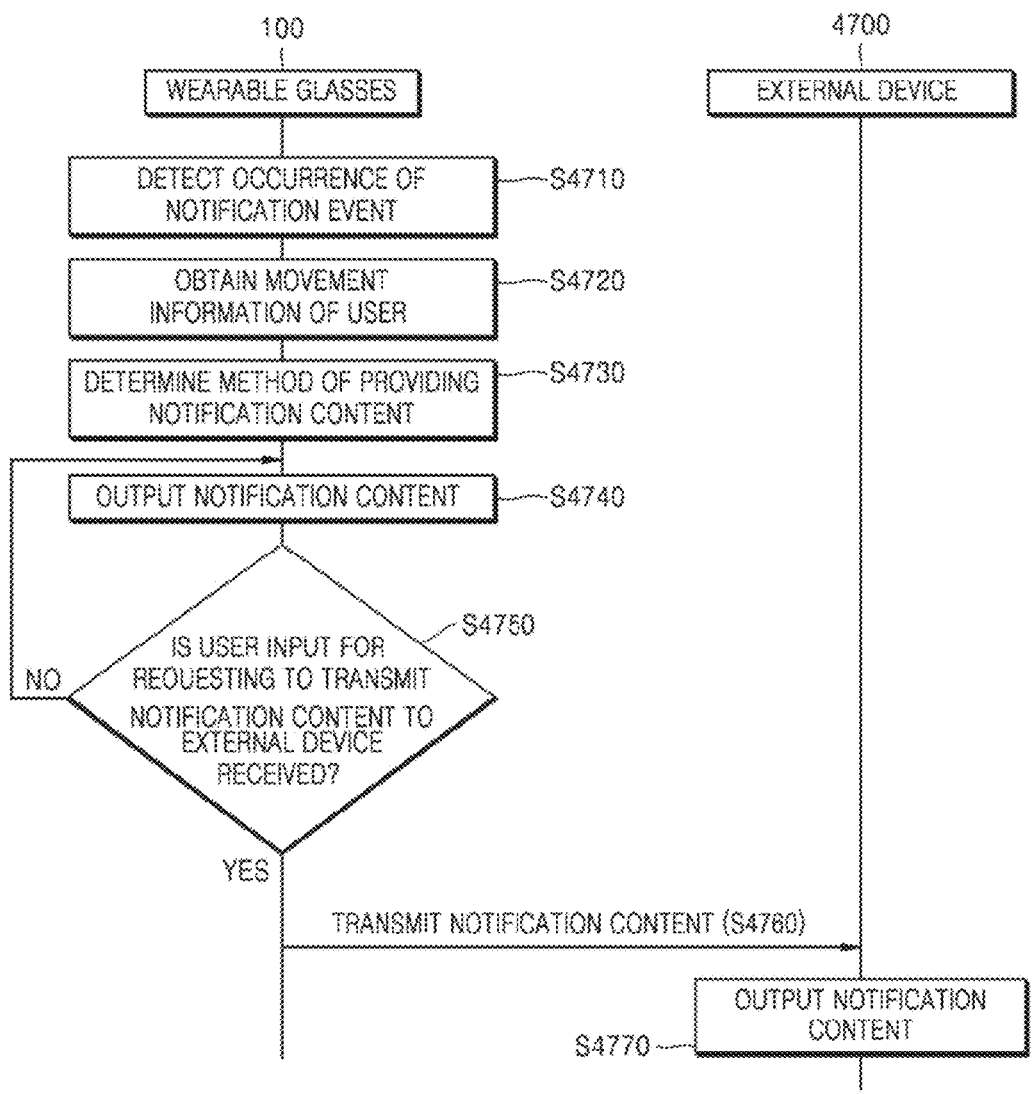
FIG. 47 illustrates a flowchart of a method used by a wearable glasses to output content corresponding to a notification event via an external device, according to an exemplary embodiment.

FIG. 47 illustrates a flowchart of a method used by a wearable glasses to output content corresponding to a notification event via an external device, according to an exemplary embodiment.

In operation S4710, the wearable glasses 100 may detect occurrence of a notification event.

In operation S4720, when detecting occurrence of a notification event, the wearable glasses 100 may obtain movement information of a user. Movement information of a user may include at least one of movement state information, movement speed information, and position information of the user, but is not limited thereto.

In operation S4730, the wearable glasses 100 may determine a method of providing notification content. According to an exemplary embodiment, the wearable glasses 100 may determine a time to provide notification content. Also, according to an exemplary embodiment, the wearable glasses 100 may determine a form of providing notification content.

Operations S4710 through S4730 respectively correspond to operations S510 through S530 of FIG. 5, and thus detailed description thereof will be omitted.

In operation S4740, the wearable glasses 100 may output notification content. According to an exemplary embodiment, the wearable glasses 100 may output notification content according to a method of providing notification content. For example, the wearable glasses 100 may output a portion of notification content.

In operation S4750, the wearable glasses 100 may receive a user input for requesting to transmit notification content to an external device 4700. User inputs may vary. For example, a user input may be at least one of a motion input, a touch input, a key input, a voice input, and a multiple input, but is not limited thereto.

According to an exemplary embodiment, the external device 4700 may be other wearable device different from the wearable glasses 100. For example, the external device 4700 may be a smart watch, a band, or a necklace. Also, the external device 4700 may be the mobile terminal 200 connected to the wearable glasses 100.

According to an exemplary embodiment, the wearable glasses 100 may receive an input for selecting the external device 4700 to transmit notification content. For example, the wearable glasses 100 may receive an input for selecting a smart watch or an input for requesting transmission of notification content to the smart watch.

According to an exemplary embodiment, the external device 4700 used to transmit notification content may be preset.

Also, according to an exemplary embodiment, the wearable glasses 100 may search for a wearable device located within a short-range communication radius and transmit notification content to the found wearable device.

In operation S4760, the wearable glasses 100 may transmit notification content to the external device 4700 according to a user input. For example, the wearable glasses 100 may transmit notification content to the external device 4700 via short-range communication (e.g., Bluetooth) or mobile communication (e.g., 3G/4G/5G).

According to an exemplary embodiment, the wearable glasses 100 may directly transmit notification content to the external device 4700 or transmit notification content to the external device 4700 via the mobile terminal 200.

For example, when the external device 4700 is a wearable device, the wearable glasses 100 may transmit notification content to the external device 4700 via the mobile terminal 200 connecting the wearable device and the wearable glasses 100.

In operation S4770, the external device 4700 may output notification content. For example, the external device 4700 may display notification content on a screen. When the notification content is a video, the external device 4700 may replay the notification content. An operation of the external device 4700 that is connected to the wearable glasses 100 and outputs notification content will be described in detail with reference to FIG. 48.

FIG. 48 illustrates an example of outputting, by a wearable glasses, content corresponding to a notification event based on a user input.

Referring to 4800-1 of FIG. 48, while a user wearing the wearable glasses 100 is crossing a pedestrian crossing, the wearable glasses 100 may receive a push message including news content from the server 300. In this case, the wearable glasses 100 may detect that a notification event for displaying news content has occurred.

According to an exemplary embodiment, the wearable glasses 100 may obtain movement information of the user before displaying the news content. For example, the wearable glasses 100 may determine that the user is moving at a speed of 3 km/h.

As the user is moving, the wearable glasses 100 may output a portion 4810 of the news content in order not to obstruct the user's view much. For example, the wearable glasses 100 may extract a headline from the news content and output the extracted headline.

Referring to 4800-2 of FIG. 48, the user may perform a shaking gesture 4820 of shaking the hand before the wearable glasses 100 in order to check entire content 4830 of the news content on a smart watch 4800 after checking the headline of the news content.

In this case, the wearable glasses 100 may sense the shaking gesture 4820 of the user while outputting the portion 4810 of news content (e.g., a headline). For example, the wearable glasses 100 may sense the shaking gesture 4820 of the user shaking the hand by using, for example, the depth sensor 154 or the image sensor 161.

The wearable glasses 100 may transmit the news content according to the shaking gesture 4820 of the user. According to an exemplary embodiment, the wearable glasses 100 may transmit the news content directly to the smart watch 4800 or transmit the news content to the smart watch 4800 via the mobile terminal 200.

According to an exemplary embodiment, the smart watch 4800 may display the entire content 4830 of the news content received from the wearable glasses 100 on a screen. The wearable glasses 100 may now not output the portion 4810 of news content anymore.

According to another exemplary embodiment, in order to prevent that news content is transmitted from the wearable glasses 100 to the smart watch 4800 regardless of the user's intention, the wearable glasses 100 may transmit the news content to the smart watch 4800 only when a time period of the shaking gesture 4820 is equal to or greater than a threshold period or when the number of times of shaking is a threshold number of times or more (e.g., twice). That is, in order to prevent the inadvertent transmission of the news content to the smart watch 4800 when, for example, the user scratches an itch, the wearable glasses 100 may check to ensure that the shaking gesture 4820 is an intended motion for transmitting the news content.

Meanwhile, while the shaking gesture 4820 is described as an example of user input for transmitting notification content in FIG. 48, the user input is not limited thereto. For example, the user may input voice for requesting to transmit notification content to the wearable glasses 100 or press a button included in the wearable glasses 100.

Figure 49:
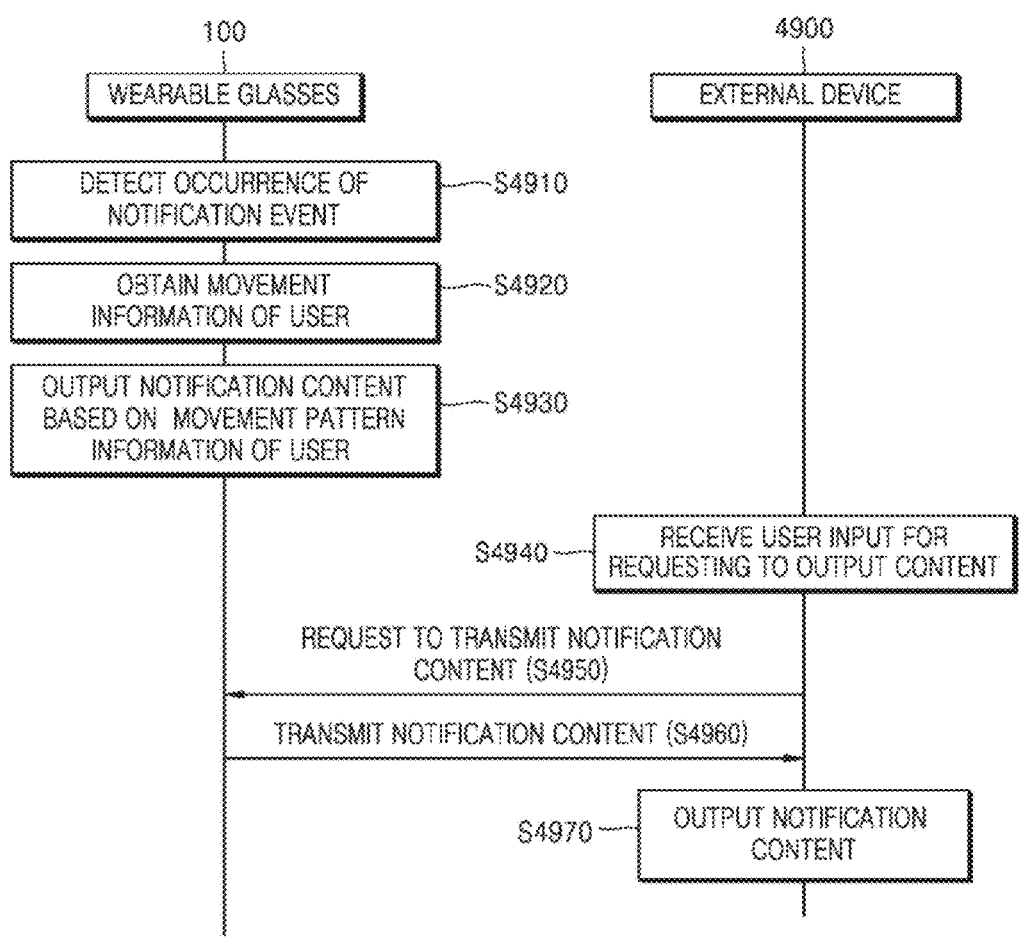
FIG. 49 illustrates a flowchart of a method used by a wearable glasses to transmit content corresponding to a notification event in response to a request by an external device, according to an exemplary embodiment.

FIG. 49 illustrates a flowchart of a method used by a wearable glasses to transmit content corresponding to a notification event in response to a request by an external device, according to an exemplary embodiment.

In operation S4910, the wearable glasses 100 may detect occurrence of a notification event.

In operation S4920, the wearable glasses 100 may obtain movement information of a user.

In operation S4930, the wearable glasses 100 may output notification content according to a method of providing notification content determined based on the movement information of the user.

Operations S4910 through S4930 respectively correspond to operations S4710 through S4730 of FIG. 47, and thus detailed description thereof will be omitted.

In operation S4940, the external device 4900 may receive a user input for requesting to output notification content from the external device 4900.

According to an exemplary embodiment, the external device 4900 may be another wearable device different from the wearable glasses 100. For example, the external device 4900 may be a smart watch, a band, or a necklace. Also, the external device 4900 may be the mobile terminal 200 connected to the wearable glasses 100.

According to an exemplary embodiment, user inputs requesting to output notification content may vary. For example, a user input may be at least one of a motion input, a touch input, a key input, a voice input, and a multiple input, but is not limited thereto.

In operation S4950, the external device 4900 may request the wearable glasses 100 to transmit notification content. The external device 4900 may request the wearable glasses 100 to directly transmit notification content or request the wearable glasses 100 to transmit notification content via the mobile terminal 200.

In operation S4960, the wearable glasses 100 may transmit the notification content to the external device 4900. For example, the wearable glasses 100 may transmit the notification content to the external device 4900 via short-range communication (e.g., Bluetooth) or mobile communication (e.g., 3G/4G/5G).

According to an exemplary embodiment, the wearable glasses 100 may directly transmit notification content to the external device 4900 or may transmit notification content to the external device 4900 via the mobile terminal 200. For example, when the external device 4900 is a wearable device, the wearable glasses 100 may transmit notification content to the external device 4900 via the mobile terminal 200 connecting a wearable device and the wearable glasses 100.

In operation S4970, the external device 4900 may output notification content. For example, the external device 4900 may display notification content on a screen. When notification content is a video, the external device 4900 may replay the notification content. An operation of the external device 4900 that is connected to the wearable glasses 100 and outputs notification content will be described in detail with reference to FIG. 50.

Figure 50:
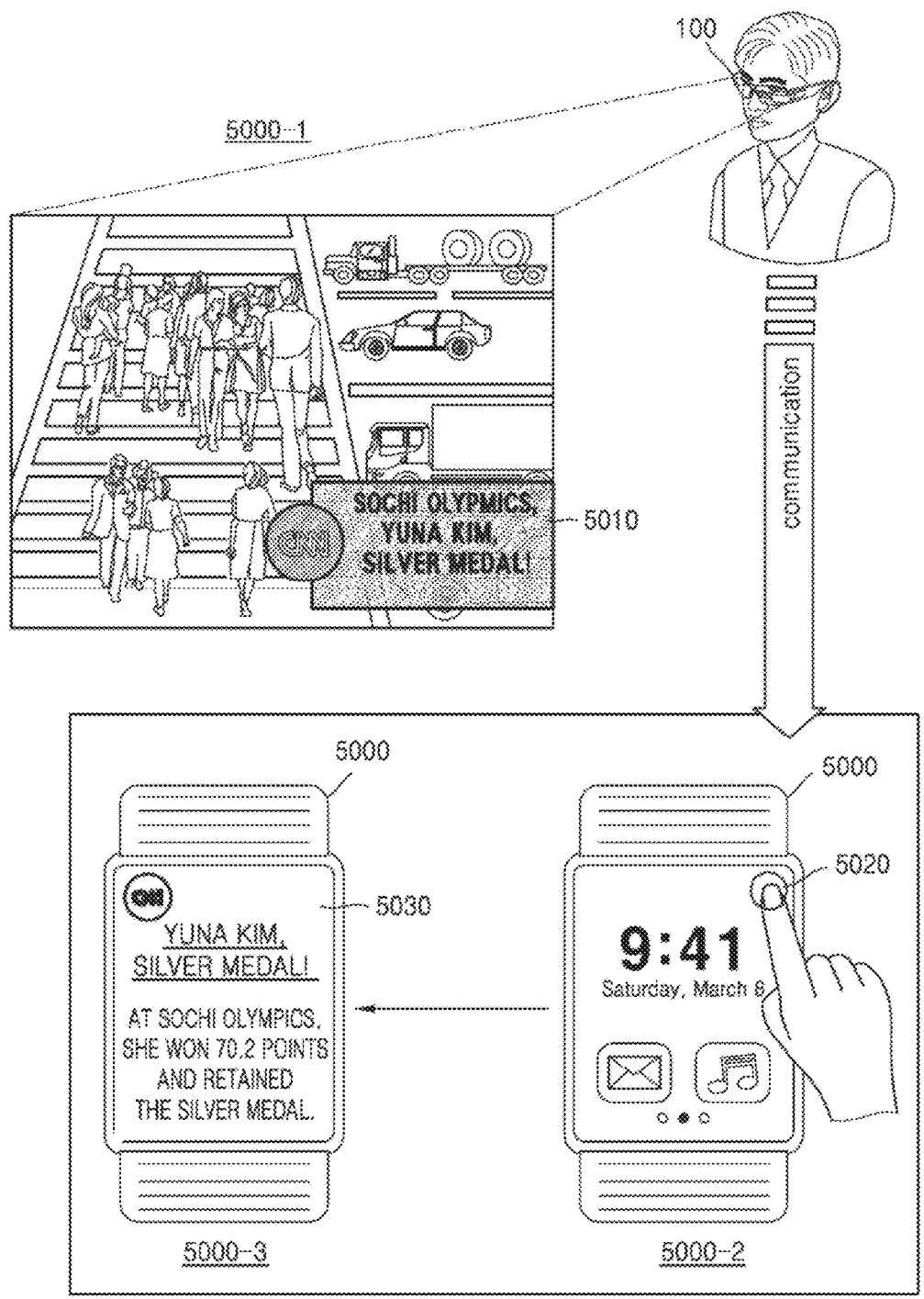
FIG. 50 illustrates an example of displaying, by an external device, content corresponding to a notification event based on a user input received via the external device, wherein the external device is connected to a wearable glasses.

FIG. 50 illustrates an example of displaying, by an external device, content corresponding to a notification event based on a user input received via the external device, wherein the external device is connected to a Wearable glasses, according to an exemplary embodiment.

Referring to 5000-1 of FIG. 50, while a user wearing the Wearable glasses 100 is crossing a pedestrian crossing, the Wearable glasses 100 may receive a push message including news content from the server 300. In this case, the wearable glasses 100 may detect that a notification event for displaying news content has occurred.

According to an exemplary embodiment, the wearable glasses 100 may obtain movement information of the user before displaying the news content. For example, the wearable glasses 100 may determine that the user is moving at a speed of 3 km/h.

As the user is moving, the wearable glasses 100 may output a portion 5010 of news content in order not to obstruct the user's view much. For example, the wearable glasses 100 may extract a headline from the news content and output the extracted headline.

Referring to 5000-2 of FIG. 50, the user may select a button of the smart watch 5000 to check the entire content 5030 of the news content on the smart watch 5000 after checking the headline of the news content. The button may be predetermined or pre-assigned. The button may correspond to a command directing to display notification content displayed via the wearable glasses 100 on the smart watch 5000. According to an exemplary embodiment, the button may be a physical button or a virtual button in the form of a graphical user interface (GUI).

The smart watch 5000 may request the wearable glasses 100 to transmit the news content being displayed by the wearable glasses 100.

The wearable glasses 100 may transmit the news content to the smart watch 5000 in response to a request by the smart watch 5000. According to an exemplary embodiment, the wearable glasses 100 may transmit the news content directly to the smart watch 5000 or may transmit the news content to the smart watch 5000 via the mobile terminal 200.

Referring to 5000-3 of FIG. 50, the smart watch 5000 may display the entire content 5030 of the news content received from the wearable glasses 100 on a screen. The wearable glasses 100 may not output the portion 5010 of the news content anymore.

Figure 51:
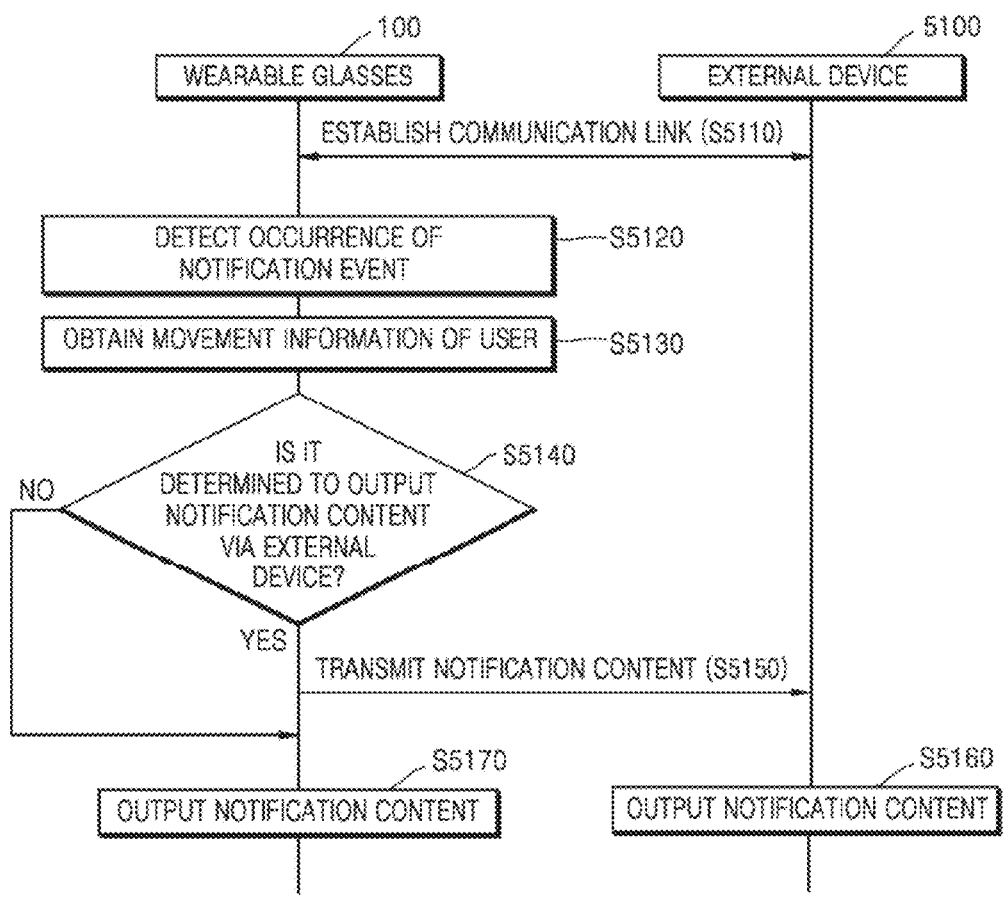
FIG. 51 illustrates a flowchart of a method used by a wearable glasses to output content corresponding to a notification event based on movement information of a user, according to an exemplary embodiment.

FIG. 51 illustrates a flowchart of a method used by a wearable glasses to output content corresponding to a notification event based on movement information of a user, according to an exemplary embodiment.

In operation S5110, the wearable glasses 100 may establish a communication link with an external device 5100.

For example, the wearable glasses 100 may establish a short-range communication or a mobile communication link (e.g., 3G, 4G or 5G) with the external device 5100. Examples of the short-range communication may include Bluetooth, BLE, WFD, UWB, Zigbee, NFC, and Ant+, but are not limited thereto.

In operation S5120, the wearable glasses 100 may detect occurrence of a notification event.

In operation S5130, when detecting occurrence of the notification event, the wearable glasses 100 may obtain movement information of a user.

According to an exemplary embodiment, the wearable glasses 100 may obtain movement information of the user by using at least one of an acceleration sensor, a tilt sensor, and a position sensor. According to an exemplary embodiment, the wearable glasses 100 may also obtain movement information of the user by using schedule information or life pattern information of the user. According to an exemplary embodiment, the wearable glasses 100 may analyze movement information of the user by using biometric information measured by using an external wearable device.

In operation S5140, the wearable glasses 100 may determine to output notification content via an external device 5100 based on the movement information of the user.

For example, the wearable glasses 100 may determine whether a movement speed of the user is less than a threshold speed (e.g., 4 km/h) based on the movement information of the user. When the movement speed of the user is equal to or greater than a threshold speed, the wearable glasses 100 may determine to output notification content via the external device 5100, and if the movement speed of the user is less than the threshold speed, the wearable glasses 100 may determine to output notification content immediately from the wearable glasses 100.

In operation S5150, when it is determined to output notification content via the external device 5100, the wearable glasses 100 may transmit notification content to the external device 5100. According to an exemplary embodiment, the wearable glasses 100 may transmit notification content to the external device 5100 via a previously established communication link.

In operation S5160, the external device 5100 may output content corresponding to a notification event. For example, the external device 5100 may display notification content on a screen. When notification content is a video, the external device 5100 may replay the notification content.

In operation S5170, when it is determined not to output notification content via the external device 5100, the wearable glasses 100 may output the notification content.

Figure 52:
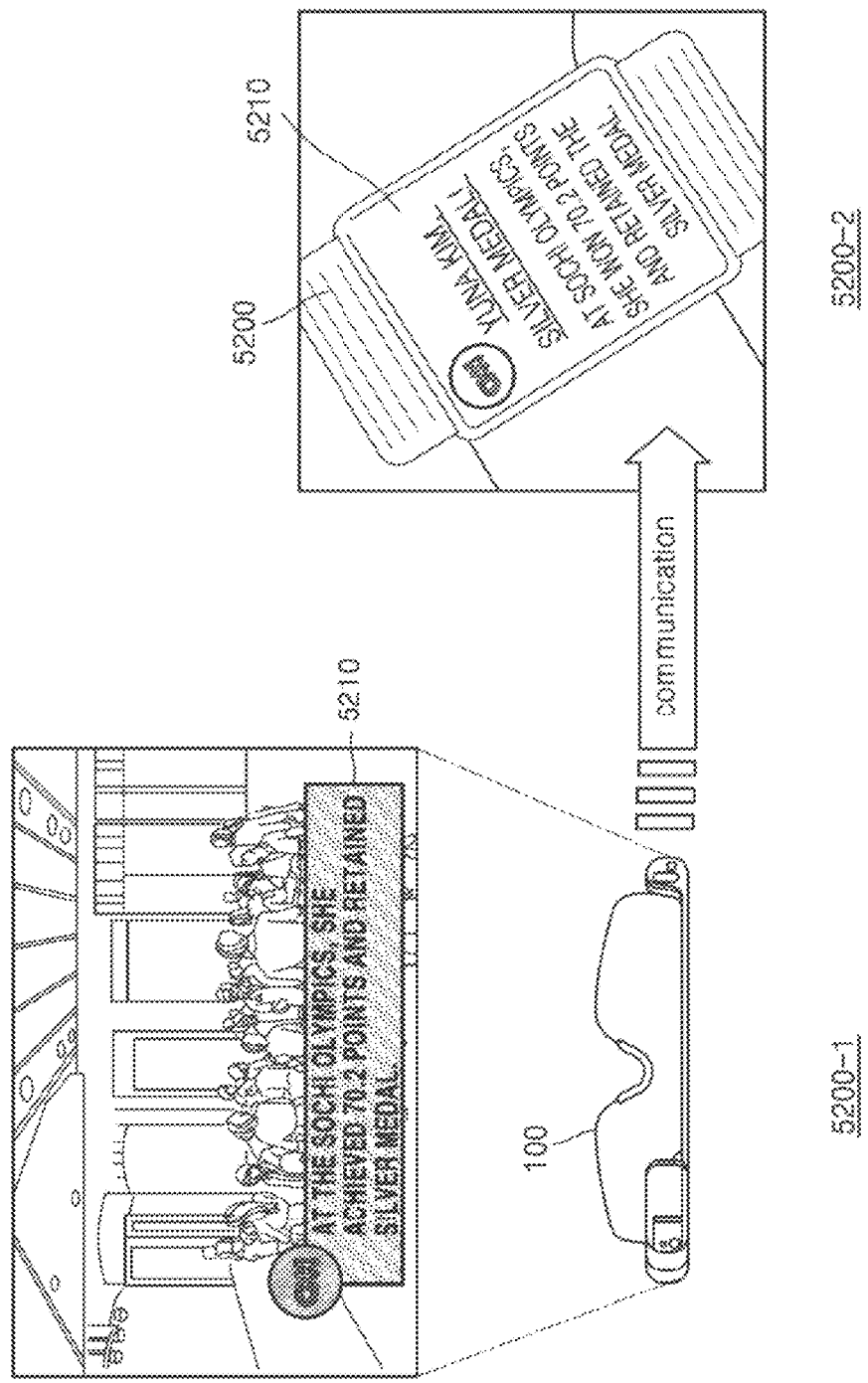
FIG. 52 illustrates an example of outputting, by a wearable glasses, content corresponding to a notification event based on movement information of a user, according to an exemplary embodiment.

FIG. 52 illustrates an example of outputting, by a wearable glasses, content corresponding to a notification event based on movement information of a user.

Referring to 5200-1 of FIG. 52, while a user wearing the wearable glasses 100 is walking in a public space where there are many people, the wearable glasses 100 may receive a push message including news content 5210 from the server 300. In this case, the wearable glasses 100 may detect that a notification event for displaying the news content 5210 has occurred.

The wearable glasses 100 may obtain movement information of the user before displaying the news content 5210 and determine whether a movement speed of the user is less than a threshold speed (e.g., 2 km/h). For example, a movement speed of the user who is walking in a public space may be 3 km/h. In this case, as the movement speed of the user (e.g., 3 km/h) is equal to or greater than the threshold speed (2 km/h), the wearable glasses 100 may determine to output the news content 5210 not from the wearable glasses 100 but via the smart watch 5200.

Referring to 5200-2 of FIG. 52, the wearable glasses 100 may request to output the news content 5210 while transmitting the news content 5210 to the smart watch 5200. The smart watch 5200 may display the news content 5210 on a screen according to the request by the wearable glasses 100.

According to an exemplary embodiment, when the user wearing the wearable glasses 100 is moving at a threshold speed or greater, the wearable glasses 100 may output notification content to another wearable device (e.g., the smart watch 5200) in order not to obstruct the user's view.

Figure 53:
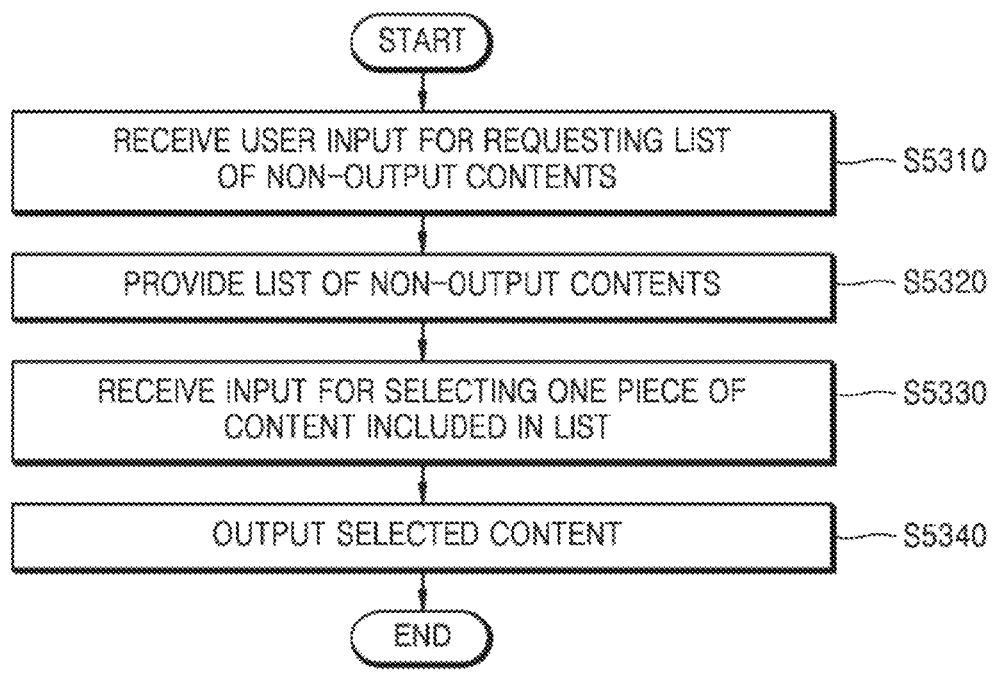
FIG. 53 illustrates a flowchart of a method used by a wearable glasses to provide a list of non-output contents, according to an exemplary embodiment.

FIG. 53 illustrates a flowchart of a method used by a wearable glasses to provide a list of non-output contents, according to an exemplary embodiment.

In operation S5310, the wearable glasses 100 may receive a user input for requesting a list of non-output contents. The list of non-output contents may include notification content that is not output when a notification event has occurred and notification content including a portion which is output when a notification event has occurred.

According to an exemplary embodiment, a user input for requesting a list of non-output contents may vary. For example, a user input for requesting a list of non-output contents may include an input for touching a certain area of a frame of glasses, an input for selecting a button included in a frame of glasses, a voice sound input for requesting a list of non-output contents, a head up motion input for lifting the head, or the like, but is not limited thereto. The certain area of the frame of the glasses may be predetermined.

In operation S5320, the wearable glasses 100 may provide a list of non-output contents in response to a user input. For example, the wearable glasses 100 may display a list of non-output contents in an AR form.

According to an exemplary embodiment, when it is not possible to display non-output contents on a single screen, the wearable glasses 100 may receive a scroll request from a user. The wearable glasses 100 may scroll non-output contents vertically or horizontally in response to the scroll request of the user.

Throughout the specification, "scrolling" refers to an operation of the wearable glasses 100 to vertically or horizontally move information displayed on a screen when an amount of information to be displayed on the screen is greater than a displayable amount of information to be displayed on the screen of the wearable glasses 100 so that new information corresponding to an amount of information that disappeared from the moved screen appears from an opposite direction.

In operation S5330, the wearable glasses 100 may receive an input for selecting one piece of content included in the list. For example, when a shaking motion input for shaking the head vertically is sensed, the wearable glasses 100 may recognize the same as an input for the user to select content displayed in a center of the list.

Also, the wearable glasses 100 may receive an eyeball input for selecting one piece of content included in the list. For example, the wearable glasses 100 may select a content in the list based on an eyeball input of blinking the eyes a threshold number of times or more or gazing at content for a threshold period of time or longer.

In operation S53540, the wearable glasses 100 may output selected content. For example, the wearable glasses 100 may display or replay non-output notification content on a screen.

According to an exemplary embodiment, the wearable glasses 100 may provide a list of non-output contents so that the user may select and check from the list notification content wished to be checked.

Meanwhile, according to an exemplary embodiment, the wearable glasses 100 may provide a list of output notification contents. The user may select notification content from the list of output notification contents and check notification content again.

Figure 54:
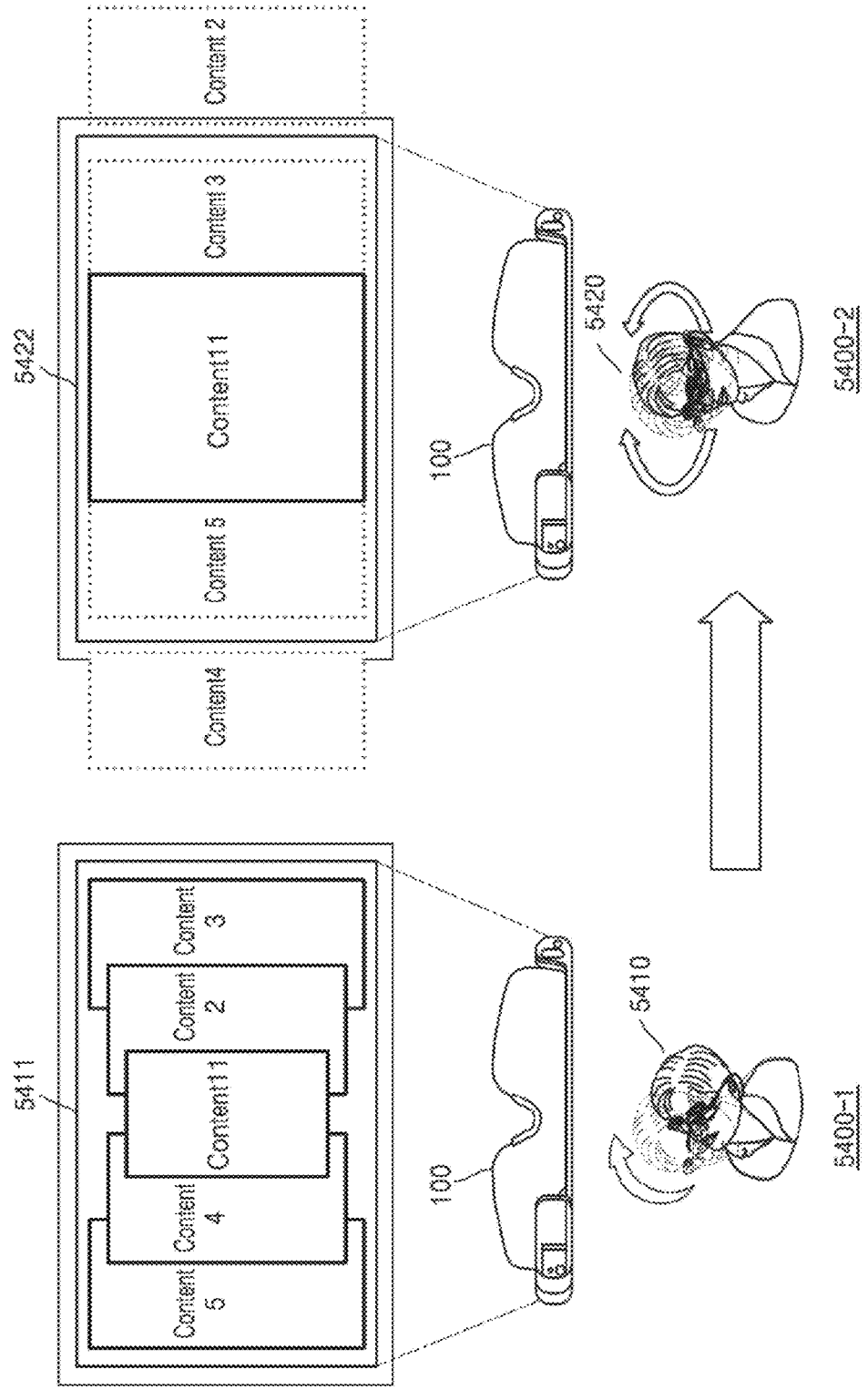
FIG. 54 illustrates an example of providing, by a wearable glasses, a list of non-output contents based on a certain user input, according to an exemplary embodiment.

FIG. 54 illustrates an example of providing, by a wearable glasses, a list of non-output contents based on a certain user input. In regard to FIG. 54, a user input for requesting to provide a list 5411 of non-output contents is a head up motion 5410, and a user input for requesting scrolling is a shaking motion 5420.

Referring to 5400-1 of FIG. 54, while occurrence of a notification event is not sensed, the wearable glasses 100 may receive the head up motion 5410 of a user lifting the head. For example, the wearable glasses 100 may sense the head up motion 5410 of the user by using, for example, a tilt sensor, an acceleration sensor, or a gyroscope sensor.

The wearable glasses 100 may display a list 5411 of non-output contents in response to the head up motion 5410 of the user.

According to another exemplary embodiment, in order to prevent that the list 5411 of non-output contents is displayed regardless of the user's intention, the Wearable glasses 100 may display the list 5411 of non-output contents only when a time period of the head up motion 5410 is equal to or greater than a threshold time (e.g., two seconds). That is, in order to prevent the inadvertent display of the list 5411 when, for example, the user looks up at a plane or bird in the sky, the wearable glasses 100 may check to ensure that the head up motion 5410 is an intended motion for displaying the list.

Referring to 5400-2 of FIG. 54, the wearable glasses 100 may sense the shaking motion 5420 of a user shaking the head to the left and the right while the list 5411 of non-output contents is displayed.

For example, the wearable glasses 100 may sense the shaking motion 5420 of shaking the head to the left and the right a threshold number of times (e.g., twice) or more by using, for example, a tilt sensor, an acceleration sensor or a gyroscope sensor. The wearable glasses 100 may scroll the list 5411 of non-output contents according to the shaking motion 5420 of the user.

According to an exemplary embodiment, when the user selects first content 5422 from the list 5411 of non-output contents, the wearable glasses 100 may display or replay the first content 5422.

Figure 55:
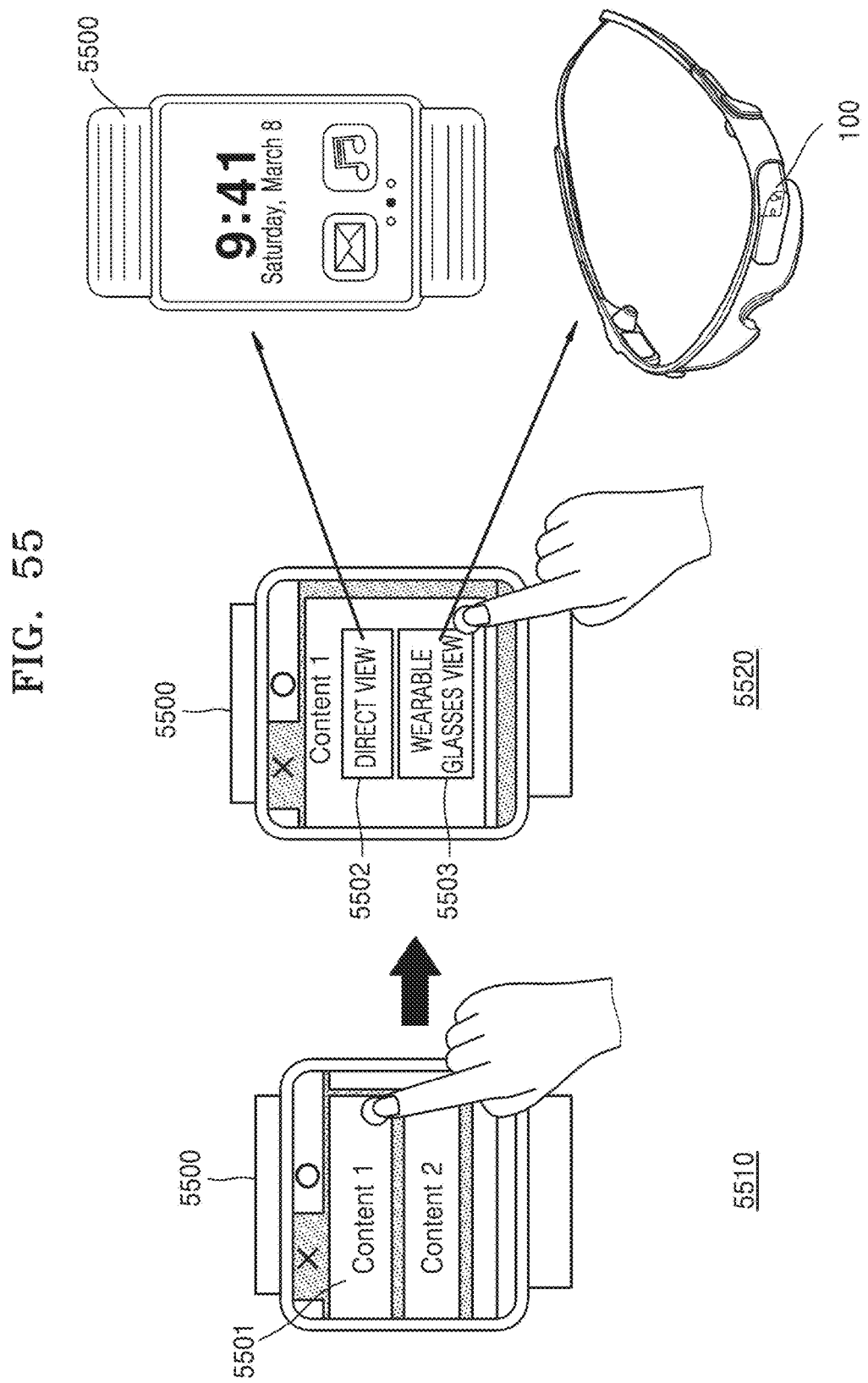
FIG. 55 illustrates an example of providing, by a wearable device connected to a wearable glasses, a list of contents that are not yet output from the wearable glasses, according to an exemplary embodiment.

FIG. 55 illustrates an example of providing, by a wearable device connected to a wearable glasses, a list of contents that are not yet output from the wearable glasses.

Referring to 5510 of FIG. 55, a smart watch 5500 connected to the wearable glasses 100 may display a list of contents that are not yet output from the wearable glasses 100. A user may check the list of non-output contents, and select first content 5501 from the list of non-output contents.

Referring to 5520 of FIG. 55, the smart watch 5500 may provide a selection window for selecting a device to display the first content 5501.

When the user selects a direct view 5502 from the selection window 5502, the smart watch 5500 may display the first content 5501 that is not yet output from the wearable glasses 100 on a screen of the smart watch 5500.

When the user selects a wearable glasses view 5503 from the selection window, the smart watch 5500 may request the wearable glasses 100 to output the first content 5501. The wearable glasses 100 may display the first content 5501 according to a request by the smart watch 5500.

Figure 56:
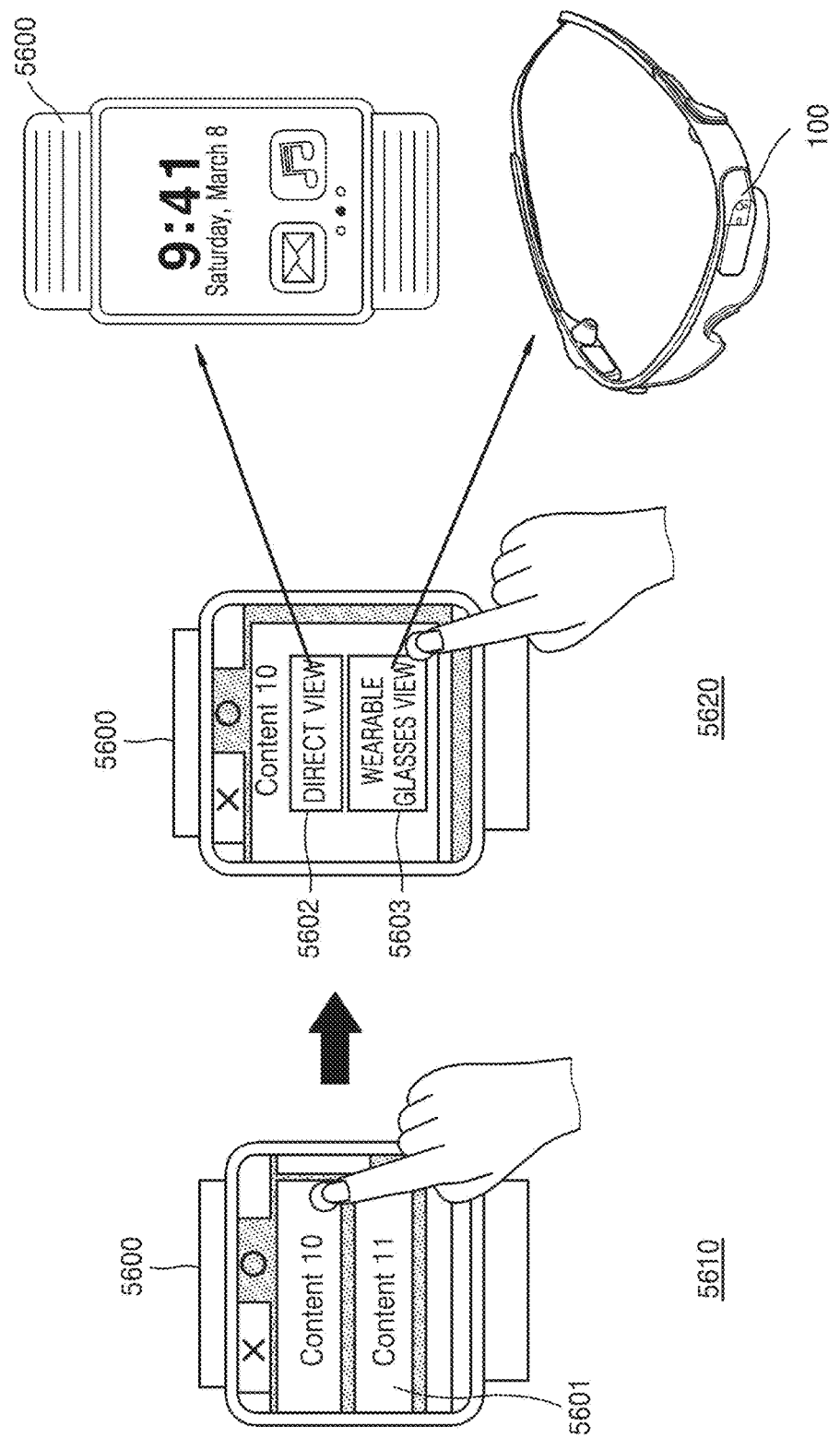
FIG. 56 illustrates an example of providing, by a wearable device connected to a wearable glasses, a list of contents that have been previously output from the wearable glasses, according to an exemplary embodiment.

FIG. 56 illustrates an example of providing, by a wearable device connected to a wearable glasses, a list of contents that have been previously output from the wearable glasses.

Referring to 5610 of FIG. 56, a smart watch 5600 connected to the wearable glasses 100 may display a list of contents that have been previously output from the wearable glasses 100. The user may check the list of previously output contents and select an eleventh content 5601 from the list of previously output contents.

Referring to 5620 of FIG. 56, the smart watch 5600 may provide a selection window from which a device to display the eleventh content 5601 may be selected.

When the user selects a direct view 5602 from the selection window, the smart watch 5600 may display the eleventh content 5601 that has been previously output from the wearable glasses 100 on a screen of the smart watch 5600.

When the user selects a wearable glasses view 5603 on the selection window, the smart watch 5500 may request the wearable glasses 100 to output the eleventh content 5601. The wearable glasses 100 may display the eleventh content 5601 according to a request by the smart watch 5600.

Figure 57:
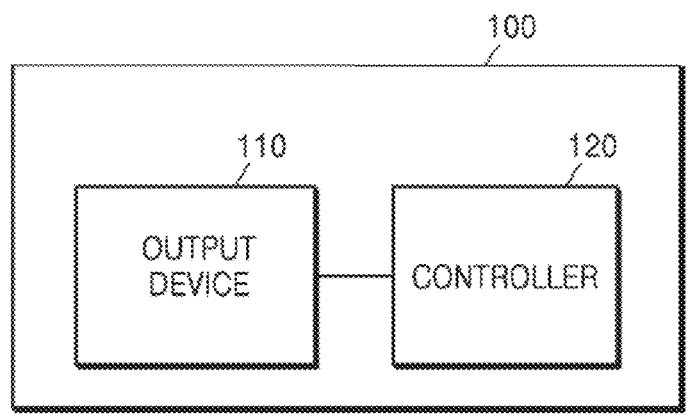
FIGS. 57 and 58 are block diagrams illustrating a structure of a wearable glasses according to an exemplary embodiment.
Figure 58:
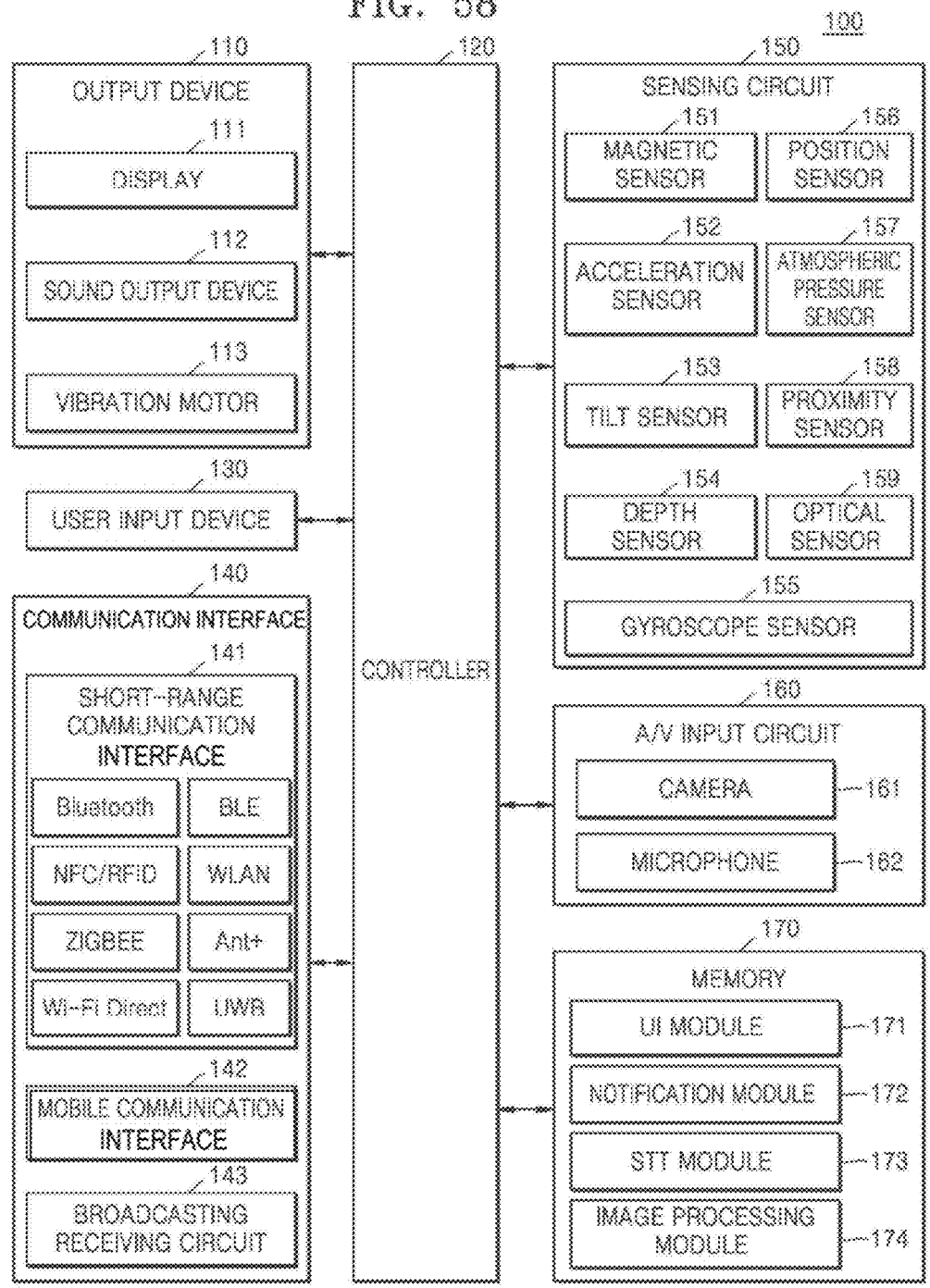

FIGS. 57 and 58 are block diagrams illustrating a structure of a wearable glasses according to an exemplary embodiment.

As illustrated in FIG. 57, the wearable glasses 100 according to an exemplary embodiment may include an output device 110 and a controller 120. However, not all of illustrated elements are necessary elements. The wearable glasses 100 may be implemented by more elements or less elements than the illustrated elements.

For example, as illustrated in FIG. 58, the wearable glasses 100 according to an exemplary embodiment may further include a user input device 130, a communication interface 140, a sensing circuit 150, an audio/video (A/V) input circuit, and a memory 170 in addition to the output module 110 and the controller 120. The sensing circuit 150 may also be referred to as a sensor circuit.

Hereinafter, the above-described elements will be described in detail.

The output device 110 is used to output an audio signal, a video signal, or a vibration signal, and may include the display 111, a sound output device 112, and a vibration motor 113.

The display 111 may display information processed by the wearable glasses 100. For example, the display 111 may display content corresponding to a notification event (notification message information). The display 111 may display content corresponding to a notification event in the form of AR, MR, or VR. Also, the display 111 may display an indicator indicating occurrence of a notification event.

The display 111 may display a list of non-output contents. The list of non-output contents may include notification content that is not output when a notification event has occurred and notification content including a portion which is output when a notification event has occurred.

Meanwhile, when the display 111 is configured as a touch screen by forming a layer structure with a touch pad, the display 111 may also be used as a user input device as well as an output device. The display 111 may include at least one of a liquid crystal display (LCD), a thin-film transistor-liquid crystal display (TFT-LCD), an organic light-emitting diode (OLED), a flexible display, a 3D display, and an electrophoretic display. According to an exemplary embodiment of the wearable glasses 100, the wearable glasses 100 may include at least two displays 111.

The sound output circuit 112 outputs audio data received from the communication unit 140 or stored in the memory 170. Also, the sound output device 112 outputs a sound signal related to a function performed by the wearable glasses 100, such as a call signal reception sound, a message reception sound, or a notification sound. The sound output device 112 may include a speaker or a buzzer.

The vibration motor 113 may output a vibration signal. For example, the vibration motor 113 may output a vibration signal corresponding to an output of audio data or video data, for example, a call signal reception sound or a message reception sound. Also, the vibration motor 113 may output a vibration signal when a touch screen is touched.

The output device 110 may provide content corresponding to a notification event according to a method determined based on movement information of a user.

The controller 120 generally controls an overall operation of the wearable glasses 100. For example, the controller 120 may generally control the output device 110, the user input device 130, the communication interface 140, the sensing circuit 150, and the A/V input circuit 160 by executing programs stored in the memory 170.

When detecting occurrence of a notification event, the controller 120 may obtain movement information of a user wearing the wearable glasses 100. The movement information of the user may include at least one of movement state information, movement speed information, and position information of the user.

The controller 120 may determine whether the user is wearing the wearable glasses 100 based on at least one sensor included in the wearable glasses 100, and when it is determined that the user is wearing an wearable glasses, the controller 120 may obtain movement information of the user.

The controller 120 may also obtain movement information of the user by analyzing a movement of the user based on at least one of acceleration information, tilt information, and position information measured using the wearable glasses 100.

The controller 120 may determine a time to provide content corresponding to a notification event based on movement information of the user.

The controller 120 may determine to output notification content at a present time when a movement speed of a user is less than a threshold speed and to output notification content at a different time when a movement speed of the user is equal to or greater than a threshold speed. The different time may include at least one of a point of time of receiving a user input for requesting to output content corresponding to a notification event, a point of time when a movement of the user is changed, and a point of time when the preset time has passed, but is not limited thereto.

The controller 120 may determine a method of providing content corresponding to a notification event based on movement information of the user. For example, the controller 120 may determine to output a portion of notification content when a movement speed of the user is equal to or greater than a threshold speed, and if the movement speed of the user is less than the threshold speed, the controller 120 may determine to output the entire notification content.

The controller 120 may determine to output notification content as at least one of an audio signal or a video signal in consideration of environment information about an environment within a certain distance from the wearable glasses 100. The environment information may include at least one of external sound information about sounds generated within a certain distance from the wearable glasses 100 and information about an external image obtained by using the image sensor 161.

The controller 120 may control the display 111 to display received notification message information based on a signal output from the sensing circuit 150.

The controller 120 may determine whether a user is wearing wearable glasses based on a signal output from at least one sensor included in the sensing circuit 150, and when it is determined that the user is wearing wearable glasses, the controller 120 may control the sensing circuit 150 to sense a movement of the user.

The user input device 130 is used by a user to input data used to control the wearable glasses 100. Examples of the user input unit 130 include a keypad, a dome switch, a touch pad (a touch capacitance type, a pressure resistance film type, an infrared light detecting type, a surface ultrasound conducting type, an integral tension measuring type, or a piezo-effect type), a jog wheel, and a jog switch, but are not limited thereto.

The user input device 130 is described above with reference to FIG. 2, and thus repeated description will be omitted.

The user input device 130 may receive a user input for requesting to output notification content.

The user input device 130 may receive a first user input for requesting to output the entire content. For example, the first user input may be at least one of a motion input, a touch input, a key input, a voice input, and a multiple input, but is not limited thereto. According to an exemplary embodiment, a first user input for requesting to output the entire notification content may be preset. For example, the user may set a head up motion of lifting the head as a first user input for requesting to output the entire notification content.

The user input device 130 may receive a second user input for requesting to block output of a portion of notification content. The second user input may also be various.

The user input device 130 may receive a user input for requesting a list of non-output contents. A user input for requesting a list of non-output contents may include an input for touching a certain area of a frame of glasses, an input for selecting a button included in a frame of glasses, an input for requesting a list of non-output contents, a head up motion input for lifting the head, or the like, but is not limited thereto.

The user input device 130 may receive a user input for requesting to transmit notification content to an external device. The user input device 130 may receive an input for selecting an external device to transmit notification content. For example, the user input device 130 may receive an input for selecting a smart watch and an input for requesting to transmit notification content to the smart watch.

The communication interface 140 may include at least one component enabling the wearable glasses 100 to communicate with an external device or a server. For example, the communication interface 140 may include a short-range wireless communication interface 141, a mobile communication interface 142, and a broadcast receiving circuit 143.

The short-range wireless communication interface 141 may include a Bluetooth communication interface, a BLE communication interface, an NFC interface, a wireless local area network (WLAN) (Wi-Fi) communication interface, a Zigbee communication interface, an infrared data association (IrDA) communication interface, a WFD communication interface, an UWB communication interface, and an Ant+ communication interface, but components included in the short-range wireless communication interface 141 are not limited thereto.

The mobile communication interface 142 transmits and receives a wireless signal to and from at least one of a base station, an external terminal, and a server, on a mobile communication network. Here, a wireless signal may include data having various formats according to transmission and reception of a voice call signal, a video telephone call signal, or a text/multimedia message.

The broadcast receiving circuit 143 receives a broadcast signal and/or broadcast related information from an external source, through a broadcast channel. The broadcast channel may include a satellite channel or a terrestrial broadcasting channel. In some embodiments, the wearable glasses 100 may not include the broadcast receiving circuit 143.

The communication interface 140 may receive notification message information.

The communication interface 140 may request movement information of a user and receive from an external device connected to the wearable glasses 100. The communication interface 140 may request movement information of the user while transmitting acceleration information, tilt information, position information or the like measured using the wearable glasses 100 to the external device.

The communication interface 140 may request analysis of a captured external image while transmitting the captured external image to the mobile terminal 200 or the server 300. The communication interface 140 may receive at least one of variation information of an external image, color information of an external image, and object information about objects included in an external image, from the mobile terminal 200 or the server 300.

The sensing circuit 150 may sense a state of the wearable glasses 100, a state of surroundings of the wearable glasses 100, a state of a user wearing the wearable glasses 100, movement of a user, and may transmit sensed information to the controller 120. For example, the sensing circuit 150 may sense movement of the user and output a signal related to movement of the user to the controller 120. The signal may be an electrical signal.

The sensing circuit 150 may include at least one of a magnetic sensor 151, an acceleration sensor 152, a tilt sensor 153, a depth sensor 154, a gyroscope sensor 155, a position sensor 156 such as a global positioning system (GPS), an atmospheric pressure sensor 157, a proximity sensor 158, and an optical sensor 159, but a component included in the sensing circuit 150 is not limited thereto. The sensing circuit 150 may also include a temperature sensor, an illuminance sensor, a pressure sensor, or an iris scan sensor. Because functions of each sensor may be intuitively inferred by one of ordinary skill in the art based on its name, details thereof are not described herein.

The A/V input circuit 160 is used to receive an audio signal or a video signal, and may include a camera (image sensor) 161 and a microphone 162. The camera (image sensor) 161 may obtain an image frame of a still image or a video in a video telephone mode or a photographing mode. An image captured via the camera (image sensor) 161 may be processed by the controller 120 or a separate image processor (not shown).

An image frame processed by the camera (image sensor) 161 may be stored in the memory 170 or transmitted to an external device through the communication interface 140. According to an exemplary embodiment of the wearable glasses 100, the wearable glasses 100 may include at least two cameras (image sensors) 161.

The microphone 162 receives an external sound signal and processes the external sound signal to electric voice data. For example, the microphone 162 may receive a sound signal from an external device or a narrator. The microphone 162 may use any one of various noise removing algorithms to remove noise generated while receiving the external sound signal.

The memory 170 may store a program for processes and control of the controller 120, and may store input/output data such as a list of non-output contents, a list of previously output contents, captured images, biometric information, schedule information of a user, or life pattern information of a user.

The memory 170 may include at least storage medium from among a flash memory, a hard disk, a multimedia card micro type memory, a card type memory (for example, a secure digital (SD) card or an extreme digital (XD) card), a random access memory (RAM), a static random access memory (SRAM), a read-only memory (ROM), an electrically erasable programmable read-only memory (EE-PROM), a programmable read-only memory (PROM), a magnetic memory, a magnetic disk, and an optical disk. Also, the wearable glasses 100 may operate a web storage server or a cloud server that performs a storage function of the memory 170 in the Internet.

Programs stored in the memory 170 may be classified into a plurality of modules based on functions, and for example, into a UI module 171, a notification module 172, a STT module 173, and an image processing module 174.

The UI module 171 may provide a specialized UI or GUI linked with the wearable glasses 100 according to applications. The notification module 172 may generate a signal for notifying occurrence of an event in the wearable glasses 100. The notification module 172 may output a notification signal in the form of a video signal via the display 111 or in the form of an audio signal via the sound output device 112 or in the form of a vibration signal via the vibration motor 113.

The STT module 173 may convert voice included in multimedia content to text, thereby generating a transcript corresponding to the multimedia content.

The image processing module 174 may obtain object information about objects included in a captured image, edge information, atmosphere information, and color information by analyzing the captured image.

The methods described above may be implemented as program commands that can be executed using various computer components and may be recorded on a computer readable recording medium. The computer readable recording medium may include a program command, a data file, a data structure, etc., alone or in combination. The program commands recorded in the computer readable recording medium may be specially designed or well known to one of ordinary skill in the computer software field. Examples of the computer readable recording medium include magnetic storage media (e.g., hard disks, floppy disks, magnetic media such as magnetic tapes, etc.), optical recording media (e.g., CD-ROMs or DVDs), magneto-optical media (e.g., floptical disks), and hardware devices specifically configured to store and execute program commands (e.g., ROM, RAM, flash memories, etc.). Examples of the program command include mechanical codes prepared by a compiler, and high-level languages executable by a computer by using an interpreter.

As described above, according to the one or more of the above exemplary embodiments, the wearable glasses 100 may determine a time to provide notification content and a form of providing notification content based on movement information of the user, thereby preventing the user's view from being obstructed in a dangerous situation for the user to check the notification content.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A wearable glasses comprising:
   a sensing circuit configured to obtain movement information of a user wearing the wearable glasses;
   a communication circuit configured to receive notification message information;

a display configured to display the notification message information within an angle of view of the user wearing the wearable glasses;
at least one memory configured to store one or more programs; and
one or more processors configured to execute the one or more programs including instructions to:
in response to receiving the notification message information, control the sensing circuit to obtain first movement information of the user wearing the wearable glasses;
based on the obtained first movement information, determine a first movement state of the user wearing the wearable glasses; and
in response to the first movement state of the user indicating the user is moving at a threshold speed or greater, extract one or more keywords from the notification message information and
control the display to display the notification message information in which the one or more keywords are highlighted in the notification message information.

2. The wearable glasses of claim 1,
wherein the one or more processors are further configured to:
control the sensing circuit to obtain second movement information for determining a second movement state of the user wearing the wearable glasses; and
based on the determined second movement state of the user, change a display form for displaying the notification message information based on the second movement state of the user.

3. The wearable glasses of claim 2, wherein the one or more processors are further configured to determine the first movement state or the second movement state of the user by using at least one of acceleration information, tilt information, biometric information, altitude information, atmospheric pressure information, eyeball tracking information, and position information measured by the sensing circuit.

4. The wearable glasses of claim 2, wherein the one or more processors are further configured to determine the first movement state or the second movement state of the user using the movement information of the user received from an external device.

5. The wearable glasses of claim 1, wherein the one or more processors are further configured to determine whether the user is wearing the wearable glasses by using at least one sensor included in the sensing circuit, and control the sensing circuit to obtain the movement information of the user when it is determined that the user is wearing the wearable glasses.

6. The wearable glasses of claim 1, wherein the one or more processors are further configured to output the notification message information at a present time when a movement speed of the user is less than a threshold speed, and when the movement speed of the user is equal to or greater than the threshold speed, the one or more processors are further configured to determine to output the notification message information at a different time than the present time.

7. The wearable glasses of claim 6, wherein the different time comprises at least one of a point of time when a user input for requesting to output the notification message information is received, a point of time when a movement state of the user is changed, and a point of time when a preset time has passed.

8. The wearable glasses of claim 1, wherein when a movement speed of the user is equal to or greater than a threshold speed, the one or more processors is further configured to display a portion of the notification message information, and when a movement speed of the user is less than the threshold speed, the one or more processors is further configured to display an entire portion of the notification message information.

9. The wearable glasses of claim 8, wherein the one or more processors is further configured to determine at least one of an audio signal and a video signal as an output form of the notification message information according to environment information about an environment within a certain distance from the wearable glasses.

10. The wearable glasses of claim 9, wherein the environment information includes at least one of information about external sounds generated within the certain distance from the wearable glasses and information about an external image obtained by using an image sensor.

11. A wearable glasses comprising:
a sensing circuit configured to obtain a movement of a user and output a signal;
a communication circuit configured to receive notification message information;
a display configured to display the notification message information;
at least one memory configured to store one or more programs; and
one or more processors configured to execute the one or more programs including instructions to:
in response to receiving the notification message information, control the sensing circuit to obtain a first signal output;
based on the obtained first signal output, determine a first movement state of the user wearing the wearable glasses; and
in response to the determined first movement state of the user indicating the user is moving at a threshold speed or greater, extract one or more keywords from the notification message information and
control the display to display the notification message information in which the one or more keywords are highlighted in the notification message information.

12. The wearable glasses of claim 11, wherein the one or more processors is further configured to determine whether the user is wearing the wearable glasses based on a signal output from at least one sensor included in the sensing circuit, and when it is determined that the user is wearing the wearable glasses, the one or more processors is further configured to control the sensing circuit to obtain a movement of the user.

13. A method of providing information, wherein the method is performed by a wearable glasses and comprises:
receiving notification message information;
obtaining first movement information of a user wearing the wearable glasses in response to receiving the notification message information;
determining a first movement state of the user wearing the wearable glasses based on the obtained first movement information;
determining a time to display the notification message information;
in response to the first movement state of the user indicating the user is moving at a threshold speed or greater, extracting one or more keywords from the notification message information; and
displaying, at the determined time, the notification message information in which the one or more keywords are highlighted in the notification message information.

14. The method of claim 13, wherein the obtaining first movement information of the user comprises:
   determining whether the user is wearing the wearable glasses by using at least one sensor included in the wearable glasses; and
   obtaining the first movement information of the user when it is determined that the user is wearing the wearable glasses.

15. The method of claim 13, further comprises:
   obtaining second movement information for determining a second movement state of the user wearing the wearable glasses; and
   changing a display form for displaying the notification message information based on the second movement state of the user based on the determined second movement state of the user.

16. The method of claim 13, further comprises:
   determining to output the notification message information at a present time when a movement speed of the user is less than a threshold speed and to output the notification message information at a different time than the present time when the movement speed of the user is equal to or greater than the threshold speed.

17. The method of claim 13, further comprises:
   determining to output a portion of the notification message information when a movement speed of the user is equal to or greater than a threshold speed and to output an entire portion of the notification message information when a movement speed of the user is less than the threshold speed.

18. The method of claim 13, wherein the determining of the display form comprises:
   obtaining environment information about an environment within a certain distance from the wearable glasses; and
   determining to provide the notification message information in the form of at least one of an audio signal and a video signal according to the obtained environment information.

* * * * *